(12) United States Patent
Takiba et al.

(10) Patent No.: US 6,714,051 B2
(45) Date of Patent: Mar. 30, 2004

(54) LOGIC CIRCUITRY-IMPLEMENTED BUS BUFFER

(75) Inventors: Akira Takiba, Tokyo (JP); Masanori Kinugasa, Tokyo (JP); Takumi Tsukazaki, Tokyo (JP); Toru Fujii, Tokyo (JP); Masaru Mizuta, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/309,254

(22) Filed: Dec. 4, 2002

(65) Prior Publication Data

US 2003/0169073 A1 Sep. 11, 2003

(30) Foreign Application Priority Data

Mar. 6, 2002 (JP) ........................................ 2002-060871
Aug. 13, 2002 (JP) ........................................ 2002-235930

(51) Int. Cl.[7] ........................................ H03K 19/0175
(52) U.S. Cl. ........................ 326/86; 326/90; 326/56; 710/100; 710/126; 375/219; 375/200
(58) Field of Search ........................ 326/86, 90, 56–58; 710/100, 126, 129; 375/220, 219

(56) References Cited

U.S. PATENT DOCUMENTS 6,073,190 A * 6/2000 Rooney ........................ 710/56
6,212,224 B1 * 4/2001 Cammarota et al. ........ 375/219
6,586,967 B2 * 7/2003 Atkinson ...................... 326/80

FOREIGN PATENT DOCUMENTS

JP 8-314849 11/1996

* cited by examiner

Primary Examiner—V. Tan
(74) Attorney, Agent, or Firm—Oblon, Spivak, McClelland, Maier & Neustadt, P.C.

(57) ABSTRACT

A bus buffer has a controller to generate several control signals; a first terminal via which a first-directional signal is input whereas a second-directional signal is output; a second terminal via which the first-directional signal is output whereas the second-directional signal is input; a first-directional signal processor, provided between the first and second terminals, having a first internal circuit and a first output buffer; a second-directional signal processor, provided between the second and first terminals, having a second internal circuit and a second output buffer; a first input buffer having a first input holder to disactivate the first internal circuit and the first output buffer by using at least one of the control signals; and a second input buffer having a second input holder to disactivate the second internal circuit and the second output buffer by using the at least one control signal, for holding the input to the input buffers at a certain level to decrease a current to pass these circuits, thus achieving low power consumption.

29 Claims, 31 Drawing Sheets

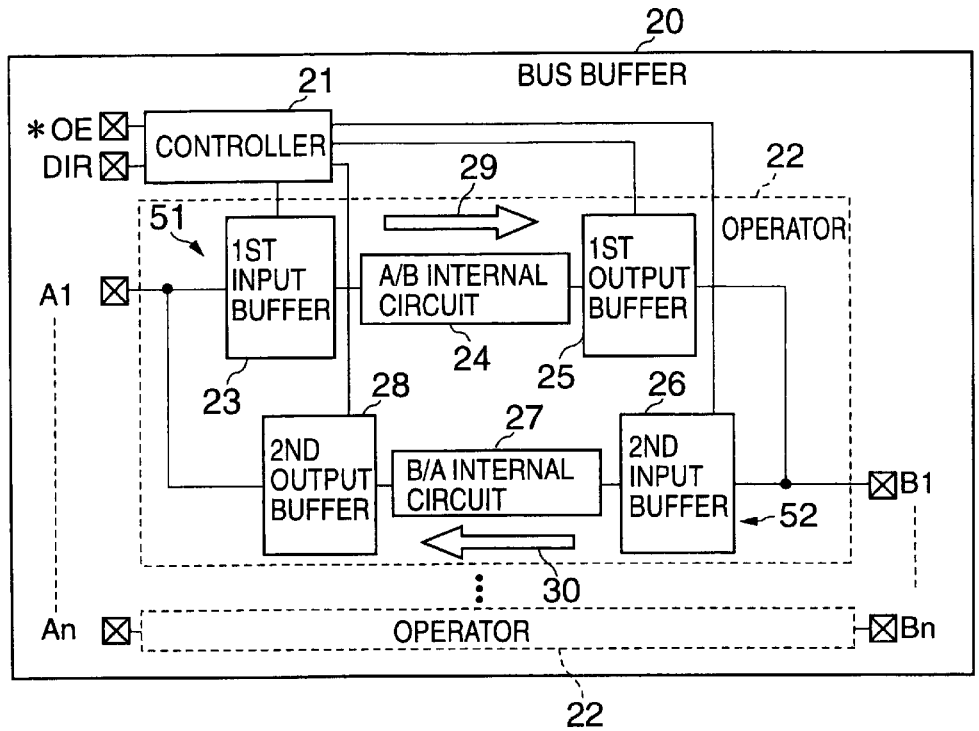

FIG. 3

TABLE 3

| *OE | DIR | TERMINAL A | TERMINAL B | 1ST INPUT BUFFER | A/B INTERNAL CIRCUIT | 1ST OUTPUT BUFFER | 2ND INPUT BUFFER | B/A INTERNAL CIRCUIT | 2ND OUTPUT BUFFER |
|---|---|---|---|---|---|---|---|---|---|
| L | H | INPUT | OUTPUT | IN OPERATION | IN OPERATION | IN OPERATION | OUT OF OPERATION | OUT OF OPERATION | OUT OF OPERATION |
| L | L | OUTPUT | INPUT | OUT OF OPERATION | OUT OF OPERATION | OUT OF OPERATION | IN OPERATION | IN OPERATION | IN OPERATION |
| H | ※ | HIGH IMPEDANCE | | OUT OF OPERATION | OUT OF OPERATION | OUT OF OPERATION | OUT OF OPERATION | OUT OF OPERATION | OUT OF OPERATION |

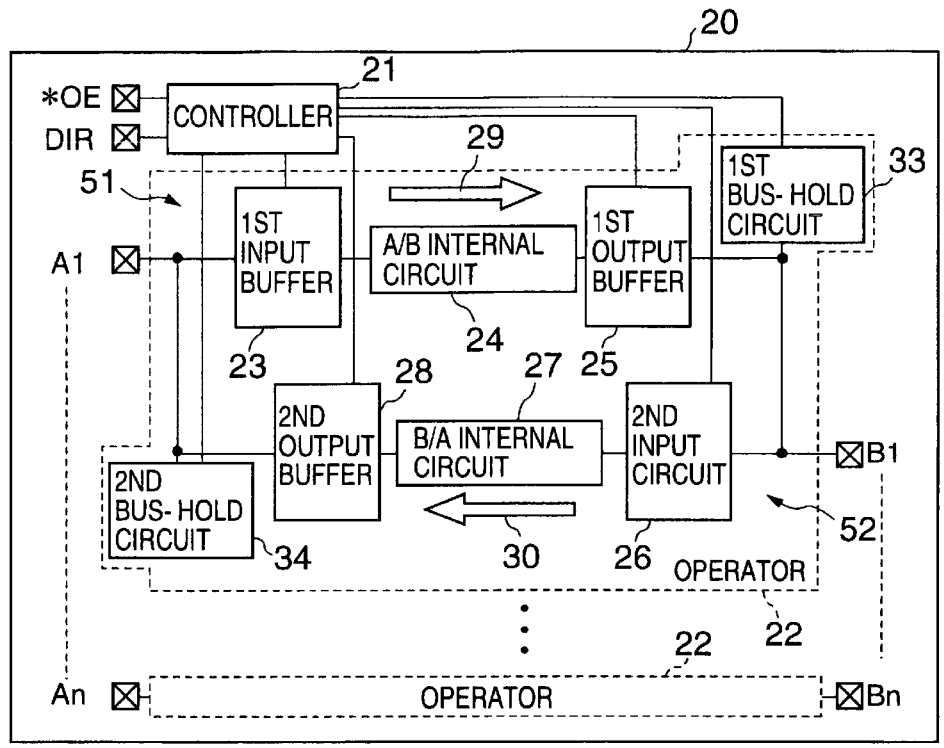

FIG. 8

TABLE 4

| *OE | DIR | TERMINAL A | TERMINAL B | 1ST INPUT BUFFER | A/B INTERNAL CIRCUIT | 1ST OUTPUT BUFFER | 1ST BUS HOLDER | 2ND INPUT BUFFER | B/A INTERNAL CIRCUIT | 2ND OUTPUT BUFFER | 2ND BUS HOLDER |
|---|---|---|---|---|---|---|---|---|---|---|---|
| L | H | INPUT | OUTPUT | IN OPERATION | IN OPERATION | IN OPERATION | OUT OF OPERATION | OUT OF OPERATION | OUT OF OPERATION | OUT OF OPERATION | OUT OF OPERATION |
| L | L | OUTPUT | INPUT | OUT OF OPERATION | OUT OF OPERATION | OUT OF OPERATION | OUT OF OPERATION | IN OPERATION | IN OPERATION | IN OPERATION | OUT OF OPERATION |
| H | ※ | HIGH IMPEDANCE | | OUT OF OPERATION | OUT OF OPERATION | OUT OF OPERATION | IN OPERATION | OUT OF OPERATION | OUT OF OPERATION | OUT OF OPERATION | IN OPERATION |

TABLE 5

| *OE | TERMINAL A | TERMINAL B | INPUT BUFFER | A/B INTERNAL CIRCUIT | OUTPUT BUFFER | 1ST BUS-HOLD CIRCUIT | 2ND BUS-HOLD CIRCUIT |
|---|---|---|---|---|---|---|---|
| L | INPUT | OUTPUT | IN OPERATION | IN OPERATION | IN OPERATION | OUT OF OPERATION | OUT OF OPERATION |
| H | HIGH IMPEDANCE | | OUT OF OPERATION | OUT OF OPERATION | OUT OF OPERATION | IN OPERATION | IN OPERATION |

TABLE 6

| *OE | A | (ba) | (bb) | (c) | (d) | B |
|---|---|---|---|---|---|---|
| L | L | L | L | H | H | L |
| L | H | H | H | L | L | H |
| H | L | L | H | H | L | HZ |
| H | H | L | H | H | L | HZ |

TABLE 1

| *OE | DIR | TERMI-NAL A | TERMI-NAL B | 1ST INPUT BUFFER | A/B INTERNAL CIRCUIT | 1ST OUTPUT BUFFER | 2ND INPUT BUFFER | B/A INTERNAL CIRCUIT | 2ND OUTPUT CIRCUIT |
|---|---|---|---|---|---|---|---|---|---|
| L | H | INPUT | OUTPUT | IN OPERATION | IN OPERATION | IN OPERATION | IN OPERATION | IN OPERATION | OUT OF OPERATION |
| L | L | OUTPUT | INPUT | IN OPERATION | IN OPERATION | OUT OF OPERATION | IN OPERATION | IN OPERATION | IN OPERATION |
| H | ※ | HIGH IMPEDANCE | | IN OPERATION | IN OPERATION | OUT OF OPERATION | IN OPERATION | IN OPERATION | OUT OF OPERATION |

TABLE 2

| *OE | DIR | TERMI-NAL A | TERMI-NAL B | 1ST INPUT BUFFER | A/B INTERNAL CIRCUIT | 1ST OUTPUT BUFFER | 1ST BUS HOLDER | 2ND INPUT BUFFER | B/A INTERNAL CIRCUIT | 2ND OUTPUT CIRCUIT | 2ND BUS HOLDER |
|---|---|---|---|---|---|---|---|---|---|---|---|
| L | H | INPUT | OUTPUT | IN OPERATION | IN OPERATION | IN OPERATION | IN OPERATION | IN OPERATION | IN OPERATION | OUT OF OPERATION | IN OPERATION |
| L | L | OUTPUT | INPUT | IN OPERATION | IN OPERATION | OUT OF OPERATION | IN OPERATION | IN OPERATION | IN OPERATION | IN OPERATION | IN OPERATION |
| H | ※ | HIGH IMPEDANCE | | IN OPERATION | IN OPERATION | OUT OF OPERATION | IN OPERATION | IN OPERATION | IN OPERATION | OUT OF OPERATION | IN OPERATION |

LOGIC CIRCUITRY-IMPLEMENTED BUS BUFFER

CROSS REFERENCE TO RELATED APPLICATIONS

This application claims benefit of priority under 35 USC § 119 to Japanese Patent Application No. 2002-60871, filed on Mar. 6, 2002, and No. 2002-235930, filed on Aug. 13, 2002, the entire contents of which are incorporated by reference.

BACKGROUND OF THE INVENTION

The present invention relates to a logic circuitry-implemented bus buffer. Particularly, this invention relates to a bus buffer having several buffers provided at least at input and output stages with internal circuitry interposed therebetween.

With recent dramatic development of information-processing technology, several types of bus buffers haven been introduced, which are interposed between several data buses, for relaying data signals transferred through the data buses. Data transferred through a bus at one side of the bus buffer and that through another bus at the other side of the bus buffer may be or may not be sent at the same transfer speed. Moreover, data transfer via the bus buffer may be one-way or two-way transfer between the buses at one and the other sides of the bus buffer.

Applications such as Personal Digital Assistant (abbreviated to PDA hereinafter) include many bus (signal) lines for data transfer between a central processing unit (abbreviated to CPU hereinafter) in logic-circuit system and peripheral devices connected to busses in tree structure. Peripheral devices applicable to this type of application are classified into a device group (called high-speed accessible device group) including devices such as synchronous dynamic random access memories (abbreviated to SDRAM hereinafter) and another device group (called low-speed accessible device group) including devices accessible at low speed such as connectors for connection of external peripheral devices, and nonvolatile memories.

When all of the peripheral devices are driven by CPU, not only the high-speed accessible device group but also the low-speed accessible device group are driven, thus increasing power consumption which depends on device input capacity, etc. Provided for solving such a problem are usually high-speed buses for high-speed access use and low-speed buses for low-speed access use, and also bus buffers for connecting the high- and low-speed buses.

It is a well-known power-saving measurement for hand-held devices to interpose a bus buffer between high- and low-speed buses for data transfer like explained above for lowering total power consumption in application such as PDA. This measurement deactivates the low-speed accessible device group through a bus buffer while the high-speed accessible devices such as SDRAMs are being accessed, thus achieving low power consumption.

FIG. 41 is a block diagram showing the internal configuration of a well-known bus buffer 10 to which off-the-shelf bus buffer devices are applicable. The bus buffer 10 shown in FIG. 41 is equipped with a controller 11 for generating several control signals of different logic levels in response to an input/output command signal *OE from CPU and a direction-indicating signal DIR, terminals A1 to An for data transfer with CPU through high-speed accessing buses, terminals B1 to Bn for data transfer with a low-speed accessible device group through low-speed accessing buses, and several operators 12 for logic operation with specific internal circuitry provided between the terminals A1 to An and B1 to Bn.

The sign "*" indicates a logic-level-inverted signal. For example, the signal *OE as the input/output command signal is a signal whose logic level is an inverted-version of a signal OE. The sign OE is an abbreviation of Output Enable. The sign "n" in the terminals A1 to An and B1 to Bn is a positive integer.

Disclosed below for the operators 12 in FIG. 41 is only for the operator 12 provided between the terminals A1 and B1 because all of the operators 12 have the same circuit configuration.

The operator 12 is equipped with a first-directional-signal processor including a first input buffer 13 made up of an inverter INV1 for accepting a signal from the terminal A1; an A/B-internal circuit 14 made up of an inverter INV2 for signal processing in a direction from the terminals A1 to B1 (called a first direction); and a first output buffer 15 for outputting a signal from the A/B-internal circuit 14 to the terminal B1, having a NAND-logic circuit NAND1, a NOR-logic circuit NOR1, a P-channel transistor P1, and an N-channel transistor N1.

The operator 12 is equipped further with a second-directional-signal processor including a second input buffer 16 made up of an inverter INV3 for accepting a signal from the terminal B1; a B/A-internal circuit 17 made up of an inverter INV4 for signal processing in a direction from the terminals B1 to A1 (called a second direction); and a second output buffer 18 for outputting a signal from the B/A-internal circuit 17 to the terminal A1, having a NAND-logic circuit NAND2, a NOR-logic circuit NOR2, a P-channel transistor P2, and an N-channel transistor N2.

All of the terminals A1 to An and B1 to Bn are input and also output terminals. Input via a terminal *OE is the input/output command signal *OE for switching the bus buffer 10 between a signal-output mode and a high-impedance state at the input and output terminals. Input via a terminal DIR is the direction-indicating signal DIR for switching the bus buffer 10 for input/output directions. Disclosed next is an operation of the bus buffer 10 shown in FIG. 41.

The controller 11 in FIG. 41 generates signals *AG, AG, *BG and BG in response to the input/output command signal *OE and the direction-indicating signal DIR input via the terminals *OE and DIR, respectively. It is assumed that the signal *OE is at a low level whereas the signal DIR at a high level so that a signal is allowed to be input via the terminal A1 and output via the terminal B1. The signal input via the terminal A1 is then transferred to the transistors P1 and N1 via the inverter INV1 of the first input buffer 13, the inverter INV2 of the A/B internal circuit 14, and NAND1 and NOR1 of the first output buffer 15, and output via the terminal B1.

The signal at the terminal B1 is not only output but supplied to one of two terminals of NAND2 and also NOR2 of the second output buffer 12 via INV3 of the second input buffer 16 and INV4 of the B/A internal circuit 17 from a node connected to the terminal B1, thus these logic circuits are inevitably activated. A gate signal to the transistor P2 is, however, set at a high level whereas that to the transistor N2 is set at a low high level due to a low level for the signal BG whereas a high level for the signal *BG. The transistors P2 and N2 of the second output buffer 18 are thus turned off, so that no signals will be output via the terminal A1.

The bus buffer 10, however, consumes power due to unwanted currents passing through the activated logic circuits. TABLE 1 in FIG. 42 shows logic levels at the terminals A1 and B1 and modes of the respective circuits. It is indicated in TABLE 1 that the second-directional-signal processor is in operation even when a signal is transferred in the first direction whereas the first-directional-signal processor is in operation even when a signal is transferred in the second direction. Moreover, even when the first and second output buffers 15 and 18 are out of operation, the NAND- and NOR-logic circuits at the anterior stage to these output buffers are performing logical operations.

Furthermore, signals input to both terminals A1 and B1 simultaneously activate all of the first input buffer 13, the A/B-internal circuit 14, the second input buffer 16, and the B/A-internal circuit 17, thus causing high power consumption. This will happen even when the terminals A1 and B1 are in the high-impedance state (*OE=H), irrespective of the logic level of the signal DIR.

A first bus-hold circuit 19a and a second bus-hold circuit 19b enclosed in a dot-line block are provided for solving the problem discussed above. The bus-hold circuit 19a is made up of two inverters connected between the first output buffer 15 and the terminal B1. The bus-hold circuit 19b is made up of two inverters connected between the second output buffer 18 and the terminal A1. The two inverters for both bus-hold circuits 19a and 19b are cross-coupled to each other.

Disclosed with respect to TABLE 2 in FIG. 43 is an operation of the bus buffer 10 equipped with the first and the second bus-hold circuits 19a and 19b. TABLE 2 in FIG. 43 shows logic levels at the terminals and modes of the respective circuits. TABLE 2 is identical with TABLE 1 except the first and the second bus-hold circuits 19a and 19b. The bus-hold circuits 19a and 19b should be in operation only when the input/output command signal *OE is at a high level. It is indicated in TABLE 2, however, that the bus-hold circuits 19a and 19b are both in operation even when the input/output command signal *OE is at a low level. Signal transfer from the terminals A1 to B1 while the bus-hold circuits 19a and 19b are in operation causes current consumption even if there is no need of bus holding.

As discussed above, such bus-hold circuits for protecting terminals, via which signals are to be input in specific directions, from being in high-impedance state are of no use for the bus buffer. Because all circuits in the bus buffer will be inevitably in operation, thus causing unnecessary power consumption, against the aim of low power consumption in applications such as PDA. Such an arrangement thus has a problem of inefficient reduction in power consumption.

SUMMARY OF THE INVENTION

A purpose of the present invention is to provide a bus buffer having logic circuitry with less unnecessary power consumption by holding input to input buffers at a certain level, thus achieving further low power consumption.

A bus buffer having logic circuitry according to the first aspect of the present invention includes: a controller, provided between a plurality of two-way data buses through which at least one data signal is transferred, to generate a plurality of different control signals based on an input/output command signal instructing input/output of the data signal and a direction-indicating signal indicating a direction in which the data signal is to be transferred; a first terminal via which a first-directional signal to be transferred from a first bus side to a second bus side is input whereas a second-directional signal to be transferred from the second bus side to the first bus side is output; a second terminal via which the first-directional signal is output whereas the second-directional signal is input; a first-directional signal processor, provided between the first and second terminals, having a first input buffer, a first internal circuit and a first output buffer; and a second-directional signal processor, provided between the second and first terminals, having a second input buffer, a second internal circuit and a second output buffer, wherein the first input buffer has a first input holder to disactivate the first internal circuit and the first output buffer by using at least one of the control signals in accordance with states of the input/output command signal and the direction-indicating signal, and the second input buffer has a second input holder to disactivate the second internal circuit and the second output buffer by using the at least one control signal in accordance with the states.

A bus buffer having logic circuitry according o the second aspect of the present invention includes: a controller, provided between a plurality of one-way data buses through which at least one data signal is transferred, to generate a plurality of different control signals based on an input/output command signal instructing input/output of the data signal; an input terminal via which a one-way signal to be transferred from a first bus side is input; an input buffer connected to the input terminal; an internal circuit connected to the input buffer; an output buffer connected to the internal circuit; an output terminal via which an output signal of the output buffer is output to a second bus side, wherein the input buffer has a logic circuitry to perform a logic operation by using one of the control signals having a specific level and the data signal input via the input terminal, to activate the internal circuit and the output buffer, thus outputting a result signal via the output terminal, whereas to disactivate the internal circuit and the output buffer when the data signal is not input via the input terminal.

BRIEF DESCRIPTION OF DRAWINGS

FIG. 3 shows a block diagram of the bus buffer having logic circuitry according to the first embodiment in the present invention;

FIG. 4 shows a table indicating modes of the bus buffer according to the first embodiment in the present invention;

FIG. 8 shows a block diagram of a bus buffer having logic circuitry according to the fourth embodiment in the present invention;

FIG. 9 shows a table indicating modes of the bus buffer according to the fourth embodiment in the present invention;

FIG. 42 shows TABLE 1 indicating modes of the well-known bus buffer; and

FIG. 43 shows TABLE 2 indicating modes of a well-known bus buffer having bus-hold circuits.

DETAILED DESCRIPTION OF PREFERRED EMBODIMENTS

Figure 1:
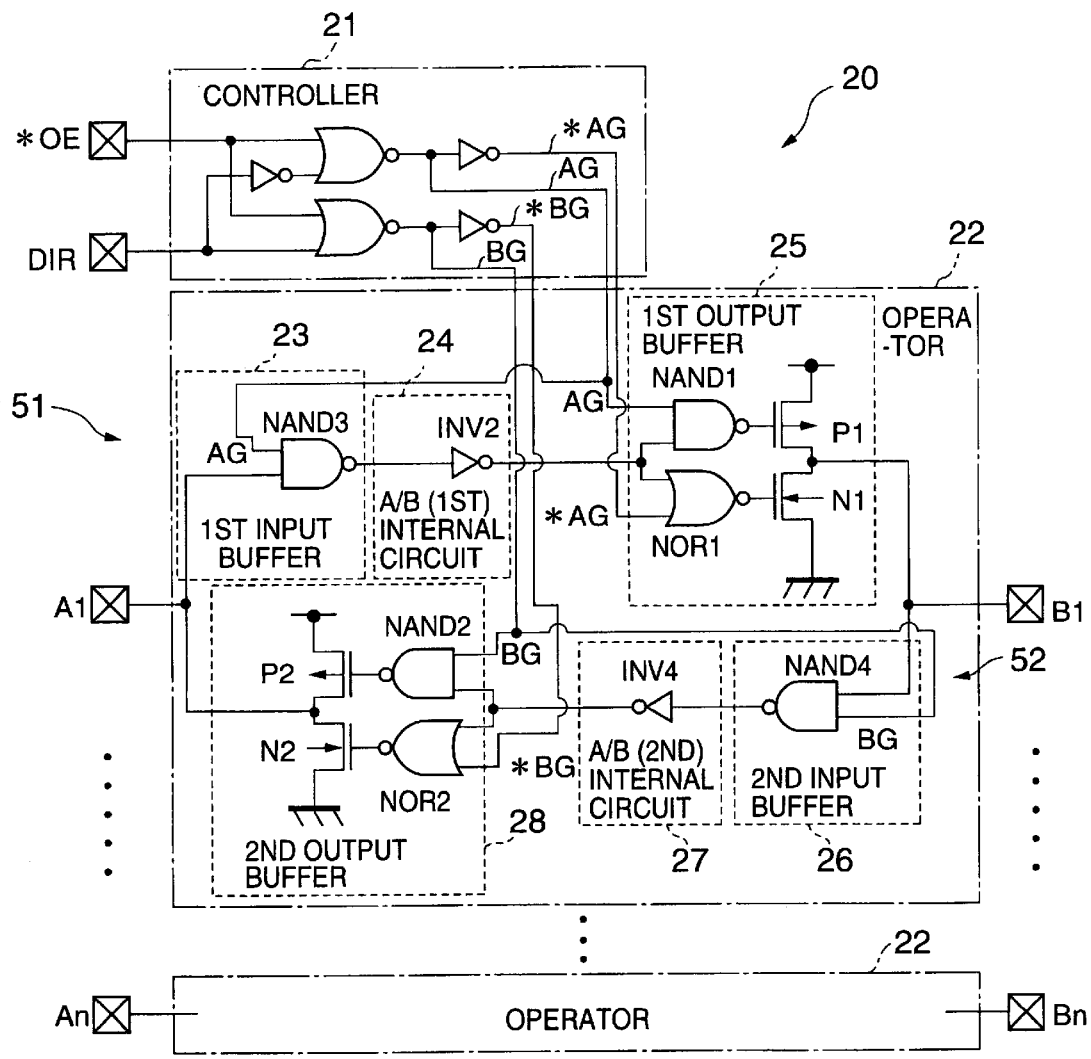
FIG. 1 shows a logic circuit diagram of a bus buffer having logic circuitry according to the first embodiment in the present invention.
Figure 2:
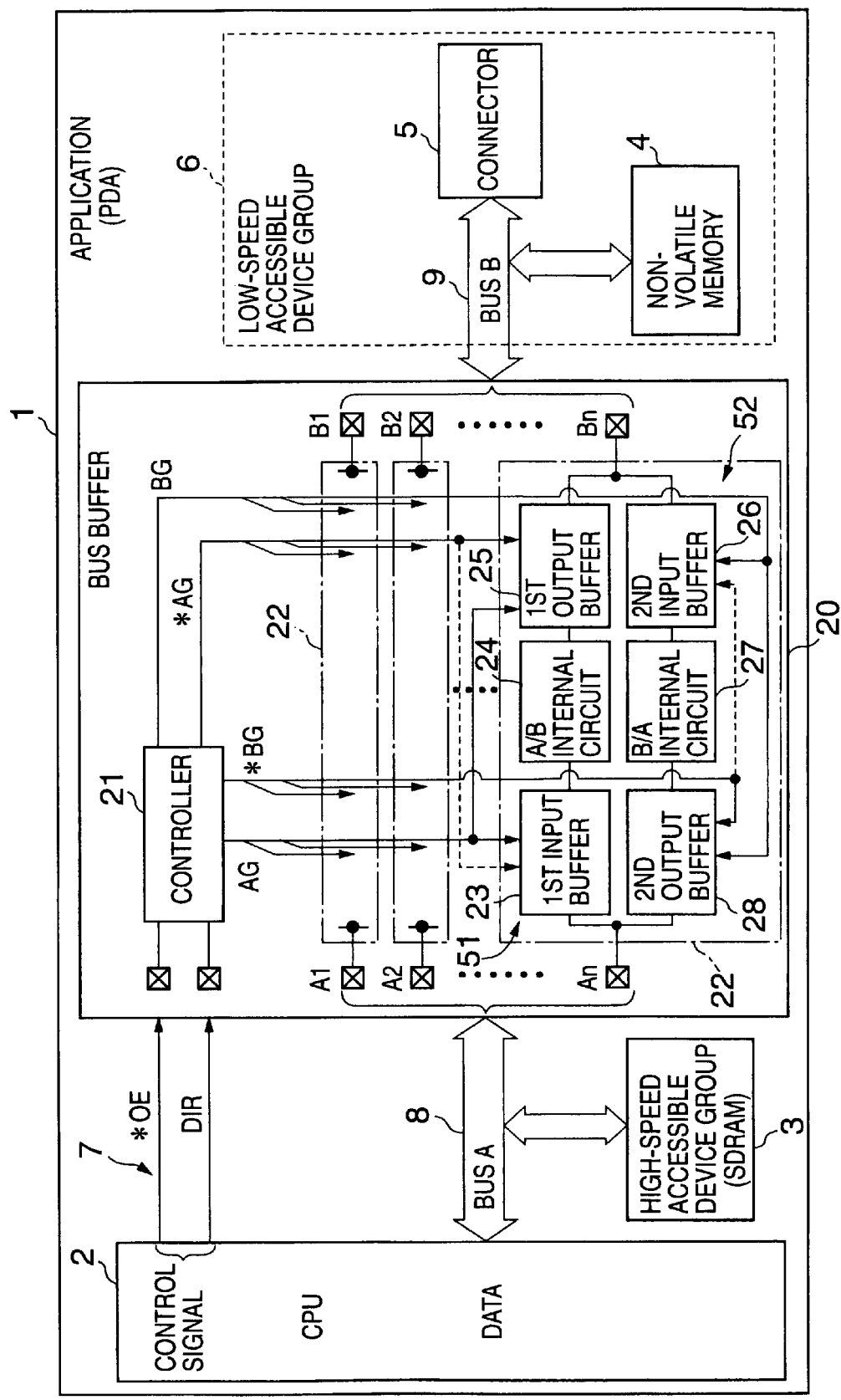
FIG. 2 shows an overall block diagram of an application to which the present invention is applied.

Preferred embodiments of bus buffer having logic circuitry according to the present invention will be disclosed with reference to the attached drawings. FIG. 1 shows a logic circuit diagram of a bus buffer having logic circuitry according to the first embodiment in the present invention. FIG. 2 shows an overall block diagram of an application to which the present invention is applied. FIG. 3 shows a block diagram of the bus buffer according to the first embodiment in the present invention. FIG. 4 shows TABLE 3 indicating modes of the bus buffer according to the first embodiment in the present invention.

The bus buffer according to the present invention is applied to an application such as PDA (Personal Digital Assistant) shown in FIG. 2. An application (PDA) 1 has a CPU (Central Processing Unit) 2 for data transfer with memories, peripheral devices, and so on, through many bus (signal) lines. The peripheral devices are connected to the busses in tree structure. The peripheral devices are a high-speed accessible device group 3 including high-speed accessible SDRAM (Synchronous Dynamic Random Access Memory) and a low-speed accessible device group 6 including devices accessible at low speed which are nonvolatile memory 4 and a connector 5 for connection of external peripheral devices.

When all these peripheral devices are driven by the CPU 2, not only the high-speed accessible device group 3 but also the low-speed accessible device group 6 are driven, thus increasing power consumption which depends on device input capacity, etc., as already discussed. Provided for solving such a problem are a high-speed accessing bus A8 and a low-speed accessing bus B9, which are usually used as an external bus 7 for connecting the peripheral devices and the CPU 2, and also a bus buffer 20 interposed between the buses A8 and B9, made up of a buffer such as an isolation buffer, for external-bus isolation.

The bus buffer 20 provided as an isolation buffer for isolating the high-speed accessing bus A8 and the low-speed accessing bus B9 from each other, which are used as the external bus 7 for the high-speed accessible device group 3 including SDRAMs requiring high-speed accessibility and the low-speed accessible device group 6 to be accessed at low speed, offers low power consumption in the application 1 such as PDA. In detail, the bus buffer 20, the isolation buffer, deactivates the low-speed accessible device group 6 while the high-accessible device group 3 such as SDRAMs are being accessed at high speed, thus achieving low power consumption.

The bus buffer 20 shown in FIG. 2 is equipped with a controller 21 for generating several control signals at different logic levels in response to CPU-control signals 7 including an input/output command signal *OE from the CPU 2 and a direction-indicating signal DIR, terminals A1 to An for data transfer with the CPU 2 through the high-speed accessing bus 8, terminals B1 to Bn for data transfer with the low-speed accessible device group 6 through the low-speed accessing bus 9, and several operators 22 for logic operation with specific internal circuitry provided between the terminals A1 to An and B1 to Bn.

The bus buffer 20 is equipped with the controller 21 and several operators 22, provided between several data buses 8 and 9 for two-way transfer of data signals at deferent speeds, as shown in FIGS. 2 and 3. The controller 21 generates several control signals *AG, AG, *BG and BG in response to at least an input/output command signal *OE for instructing input/output of the data signals and also a direction-indicating signal DIR for indicating a direction in which the data signals are to be transferred. The operators 22 perform two-way signal processing in response to the controls signals supplied from the controller 21.

Each operator 22 is equipped with a first-directional-signal processor 51 for processing data input from the high-speed accessible device group 3 and outputting the processed data to the low-speed accessible device group 6, and a second-directional-signal processor 52 for processing data input from the low-speed accessible device group 6 and outputting the processed data to the high-speed accessible device group 3.

The first-directional-signal processor 51 includes first terminals A1 to An via which a signal to be transferred in a first direction 29 from the bus 8 to the bus 9 is input whereas a signal to be transferred in a second direction 30 from the bus 9 to the bus 8 is output; second terminals B1 to Bn via which the first-directional signal is output whereas the second-directional signal is input; a first input buffer 23 provided between each of the first terminals A1 to An and the corresponding second terminals B1 to Bn, and connected to each first terminal; a first internal circuit 24 connected to the first input buffer 23; and a first output buffer 25 connected to the first internal circuit 24.

The second-directional-signal processor 52 includes a second input buffer 26 provided between each of the second terminals B1 to Bn and the corresponding first terminals A1 to An, and connected to each second terminal; a second internal circuit 27 connected to the second input buffer 26; and a second output buffer 28 connected to the second internal circuit 27. As disclosed, in the logic circuitry-implemented two-way bus buffer 20, the first input buffer 23, the first internal circuitry 24, and the first output buffer 25 constitute the first-directional-signal processor 51 whereas the second input buffer 26, the second internal circuitry 27, and the second output buffer 28 constitute the second-directional-signal processor 52.

The first input buffer 23 has a first input holder for disactivating the first internal circuitry 24 and the first output buffer 25 in accordance with the logic states of the input/output command signal *OE and the direction-indicating signal DIR by using at least the signal AG among the several control signals AG, *AG, BG, and *BG. The second input buffer 26 has a second input holder for disactivating the second internal circuitry 27 and the second output buffer 28 in accordance with the logic states of the input/output command signal *OE and the direction-indicating signal DIR by using at least one of the several control signals AG, *AG, BG, and *BG.

Disclosed next with respect to the logic circuit diagram shown in FIG. 1 is a detailed configuration of the bus buffer 20 according to the first embodiment. In FIG. 1, the controller 21 is equipped, for generating the four control signals AG, *AG, BG and *BG in response to the signals *OE and DIR input via the terminals *OE and DIR, with a NOR circuit for a NOR operation to the signal DIR for which the logic level has been inverted by an inverter and the signal *OE, to generate the signal AG; an inverter for inverting the logic level of the signal AG to generate the signal *AG; another NOR circuit for a NOR operation to the signals *OE and DIR to generate the signal BG; and another inverter for inverting the logic level of the signal BG to generate the signal *BG.

Disclosed first is the first-directional-signal processor 51 among the circuits implemented in each operator 22. The first input buffer 23 has a first NAND-logic circuit NAND3 for a NAND operation to a signal input via the terminal A1 and the first control signal AG supplied by the controller 21, to hold the signal input via the terminal A1 at a certain level. The first NAND-logic circuit NAND3 functions as the first input holder. The first (A/B) internal circuit 24 is made up of an inverter INV2 in the first embodiment shown in FIG. 1, which may, however, be made up of any logic circuitry for performing a specific logical operation. The inverter INV2 inverts the logic level of a signal while output by the first NAND-logic circuit NAND3.

The first output buffer 25 is equipped with a second NAND-logic circuit NAND1 for a NAND operation to one input, the signal output by the inverter V2 of the (A/B) internal circuit 24, and another input, the control signal AG from the controller 21; a P-channel transistor P1 via the gate of which the output of NAND1 is input; a first NOR-logic circuit NOR1 for a NOR operation to one input, the signal output by the inverter V2 of the (A/B) internal circuit 24, and another input, the second control signal *AG from the controller 21; and an N-channel transistor N1 via the gate of which the output of NOR1 is input.

Disclosed next is the second-directional-signal processor 52. The second input buffer 26 has a third NAND-logic circuit NAND4 for a NAND operation to a signal input via the terminal B1 and the third control signal BG supplied by the controller 21, to hold the signal input via the terminal B1 at a certain level. The third NAND-logic circuit NAND4 functions as the second input holder. The second (B/A) internal circuit 27 is made up of an inverter INV4 in the first embodiment shown in FIG. 1, which may, however, be made up of any logic circuitry for performing a specific logical operation. The inverter INV4 inverts the logic level of a signal while output by the third NAND-logic circuit NAND4.

The second output buffer 28 is equipped with a fourth NAND-logic circuit NAND2 for a NAND operation to one input, the signal output by the inverter V4 of the (B/A) internal circuit 27, and another input, the third control signal BG from the controller 21; a P-channel transistor P2 via the gate of which the output of NAND2 is input; a second NOR-logic circuit NOR2 for a NOR operation to one input, the signal output by the inverter V4 of the (B/A) internal circuit 27, and another input, the fourth control signal *BG from the controller 21; and an N-channel transistor N2 via the gate of which the output of NOR2 is input.

Disclosed next is an operation of the bus buffer 20 having the configuration described above according to the first embodiment. It is assumed that the signal *OE is at a low level whereas the signal DIR at a high level so that a signal is allowed to be input via the terminal A1 and output via the terminal B1. In response to the input/output command signal *OE and the direction-indicating signal DIR, the controller 21 generates the first to fourth control signals AG, *AG, BG and *BG at high, low, low and high levels, respectively, which are supplied to the operators 22.

A high-level input signal at the terminal A1 and the high-level control signal AG are input to NAND3 of the first input buffer 23, and then the input signal is transferred through NAND3, INV2, NAND1 and NOR1 to the transistors P1 and N1, thus being output via the terminal B1. The output signal at the terminal B1 is further supplied to the second input buffer 26 of the second-directional-signal processor 52. It is, however, blocked at the input of NAND4 due to the low-level control signal BG, thus not being supplied to the B/A (second) internal circuit 27 which is then disactivated. In detail, the output of NAND4 is held at a low level, and then the outputs of INV4, NAND2 and NOR2 are held at a low level, thus the B/A internal circuit 27 (INV4, NAND2 and NOR2) generating less current and hence achieving low power consumption.

On the contrary, when a signal is input via the terminal B1 and then output via the terminal A1, the controller 21 generates the first to fourth control signals AG, *AG, BG and *BG at low, high, high and low levels, respectively, in response to a low-level input/output command signal *OE and also a low-level direction-indicating signal DIR. The operation of the bus buffer 20 is the inverse version of that in the first direction 29 described above.

The signal is transferred from NAND4 of the second input buffer 26, INV4 of the B/A internal circuit 25, NAND2 and NOR2 of the output buffer 28, all in operation, to the transistors P1 and N1, thus being output via the terminal A1. The output signal is further supplied to one input of NAND3 of the first input buffer 23. The output of NAND3 is, however, held at a low level due to the low-level signal AG at the other input of NAND3. The signal is thus not supplied to the first internal circuit 24 and the first output buffer 25 which are then disactivated.

The high-impedance state (*OE=H) at the terminals A1 and B1 forces the first and the third control signals AG and BG to be set at a low level, thus disactivating NAND3 and NAND4. This state allows the input buffers 23 and 26 to be in operation whereas disactivates the internal circuits 24 and 27 and the output buffers 25 and 38 in both first and second directions 29 and 30, thus offering the same advantage the same as under the low-level input/output command signal *OE.

As disclosed above, the signal input via the terminal A1 is supplied from the first input buffer 23 to the A/B internal circuit 24 for a specific logical operation and output at the terminal B via the first output buffer 25. In the first embodiment, the third control signal BG supplied to the second output buffer 26 disactivates the second input buffer 26 so that no signals output via the terminal B can be supplied to the internal circuitry, thus suppressing generation of excess current and hence achieving low power consumption.

The modes of the internal circuitry are shown in TABLE 3 of FIG. 4. TABLE 3 teaches that the first input buffer, the A/B internal circuit and the first output buffer constituting the first-directional-signal processor 51 are in operation whereas the second input buffer, the B/A internal circuit and the second output buffer constituting the second-directional-signal processor 52 are out of operation against the signal being transferred in the first direction; on the contrary, the second input buffer, the B/A internal circuit and the second output buffer constituting the second-directional-signal processor 52 are in operation whereas the first input buffer, the A/B internal circuit and the first output buffer constituting the first-directional-signal processor 51 are out of operation against the signal being transferred in the second direction.

It is noted that FIG. 4 indicates "OUT OF OPERATION" for both first and second input buffers against the high-level signal *OE even though the input-side logic circuitry of both input buffers is actually in operation under this state of signal *OE. This indication is based on the presumption that the first and the second input buffers are out of operation when viewed from the output side because no charging currents are flown through the initial-stage logic circuitry of the input holder of each input buffer. This is also true for the other circuits shown in FIG. 4, and hence the indication "OUT OF OPERATION" is applied to any circuitry when no signals appear at the output thereof even through a part of the circuitry is actually in operation.

The high-impedance state (*OE=H) at the terminals A and B allows the first and the second input buffers 23 and 26 only to be in operation, in other words, the first- and the second-directional processors are out of operation due to low level at the output. The bus buffer 20 requires no specific circuitry for bus holding against high-impedance state input/output at the terminals A and B, and hence achieving low power consumption and also simplified circuit configuration.

As disclosed in detail, the bus buffer according to the first embodiment functions such that the input buffer, internal circuit and output buffer, for the input signal to be transferred in a particular direction, are in operation whereas the other input buffer, internal circuit and output buffer for the input signal to be transferred in the opposite direction, are out of operation. Moreover, the bus buffer according to the first embodiment activates the input buffers whereas disactivates the internal circuits and the output buffers against high-impedance state at the input/output terminals A and B. Therefore, the first embodiment achieves low power consumption and simplified circuit configuration.

The bus buffer according to the first embodiment includes NAND3 and NAND4 for the first and the second input buffers 23 and 26, respectively. Not only the NAND-logic circuitry, any other types of logic circuitry can be implemented in the present invention. One candidate is the combination of clocked inverters and inverters such as shown in FIG. 5, which can also hold the input at a certain level in response to the control signals from the controller.

Figure 5:
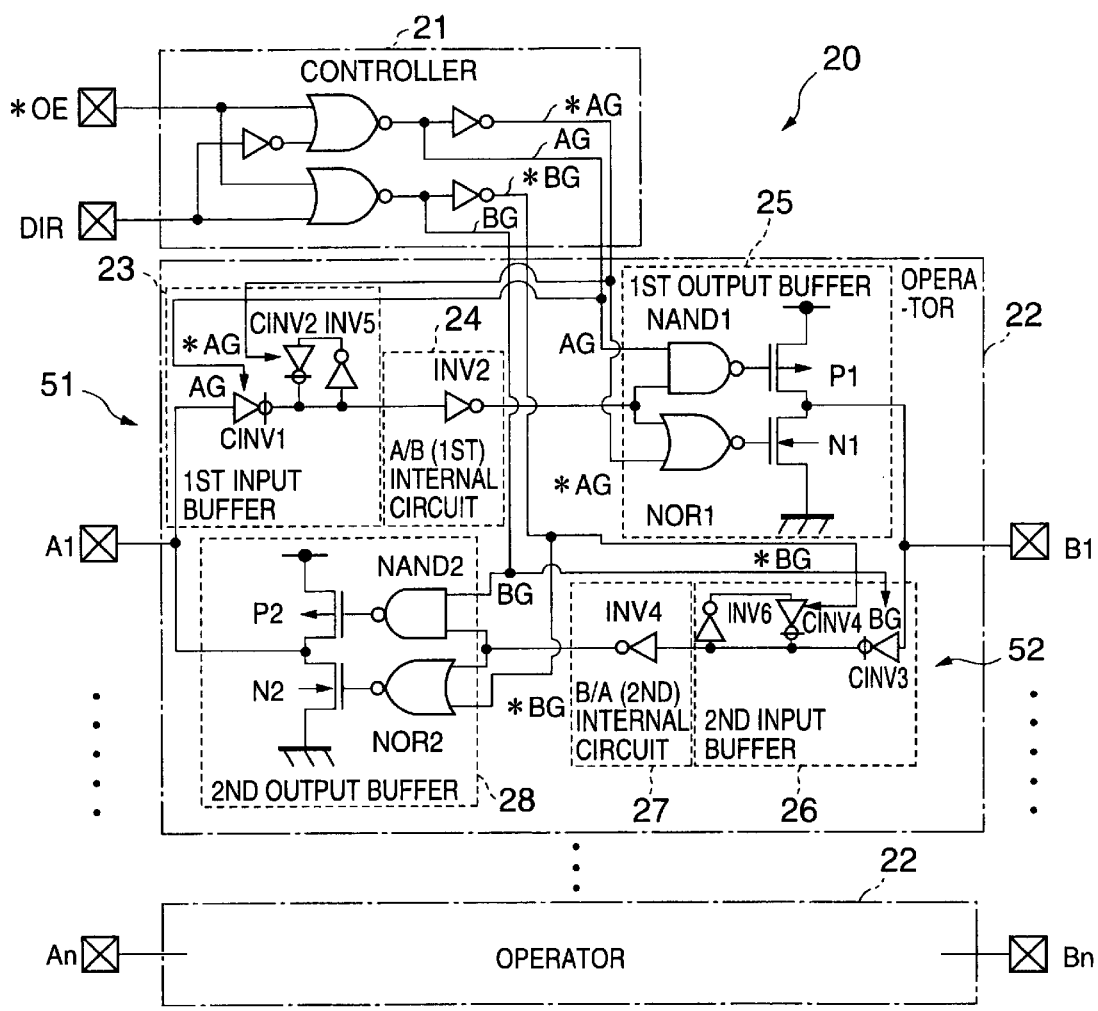
FIG. 5 shows a logic circuit diagram of a bus buffer having logic circuitry according to the second embodiment in the present invention.

FIG. 5 shows a logic circuit diagram of a bus buffer according to the second embodiment. The first input buffer 23 has a first clocked inverter CINV1 for inverting a signal input via the terminal A1 in response to the first control clock signal AG, an inverter INV5 for inverting the output of CINV1, and a second clocked inverter CINV2 for inverting the output of INV5 and outputting the inverted signal in response to the second control clock signal *AG. The inverters INV5 and CINV2 are cross-coupled each other in parallel with the signal line from the terminal A1.

The second input buffer 26 has a third clocked inverter. CINV3 for inverting a signal input via the terminal B1 in response to the third control clock signal BG, an inverter INV6 for inverting the output of CINV3, and the fourth clocked inverter CINV4 for inverting the output of INV6 and outputting the inverted signal in response to a fourth control clock signal *BG. The inverters INV6 and CINV4 are cross-coupled each other, in parallel with the signal line from the terminal B1.

Disclosed next is an operation of the bus buffer having the configuration described above according to the second embodiment. It is assumed that the signal *OE is at a low level whereas the signal DIR at a high level so that a signal is allowed to be input via the terminal A and output via the terminal B. The controller 21 generates first to fourth control signals AG, *AG, BG and *BG at high, low, low and high levels, respectively, which are supplied to the operators 22.

A signal at the terminal A1 is inverted by the first clocked inverter CINV1 of the first input inverter 23 in response to the high-level first control clock signal AG while the second clocked inverter CINV2 is out of operation due to the low-level second control clock signal *AG. The signal input via the terminal A1 is then transferred through the first-directional-signal processor 51 and output via the terminal B1 while the third clocked inverter CINV3 of the second input buffer 26 is out of operation due to the low-level third control clock signal BG, and hence the second-directional-signal processor 52 is out of operation.

On the contrary, when a signal is input via the terminal B1 and then output via the terminal A1, the controller 21 generates the first to fourth control signals AG, *AG, BG and *BG at low, high, high and low levels, respectively, in response to a low-level input/output command signal *OE and also a low-level direction-indicating signal DIR. The input signal is transferred to in a direction of the terminal A1 via the third clocked inverter CINV3 in response to the third control clock signal BG while the second-directional-signal processor 52 is in operation whereas the first-directional-signal processor 51 is out of operation due to low-level first control clock signal AG to the first clocked inverter CNIVI of the first input buffer 23.

The high-impedance state (*OE=H) at the terminals A1 and B1 forces the first and the third control signals AG and BG to be set at a low level. This state inhibits both first and the third clocked inverters CINV1 and CINV3 from transferring signals at the terminals A1 and B1, respectively. Therefore, both first- and second-directional-signal processors 51 and 52 are out of operation except that the initial-stage clocked inverters of the first and the second input buffers are performing logical operations, due to no input to each processor, the same as discussed with respect to TABLE 3 in FIG. 4.

As disclosed above, the bus buffer incorporating the combination of clocked inverters and inverters in the input buffer logic circuitry offers low power consumption and simplified circuit configuration, like the first embodiment. Moreover, this embodiment requires no particular control signals for switching the input buffers between a current-pass-through mode and an input-holding mode, which can be achieved with control signals used in the well-known circuitry.

The first and the second embodiments of bus buffer are different in that the former employs only the first control signal AG to the first input buffer 23 and also only the third control signal BG to the second input buffer 26 whereas the latter employs the first and the second control signals AG and *AG to the counterpart first input buffer and also the third and the fourth control signals BG and *BG to the counterpart second input buffer. Both embodiments, nevertheless, employ the control signals as they are used in the well-known circuitry.

The bus buffer in each of the first and the second embodiments accepts an input signal directly to the input buffer via the terminal A1 or B1. Not only that, additional buffering devices can be implemented between the terminals A1 and B1, and the corresponding input buffers in this invention.

Figure 6:
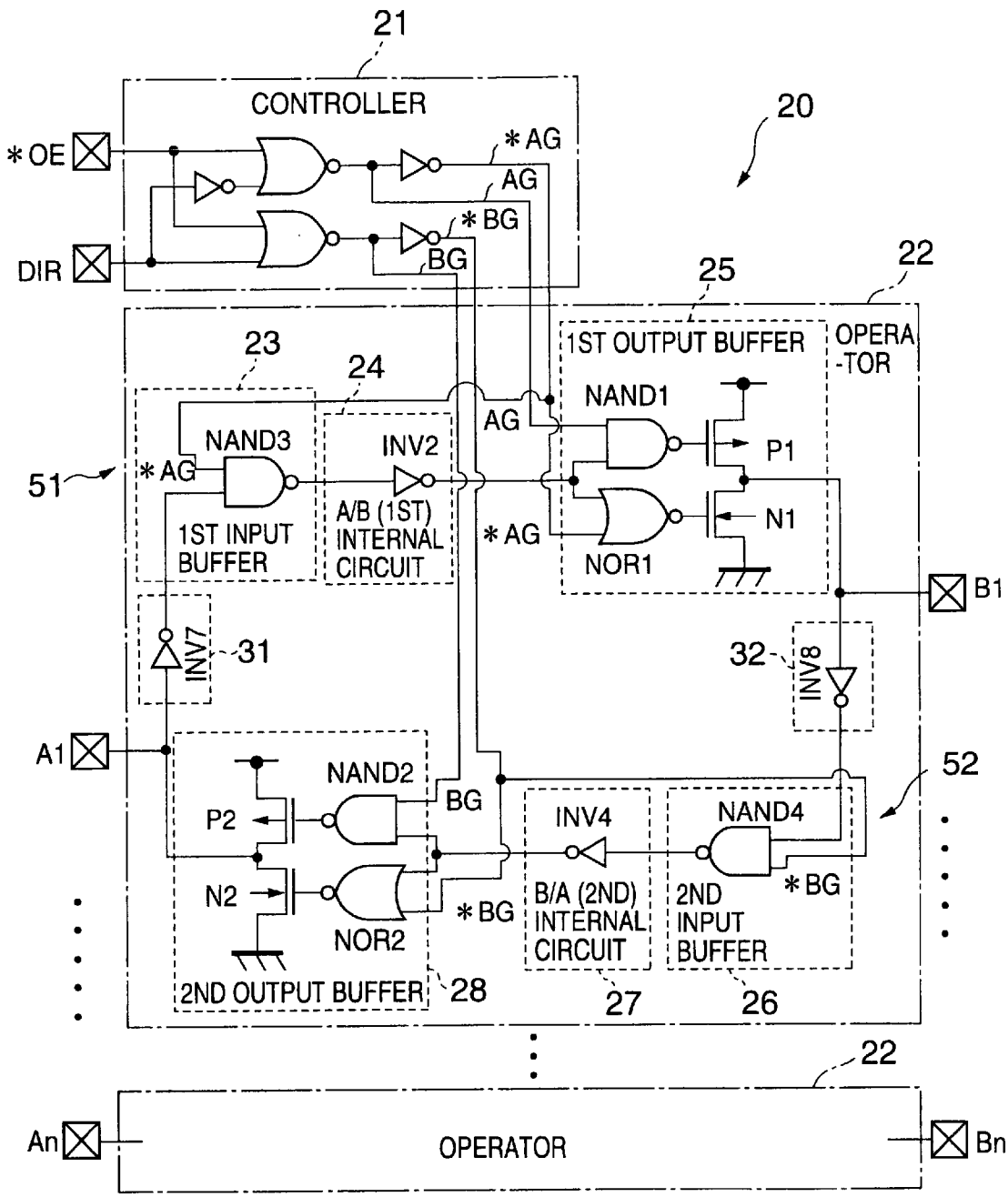
FIG. 6 shows a logic circuit diagram of a bus buffer having logic circuitry, with inverters as buffering circuits, according to the third embodiment in the present invention.

FIG. 6 shows a logic circuit diagram of a bus buffer having inverters as first and second buffering circuits between input/output terminals and input buffers according to the third embodiment.

Inverters INV7 and INV8 are interposed between the terminal A1 and the first input buffer 23, and the terminal B1 and the second input buffer 26, respectively, as shown in FIG. 6. This arrangement requires the second control signal *AG to NAND43 as the input holder of the first input buffer 23 and also the fourth control signal *BG to NAND4 as the input holder of the second input buffer 26, for the operation the same as the first embodiment. The other configuration except this arrangement for the third embodiment is the same as the first embodiment.

Figure 7:
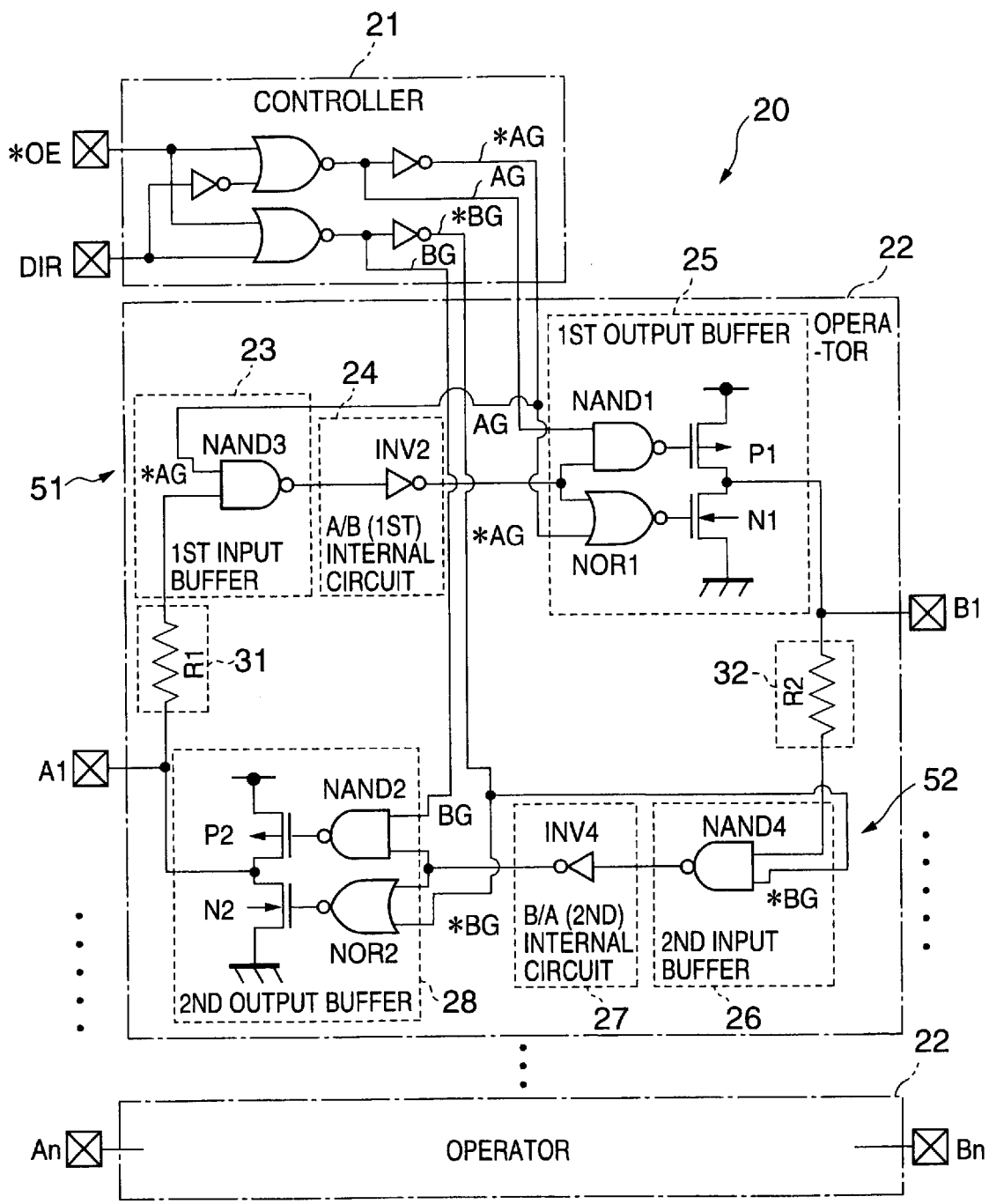
FIG. 7 shows a modification to the bus buffer having logic circuitry according to the third embodiment in the present invention, provided with resistors as buffering circuits.

The buffering circuit for the third embodiment may, for example, be just a resistor instead of the inverters INV7 and INV8 as the first and the second buffering circuits 31 and 32, respectively. Shown in FIG. 7 is a modification provided with resistors R1 and R2 as the first and the second buffering circuits 31 and 32, respectively. The other configuration for this modification is the same as that in FIG. 6, thus the explanation thereof being omitted for brevity. The minimum requirement for this modification is that no signals be directly input to the input buffers via the bus A or B. Only one buffering circuit (resistor) may be provided either the terminal A1 side or the terminal B1 side. In detail, the resistor R1 only can be provided as the buffering circuit 31 against signals from the high-speed bus for high-speed access use.

The bus buffers according to the first to the third embodiments allow the internal circuit and the output buffer to be in operation for signals to be processed in a particular direction whereas force the other internal circuit and output buffer to be out of operation for signals in the opposite direction. In addition, bus-hold circuits may be implemented for not only forcing the internal circuits and the output buffers to be out of operation but also keeping the previous logic states when both input and output terminals are in the high-impedance state.

The known buffer shown in FIG. 43 is also provided with cross-coupled inverters as bus-hold circuits provided between the output terminals and the output buffers. A bus buffer according to the fourth embodiment is, however, different from the known bus buffer in that bus-hold circuits in the fourth embodiment are controlled by control signals from the controller, which will be disclosed in detail.

Figure 10:
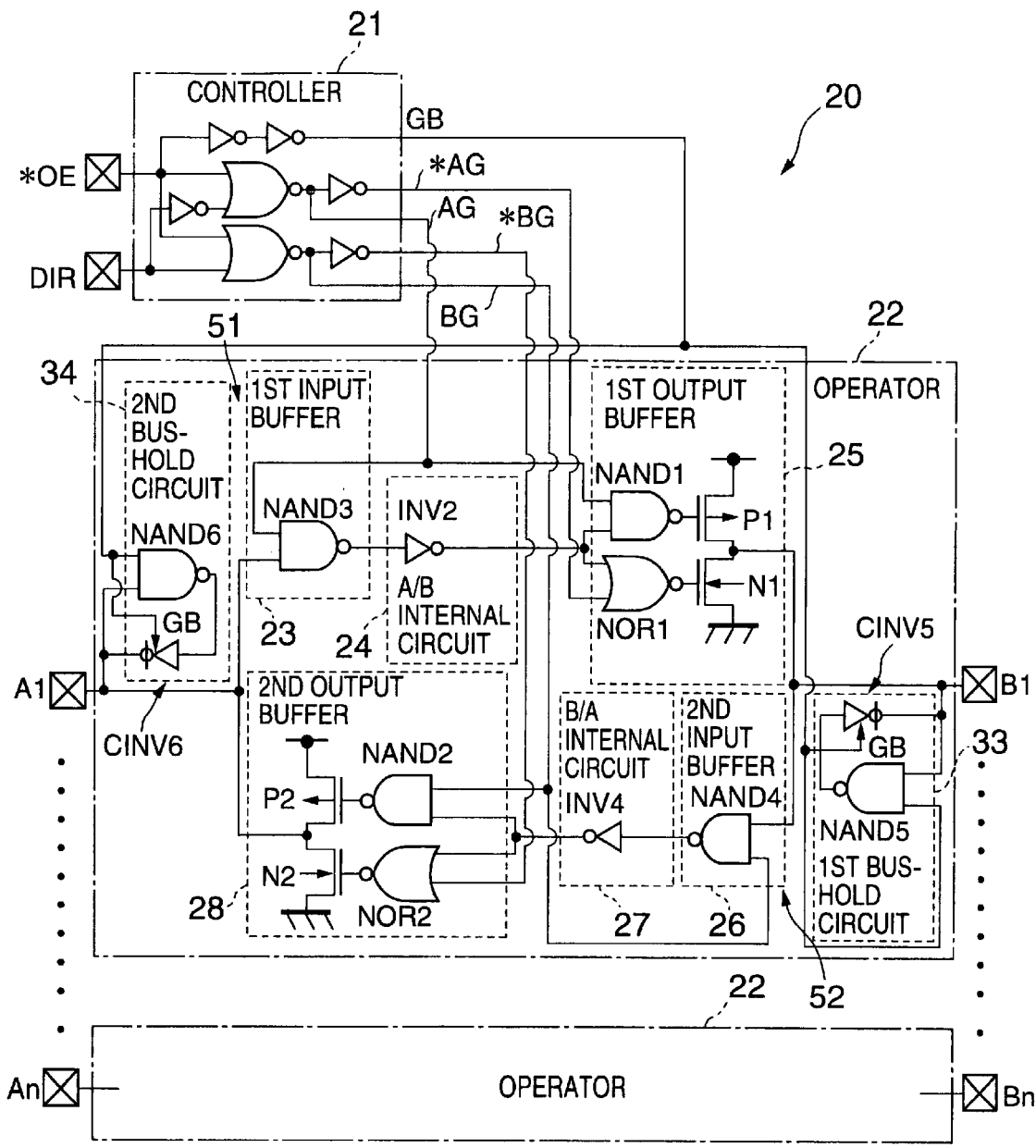
FIG. 10 shows a logic circuit diagram of the bus buffer having logic circuitry according to the fourth embodiment in the present invention.

FIGS. 8 to 10 show a block diagram, a table of operation modes for the corresponding circuitry, and a logic circuit diagram, respectively, for a bus buffer according to the fourth embodiment. The differences between the fourth embodiment and the first embodiment shown in FIG. 3 are that, in the former, a first bus-hold circuit 33 is implemented at the node at which the terminal B1 and the first output buffer 25 are connected and also a second bus-hold circuit 34 is implemented at the node at which the terminal A1 and the second output buffer 28 are connected, for keeping the previous logic states when both terminals A1 and B1 are in the high-impedance state.

Moreover, different from the known bus buffer, the fourth embodiment is arranged such that the first and the second bus-hold circuits 33 and 34 are allowed to be in operation for keeping the previous logic states, when required due to the high-impedance state to the input and output terminals, in response to control signals from the controller 21.

It is assumed that the signal *OE is at a low level whereas the signal DIR at a high level so that a signal is allowed to be input via the terminal A1 and output via the terminal B1. Like the first embodiment disclosed with reference to FIG. 3, in the bus buffer according to the fourth embodiment, a signal input via the terminal A1 is transferred from the first input buffer 23 and the A/B internal circuit 24 to the first output buffer 25, then output via the terminal B1.

The signal at the terminal B1 is further input to the initial stage of the second input buffer 26. The logic circuitry at the succeeding stages are, however, out of operation in response to the third control signal BG. Simultaneously with this, the bus-hold circuits 33 and 34 are also out of operation in response to at least one of the control signals from the controller 21 because both bus-hold circuits are unnecessary when the terminals A1 and B1 are not in the high-impedance state.

The signal input via the terminal B1 is transferred in the second direction 30 when the input/output command signal *OE and the direction-indicating signal DIR supplied to the controller 21 are both at a low level. In this signal transfer, the second-directional-signal processor 52 is in operation whereas the first-directional-signal processor 51 is in operation only at the initial stage of the input buffer 23 while the A/B internal circuit 24 and the first output buffer 25 are out of operation. The bus holder including the first and the second bus-hold circuits 33 and 34 are also disctivated by logical operation to the control signals from the controller 21 and the signals appearing at the output terminals of the acting signal processors.

As disclosed above, the bus buffer having the bus holder according to the fourth embodiment achieves disactivation of not only the internal circuit and the output buffer of the signal processor for signal transfer in an undesired direction but also the bus holder by using the control signals from the controller if the bus holder also does not need to be in operation.

FIG. 10 shows a logic circuit diagram of the bus buffer according to the fourth embodiment. The controller 21 is equipped with two inverters for generating the fifth control signal GB having the same logic level as the signal *OE in addition to the logic circuitry of the controller the same as that in the first embodiment.

The first bus-hold circuit 33 is connected in parallel to the node at which the first output buffer 25 and the input/output terminal B1 are connected. It is equipped with a NAND-logic circuit NAND5 for a NANMD operation to a signal output at the terminal B1 and the fifth control signal GB from the controller 21 and a clocked inverter CINV5 for inverting the output of NAND5 and generating the inverted signal in response to the fifth control clock signal GB.

The second bus-hold circuit 34 is connected in parallel to the node at which the second output buffer 28 and the input/output terminal A1 are connected. It is equipped with a NAND-logic circuit NAND6 for a NANMD operation to a signal output at the terminal A1 and the fifth control signal GB from the controller GB and a clocked inverter CINV6 for inverting the output of NAND6 and generating the inverted signal in response to the fifth control clock signal GB.

It is assumed that the signal *OE is at a low level whereas the signal DIR at a high level so that a signal is allowed to be input via the terminal A1 and output via the terminal B1, in this logic circuit diagram in FIG. 10. This logic state makes the control signal AG set at a high level, so that the signal input via the terminal A1 is transferred to the transistors P1 and N1 via NAND3, INV2, NAND1 and NOR1, and output via the terminal B1. The signal output at the terminal B1 is, however, blocked at the input of NAND4 due to the low-level control signal BG, thus the B/A internal circuit 27 and the second output buffer 28 being disactivated. This disactivation holds the output of NAND4 at a low level and hence holds the outputs of INV4, NAND2 and NOR2 at respective specific levels, thus lowering current consumption in the B/A internal circuit (INV4, NAND2 and NOR2) for low power consumption.

Moreover, the control signal GB forces NAND5, CINV5, NAND6 and CINV6 to be out of operation to suppressing current passing therethrough for further lower power consumption.

The same advantage is also given to signal transfer in which a signal is allowed to be input via the terminal B1 and output via the terminal A1. The high-impedance state at the terminals A1 and B1 (*OE=H) yields a low level to the control signals AG and BG, so that NAND3 and NAND4 are out of operation, thus power consumption being lowered. In addition, the high-impedance state yields a high level to the control signals GB, thus holding the terminals A1 and B1 in the previous states.

The bus buffer according to the fourth embodiment disclosed with reference to FIGS. 8 to 10 is equipped the bus holder having the two first and second bus-hold circuits 33 and 34 provided at the terminals B1 and A1, respectively. Not only that, however, only one bus-hold circuit may be provided at either terminal such as shown in FIGS. 11 and 12 for the fifth and the sixth embodiments.

Figure 11:
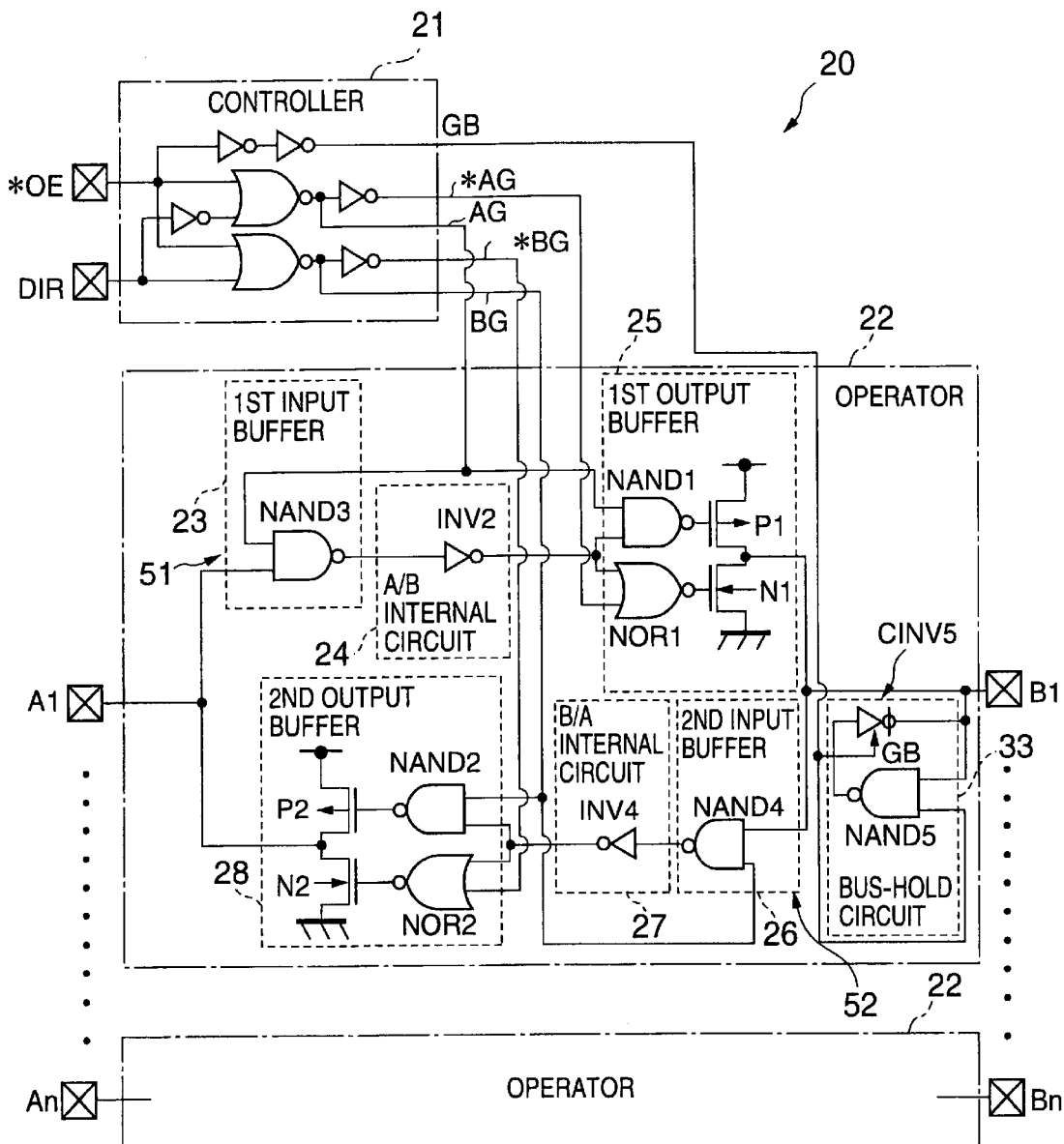
FIG. 11 shows a logic circuit diagram of a bus buffer having logic circuitry according to the fifth embodiment in the present invention.

FIG. 11 shows only one bus-hold circuit 33 at the terminal B1 for keeping the previous state. On the contrary, FIG. 12 shows only one bus-hold circuit 34 at the terminal A1 for keeping the previous state. Only one bus-hold circuit may particularly be provided at either terminal when both terminals tend to be in the high-impedance state against signals to be transferred in a specific direction when data-transfer speeds are different between the buses A and B. Such a bus-hold circuit has the same logic circuitry as that shown in FIG. 10, and hence the explanation thereof being omitted for brevity.

Figure 12:
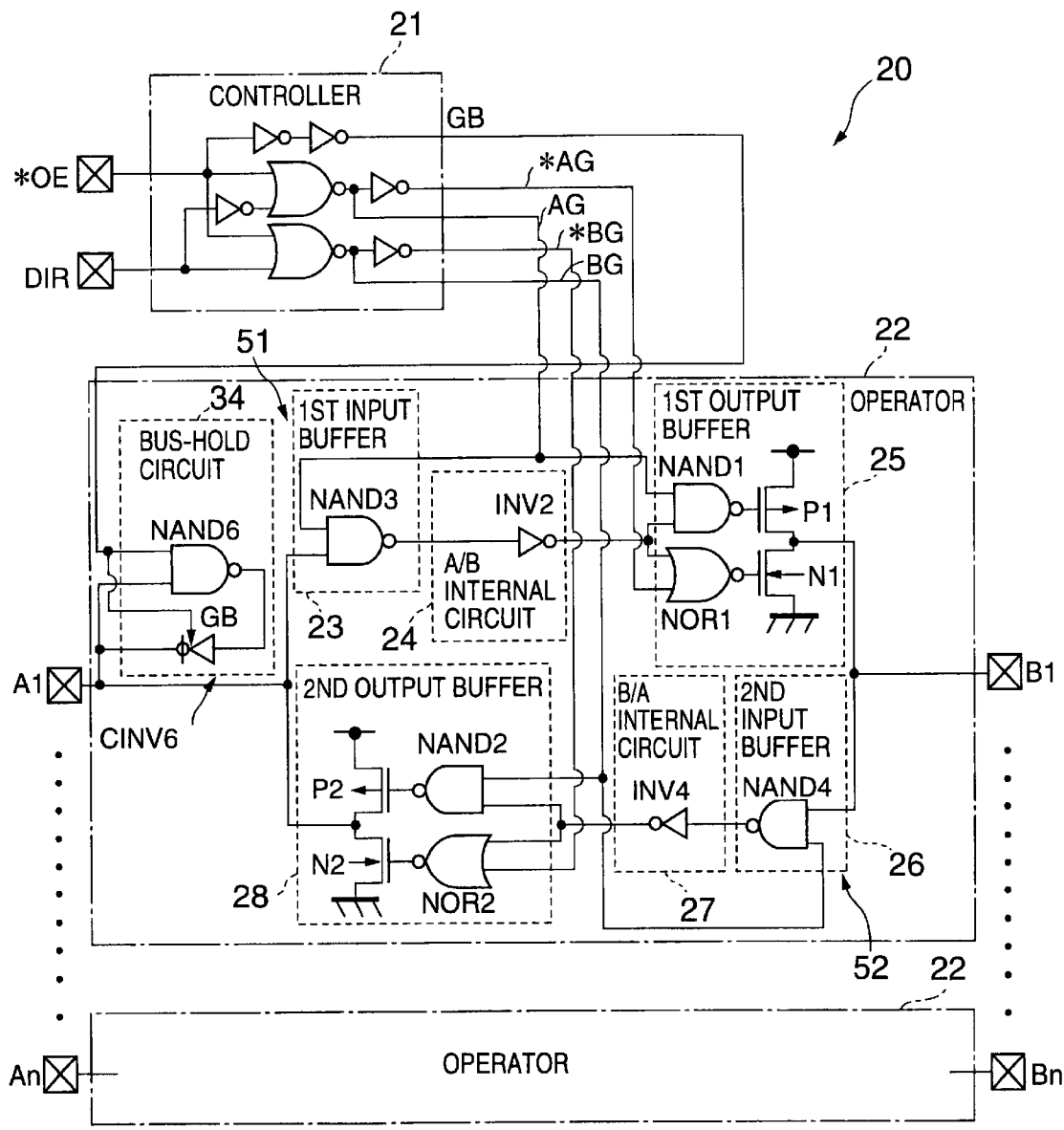
FIG. 12 shows a logic circuit diagram of a bus buffer having logic circuitry according to the fifth embodiment in the present invention.

The bus buffer shown in FIGS. 8 to 10 according to the fourth embodiment and that shown in FIGS. 11 and 12 according to the fifth embodiment are equipped with the first and the second input buffers 23 and 26 made up of NAND3 and NAND4, respectively, and the bus-hold circuit 33 (34) made up of NAND5 (NAND6) and the clocked inverter CINV5 (CINV6). The equivalent circuitry can be offered by the combination of clocked inverters and inverters such as shown in FIG. 13 for a bus buffer according to the sixth embodiment.

Figure 13:
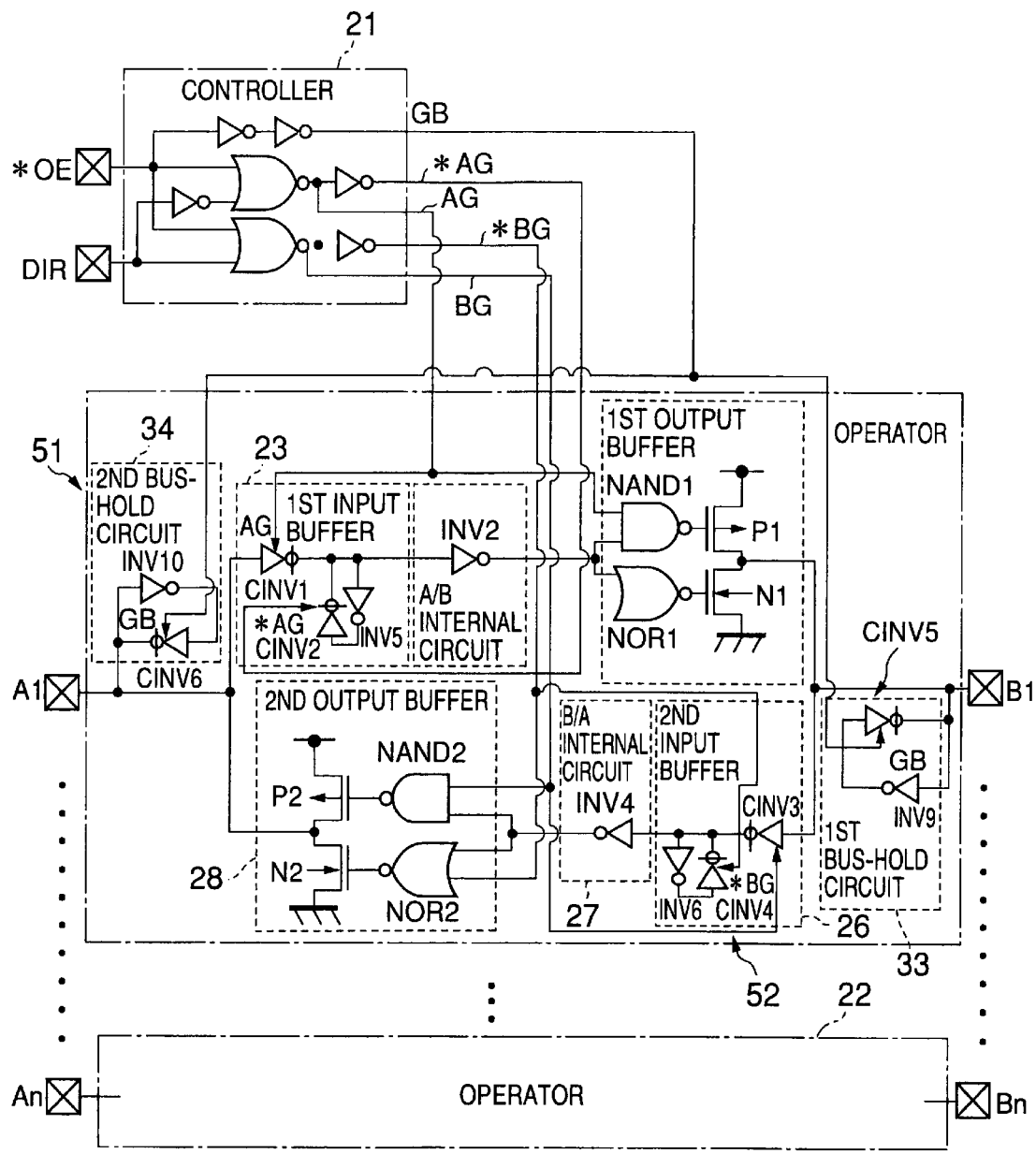
FIG. 13 shows a block diagram of a bus buffer having logic circuitry according to the sixth embodiment in present invention.

FIG. 13 shows a logic circuit diagram of the bus buffer according to the sixth embodiment in this invention. The first and the second input buffers 23 and 26 in the bus buffer shown in FIG. 13 are identical to those in the second embodiment shown in FIG. 5, and hence explanation thereof being omitted for brevity.

The first bus-hold circuit 33 has an inverter INV9 for inverting a signal output via the terminal B1 and a clocked inverter CINV5 for inverting the output of INV9 in response to the fifth control clock signal GB from the controller 21. The second bus-hold circuit 34 has an inverter INV10 for inverting a signal output via the terminal A1 and a clocked inverter CINV6 for inverting the output of INV10 in response to the fifth control clock signal GB from the controller 21.

The bus buffer according to the sixth embodiment also activates the internal circuit and output buffer of one signal processor for a signal only in the first (or the second) direction whereas disactivates the other signal processor against this signal in the first (or the second) direction by using the output signal in the first (or the second) direction.

Moreover, the sixth embodiment activates the first and the second bus-hold circuits 33 and 34 with the fifth control signal GB and the high-impedance-state signals from the input/output terminals to keep the previous states when both terminals are set in the high impedance state. Detailed configuration of such a bus-hold circuit may not be limited to that of the bus buffer shown in FIG. 10 according to the fourth embodiment.

The bus buffers in the first to the sixth embodiments disclosed above accept input signals in both ways. Not only that, the present invention is, however, applicable to one-way signal transfer in which the input buffer, the internal circuit, and the output buffer are disactivated while the input of the input buffer is held at a specific level in response to a control signal from the controller when no signals are supplied to the input terminal. Bus holder may also be implemented in one-way signal processing for the high-impedance state at the input/output terminals.

Figures 14, 15:
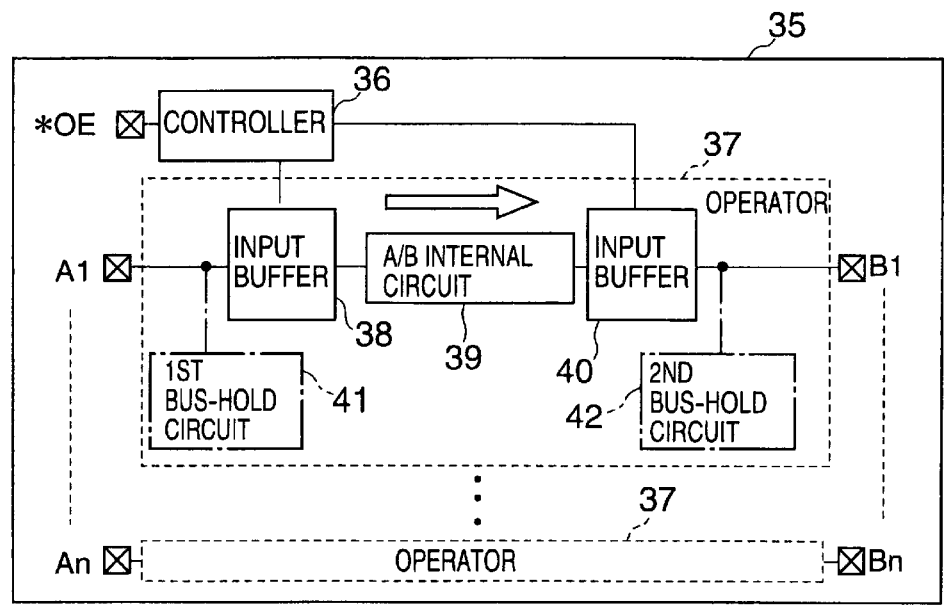
FIG. 14 shows a block diagram of a bus buffer according to the seventh embodiment in the present invention.
FIG. 15 shows a table indicating modes of the bus buffer according to the seventh embodiment in the present invention.
Figure 16:
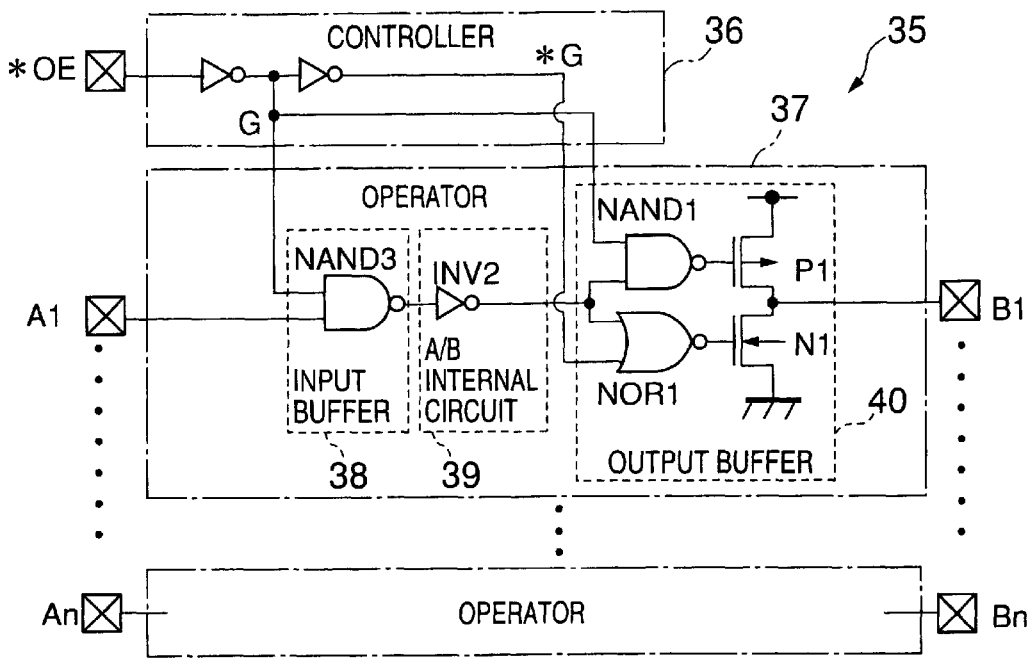
FIG. 16 shows a logic circuit diagram of the bus buffer having logic circuitry according to the seventh embodiment in the present invention.

FIGS. 14 to 16 show a block diagram, a table of operation modes for the corresponding circuitry, and a logic circuit diagram, respectively, for a bus buffer according to the seventh embodiment. A bus buffer 35 shown in FIG. 14 is equipped with a controller 36 for generating control signals in response to the input/output command signal *OE and several operators 37 that are controlled by the control signals from the controller 36. The operators 37 are interposed between the several input terminals A1 to An and the corresponding output terminals B1 to Bn. The operator 37 shown in FIG. 14 is equipped with an input buffer 38 for accepting a signal input via the input terminal A1, an internal circuit 39 for performing a particular logic operation depending on the purpose of providing this circuitry, and an output buffer 40 for a logic operation to the output of the internal circuit 39 and outputting the result of operation.

The bus buffer according to the seventh embodiment requires no DIR terminal but the input/output command terminal *OE, thus performing control based on the signal *OE only, for one-way signal processing which is the aim of this embodiment. In a regular operation, a low-level signal *OE allows a signal input via the terminal A1 to be output via the terminal B1.

Contrary to this, a high-level signal *OE disactivates the output buffer 40, thus the terminal B1 being in the high-impedance state. In this mode, the input buffer 38 performs a logic operation but generates no output, due to no signal supplied from the terminal A1, thus the input buffer 38, internal circuit 39 and output buffer 40 being out of operation, as shown in TABLE 5 in FIG. 15. The indication "OUT OF OPERATION" to the input buffer 38 against the high-level signal *OE means no signal being transferred even though the input buffer 38 performs a logic operation.

FIG. 16 shows a logic circuit block diagram of the bus buffer according to the seventh embodiment. The controller 36 shown in FIG. 16 is made up of two-stage inverters. The first stage inverter inverts the signal *OE to generate a first control signal G. The second stage inverter inverts the first control signal G to generate a second control signal *G. The input buffer 38 is made up of a NAND-logic circuit NAND3 for a NAND-logic operation to the first control signal G and a signal input via the terminal A1. The internal circuit 39 is made up of an inverter INV2 for inverting the output of NAND3. The output buffer 40 is made up of NAND1 for a NAND-logic operation to the output of INV2 and the first control signal G, a P-channel transistor P1 via the gate of which the output of the NAND1 is input, NOR1 for a NOR operation to the output of INV2 and the second control signal *G, and an N-channel transistor N1 via the gate of which the output of NOR1 is input.

The detailed logic operation in the seventh embodiment is the same as the signal processor in the first direction 29 in the first embodiment disclosed with respect to FIG. 1, thus the explanation thereof being omitted for brevity. As disclosed above, the present invention is also applicable to the bus buffer for one-way signal processing.

The bus buffer according to the seventh embodiment includes NAND3 for the input buffer 38. Not only that, the combination of clocked inverters and inverters can be implemented in the input buffer 38, like the second embodiment.

Figure 17:
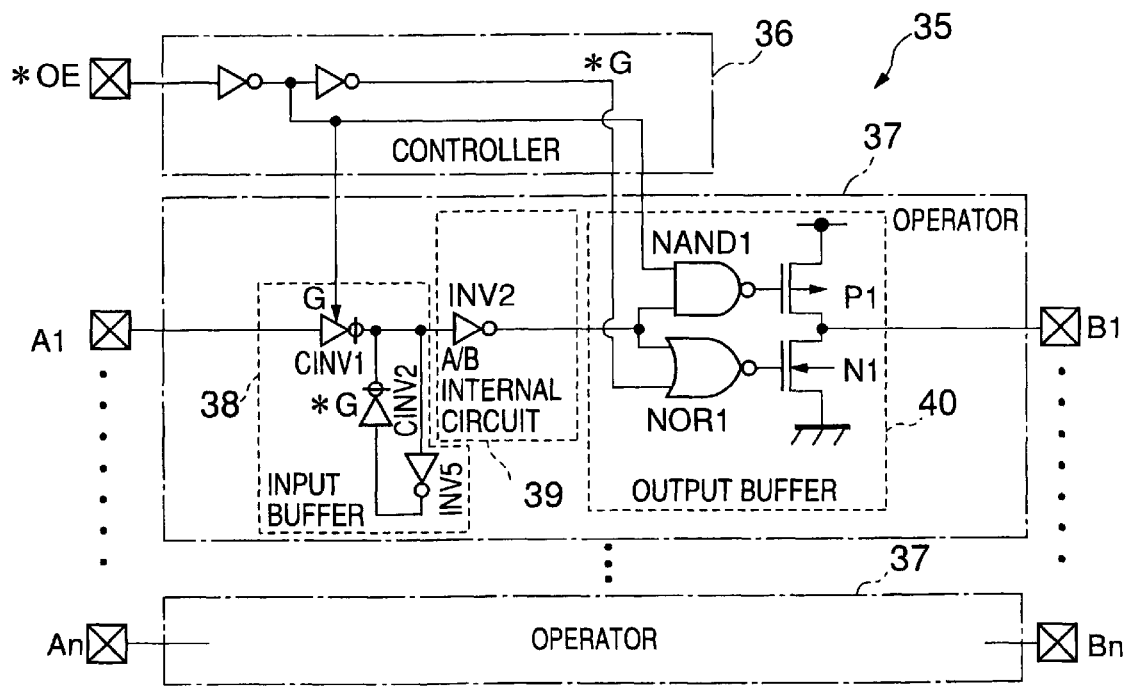
FIG. 17 shows a logic circuit diagram of a bus buffer having logic circuitry according to the eighth embodiment in the present invention.

FIG. 17 shows a bus buffer according to the eighth embodiment for one-way data transfer different from the seventh embodiment. The explanation of detailed configuration and operation in the eighth embodiment are omitted for brevity because the difference between FIG. 5 and FIG. 17 is only that the former is for two-way data processing whereas the latter one-way data processing.

The one-way bus buffers in the seventh and eighth embodiments will, however, be brought in an unfavorable condition when the input/output terminals are set in the high-impedance state, or the signal *OE is set at a high level while the input buffer 38, the internal circuit 39, and the output buffer 40 are out of operation. In order to avoid such a problem, a bus holder may be implemented at least either one input/output terminal, like the two-way bus buffer already disclosed.

FIGS. 18 to 21 show logic circuit diagrams of one-way bus buffers having a bus holder at either one terminal or bus holders at both terminals according to the ninth to the twelfth embodiments, respectively. The function block diagram for each of these embodiments is shown in FIG. 14. The bus holder is shown as the first bus-hold circuit 41 or the second bus-hold circuit 42, each enclosed in a dot-line block. The first bus-hold circuit 41 is connected in parallel between the terminal A1 and the input buffer 38. The second bus-hold circuit 42 is connected in parallel between the output buffer 40 and the terminal B1.

Figure 18:
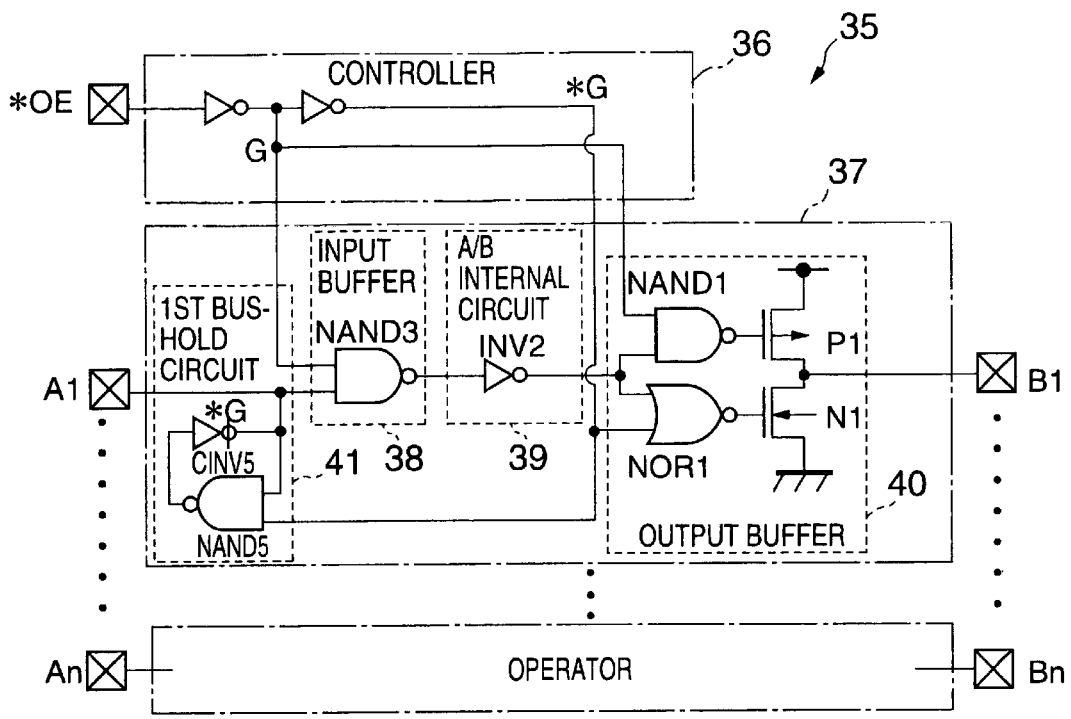
FIG. 18 shows a logic circuit diagram of a bus buffer having logic circuitry according to the ninth embodiment in the present invention.

The bus buffer according to the ninth embodiment shown in FIG. 18 has the first bus-hold circuit 41 at the input side only. The first bus-hold circuit 41 is equipped with NAND5 for a NAND operation to a signal from the input terminal A1 and the control signal *G and also a clocked inverter CINV5 for inverting the output of NAND5 in response to the control clock signal *G.

Figure 19:
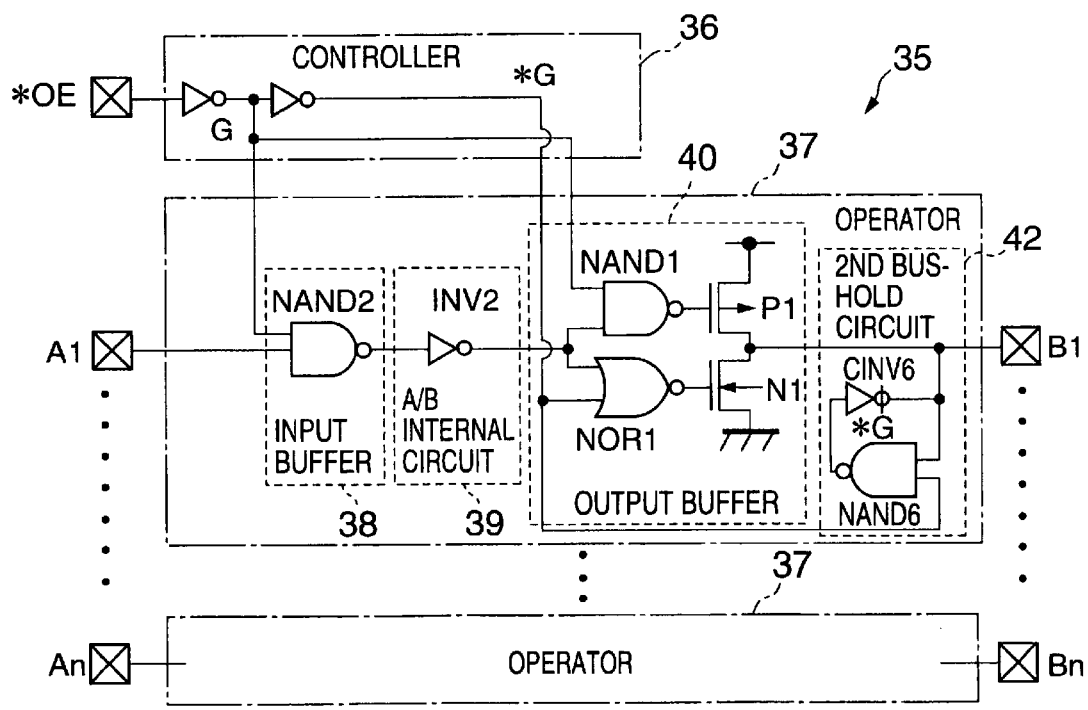
FIG. 19 shows a logic circuit diagram of a bus buffer having logic circuitry according to the tenth embodiment in the present invention.

The bus buffer according to the tenth embodiment shown in FIG. 19 has the second bus-hold circuit 42 at the output side only. The second bus-hold circuit 42 is equipped with NAND6 for a NAND operation to a signal from the output terminal B1 and the control signal *G and also a clocked inverter CINV6 for inverting the output of NAND6 in response to the control clock signal *G.

Figure 20:
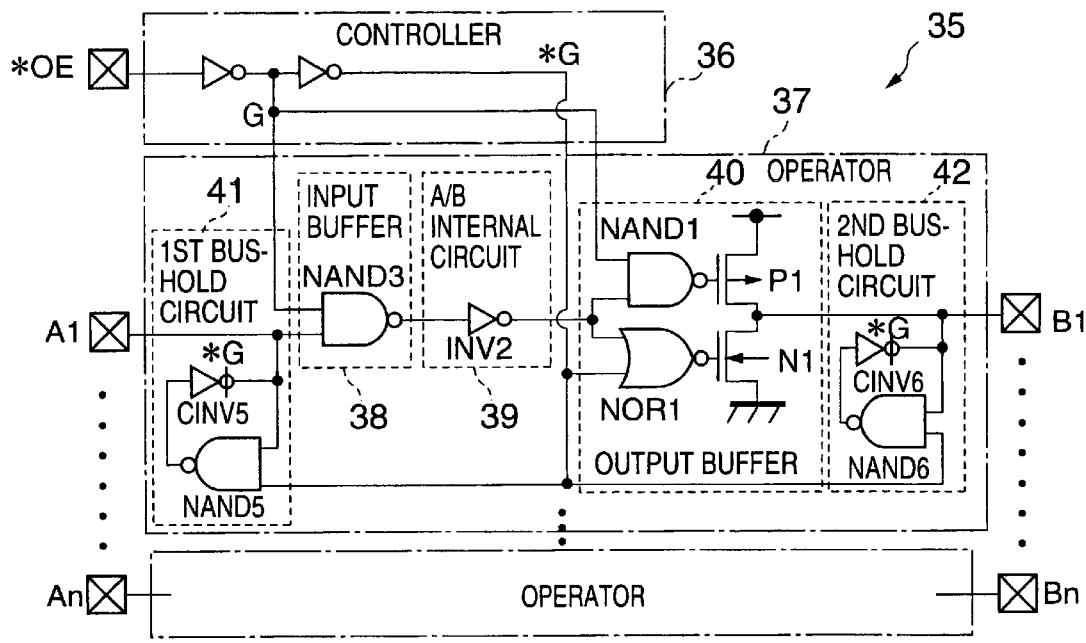
FIG. 20 shows a logic circuit diagram of a bus buffer having logic circuitry according to the eleventh embodiment in the present invention.

The bus buffer according to the eleventh embodiment shown in FIG. 20 has the first bus-hold circuit 41 at the input side and the second bus-hold circuit 42 at the output side.

The first bus-hold circuit 41 is equipped with NAND5 for a NAND operation to a signal from the input terminal A1 and the control signal *G and also the clocked inverter CINV5 for inverting the output of NAND5 in response to the control clock signal *G. The second bus-hold circuit 42 is equipped with NAND6 for a NAND operation to a signal from the output terminal B1 and the control signal *G and also the clocked inverter CINV6 for inverting the output of NAND6 in response to the control clock signal *G.

Figure 21:
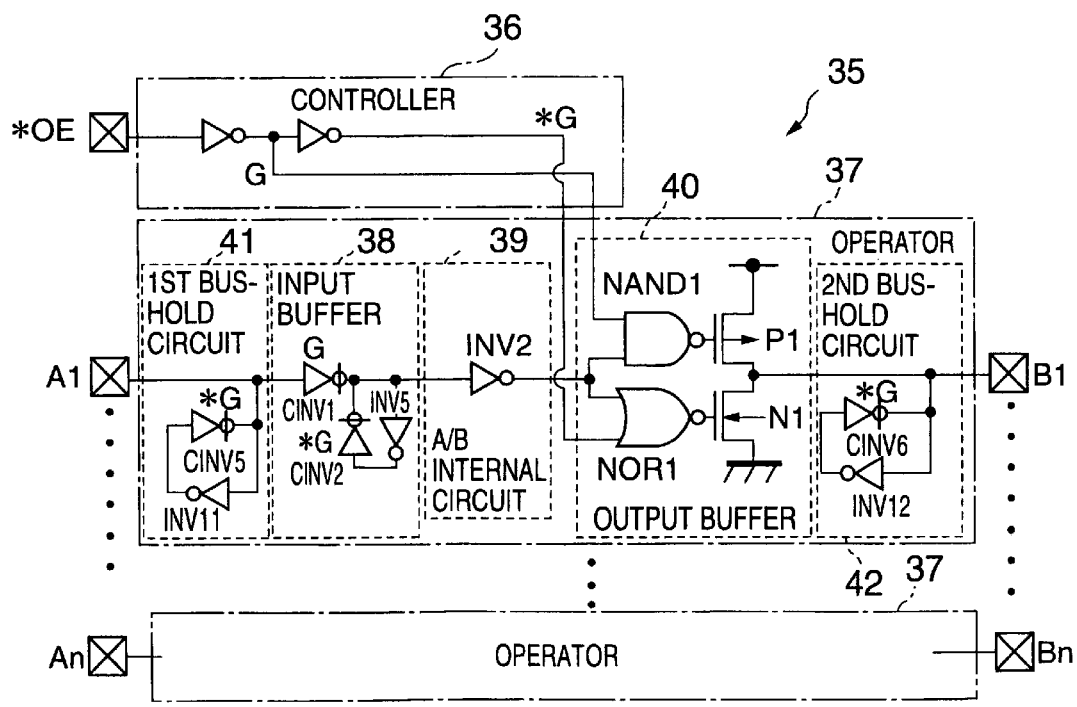
FIG. 21 shows a logic circuit diagram of a bus buffer having logic circuitry according to the twelfth embodiment in the present invention.

The bus buffer according to the twelfth embodiment shown in FIG. 21 has the first bus-hold circuit 41 at the input side and the second bus-hold circuit 42 at the output side, like shown in FIG. 20. The input buffer 38 in this embodiment is identical, in logic circuit configuration, to that in the eighth embodiment shown in FIG. 17. The bus-hold circuits 41 and 42 in this embodiment are identical, in logic circuit configuration, to the counterparts 34 and 33, respectively, in the sixth embodiment shown in FIG. 13.

The input buffer 38 in the twelfth embodiment is equipped with the clocked inverter CINV1 for inverting the input signal in response to the control signal *G, the inverter INV5 for inverting the output of the clocked inverter CINV1, and the clocked inverter CINV2 for inverting the output of INV5 in response to the control signal *G. The inverter INV5 and the clocked inverter CINV2 are cross-coupled to each other.

The first bus-hold circuit 41 in the twelfth embodiment is equipped with an inverter INV11 connected in parallel to the input line from the input terminal A1 and a clocked inverter CINV5 for inverting the output of INV11 in response to the control signal *G. The second bus-hold circuit 42 in the twelfth embodiment is equipped with an inverter INV12 connected in parallel to the output line to the output terminal B1 and a clocked inverter CINV6 for inverting the output of INV12 in response to the control signal *G. The inverter INV2 and the clocked inverter CINV6 are cross-coupled to each other.

The bus buffers in the ninth to the twelfth embodiments control their internal circuitry using the control signals generated by the controller 36 as follows: The high-level input/output command signal *OE deactivates the input buffer 38 and the succeeding circuits. The low-level signal *OE deactivates the bus buffer having at least either the first or the second bus-hold circuit 41 or 42 while activates the input buffer 38, the internal circuit 39, and the output buffer 40. The bus buffer having at least either the first or the second bus-hold circuit 41 or 42 is, however, activated while the input buffer 38, the internal circuit 39, and the output buffer 40 are disactivated by the high-level signal *OE. In other words, each circuit is activated only when it is responsible for signal processing, thus consuming further less power.

The one-way bus buffers according to the eighth to the twelfth embodiments shown in FIGS. 16 to 21 include the input buffer 38 having logic elements that accept the input via the terminal A1 and the control signal G. The outputs of the logic elements in the input buffer 38 and the internal circuit 39 are continuously held at a low and a high level, respectively, irrespective of variation in input signal via the terminal A1. Therefore, these embodiments achieve low power consumption with almost no through current.

The bus buffers in the eighth to the twelfth embodiments shown in FIGS. 16 to 21 could, however, suffer unwanted transient noises at the bus B side when the signal *OE is switched from the high to low level between out-of-operation mode and in-operation mode.

The cause of such switching noises appearing at the output terminal B1 side in one-way signal transfer will be discussed with reference to FIGS. 22 and 23. Disclosed thereafter with reference FIGS. 24 to 33 are the thirteenth to the nineteenth embodiments, respectively, taking measures against such noises appearing at the output terminal. Also disclosed with reference FIGS. 34 to 40 are the twentieth to the twenty-sixth embodiments, respectively, taking measures against such noises for two-way-signal processing bus buffers like the first to the seventh embodiments which could also suffer from such noises.

Figure 22:
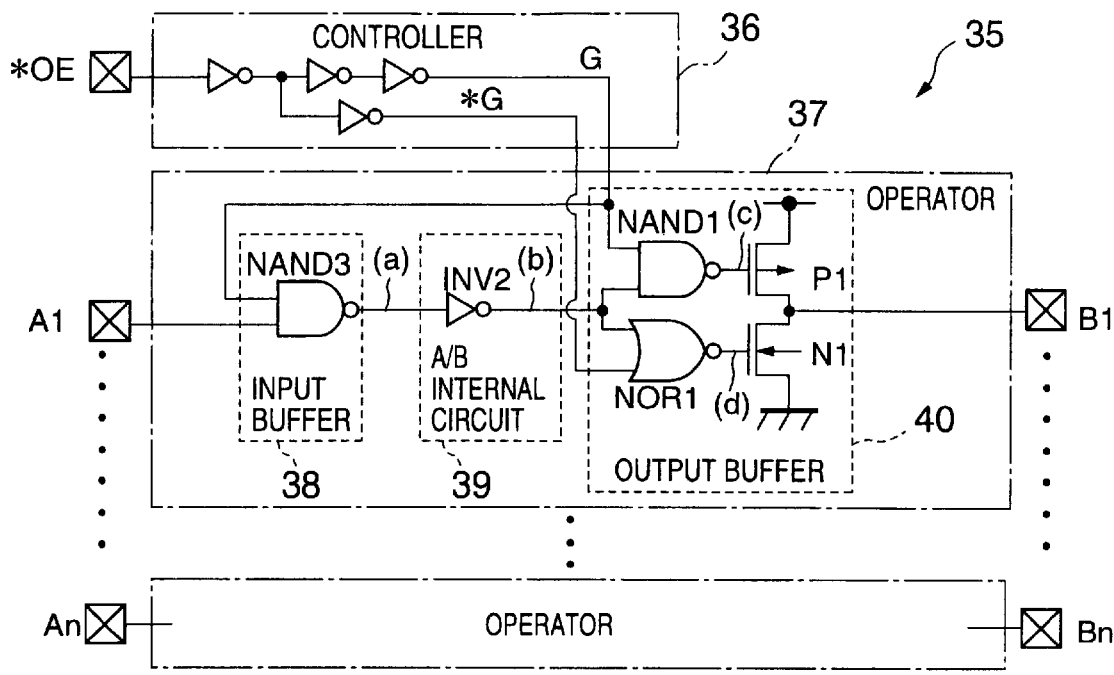
FIG. 22 shows a logic circuit diagram corresponding to FIG. 16, for explaining noises appearing at the output terminal while the controller is switched.
Figure 23:
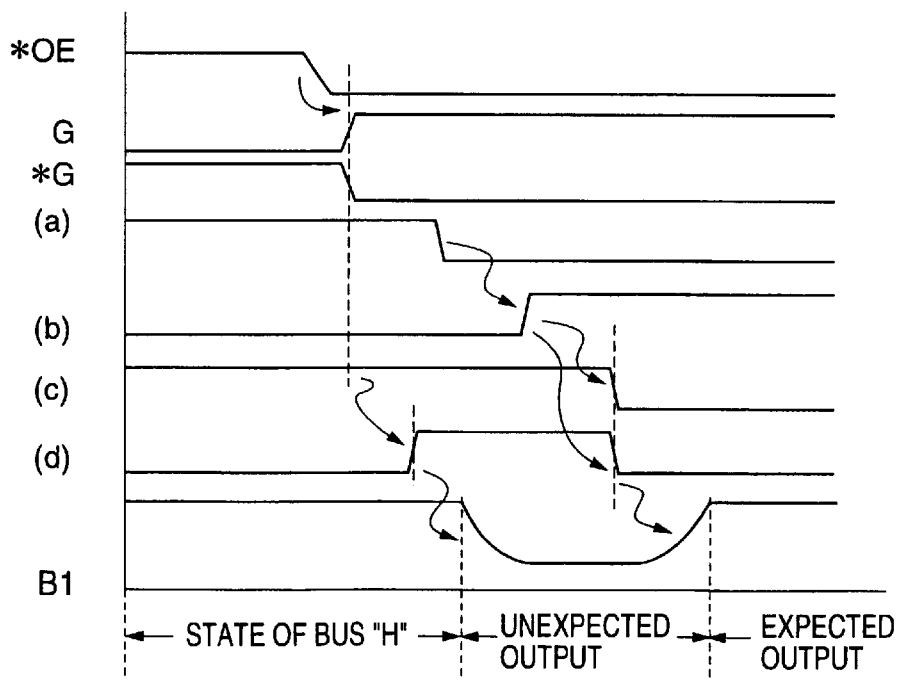
FIG. 23 shows transition of signals for explaining noises per circuit output.

Discussed first are several consequences that could occur in a low-power-consuming bus buffer shown in FIG. 22 under switching of the signal *OE supplied to the controller 36, with respect to waveforms and respective circuit outputs shown in FIG. 23.

It is assumed that the input at the terminal A1 is at a high level and also the system bus connected to the output terminal B1 is at a high level when a high-level input is supplied to the terminal *OE (output high-impedance state, called output HZ state hereinafter).

Under the assumption, the controller 36 generates a low-level control signal G, which yields a high level at a point (b) and hence a low level at a point (b). The low-level control signal G and hence the high-level control signal *G supplied from the controller 36 to NAND1 and NOR1 constituting the output buffer 40 yield the high level at a point (c) and the low level at a point (d). The transistors P1 and N1 of the output buffer 40 are then turned off under these logic states.

On transition of the input at the terminal *OE from the high to low level, the terminal B1 is released from the output HZ state and hence trying to output a signal of the same potential as the input at the terminal A1. Under the input transition at the terminal *OE, however, the control signals G and *G from the controller 36 change the logic states at the points (c) and (d) so that signals can be output from these points to the transistors P1 and N1 of the output buffer 40, which is faster than that the control signals G and *G release NAND3 of the input buffer 38 from a logic-locked state so that the potential change at the point (a), the output of the input buffer 38 and the point (b), the output of the internal circuit 39 can be transferred to the output buffer 40.

In other words, the control signals G and *G are switched to the high and low levels, respectively, while the signal at the point (b) is held at the low level. This results in high level at the points (c) and (d), thus the transistor N1 of the out buffer 40 is turned on to lower the potential at the output terminal B1 to the low level. This is followed by transfer of potential at the input terminal A1 to the point (a), the output of NAND3, as the low level, and to the point (b), the output of INV2 of the internal circuit 39, as the high level, resulting in low level at the points (c) and (d), and hence the output at the terminal B1 returning to the high level.

As shown in FIG. 23, the bus connected to the terminal B1 was at the high level before input transition at the terminal *OE. A transient low level at the terminal B1 after the input transition at the terminal *OE, and again the high level at the terminal B1 inevitably generate noises on the bus B. The following embodiments of low-power-consuming bus buffer have specific configurations for suppressing such noises which would be generated at switching to out of operation.

Figure 24:
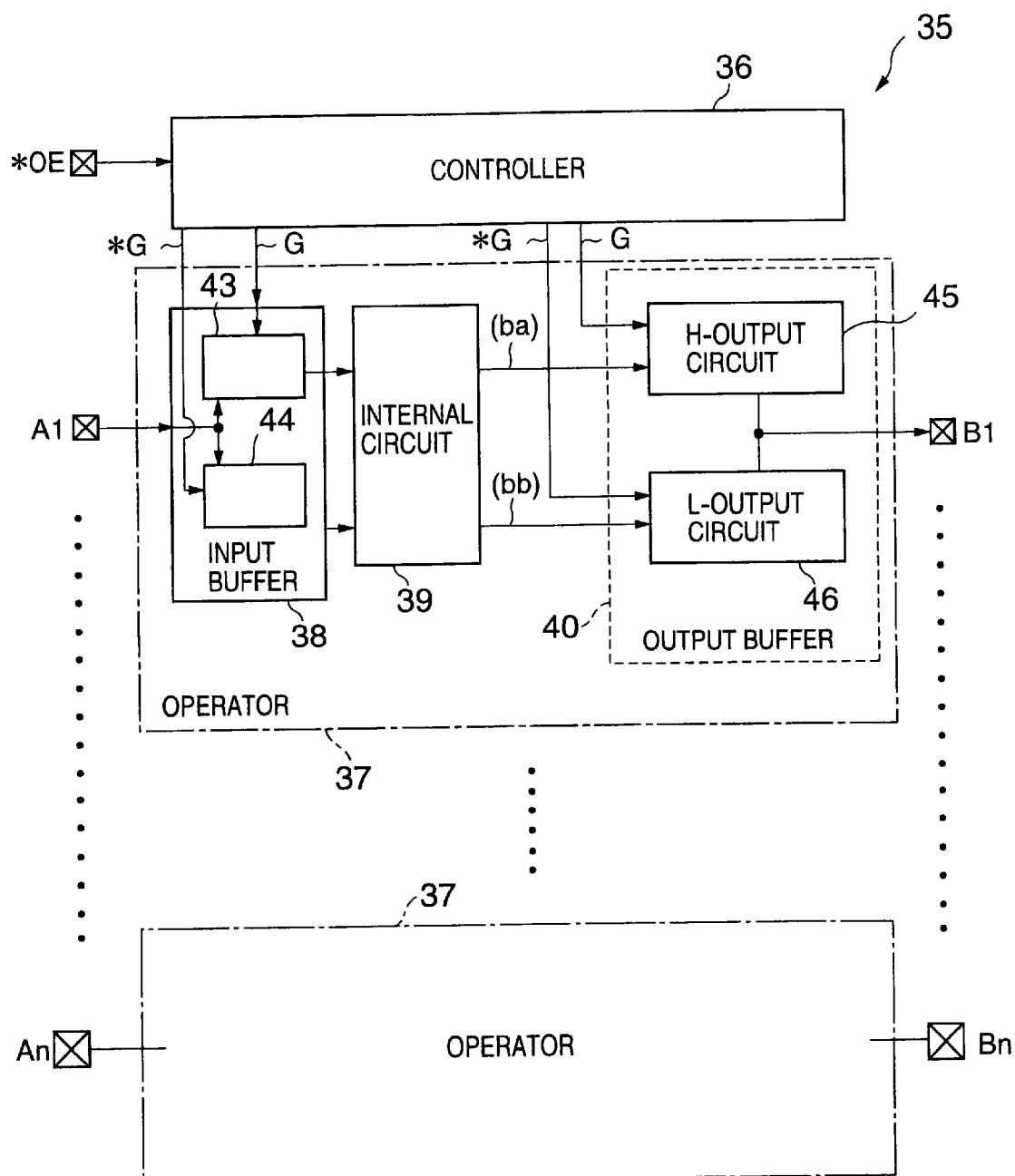
FIG. 24 shows a block diagram of a bus buffer having logic circuitry according to the thirteenth embodiment in the present invention.

Disclosed first with respect to FIG. 24 is a bus buffer according to the thirteenth embodiment. A bus buffer 35 has several operators 37. Each operator 37 is equipped with an input buffer 38, an internal circuit 39, and an output buffer 40. Supplied from the controller 36 to the input buffer 38 are two control signals G and *G generated from a signal *OE.

The control signals G and *G are supplied to a first circuit branch 43 and a second circuit branch 44, respectively, to lock the initial-stage transistors of both branches in a specific state simultaneously. The output buffer 40 is equipped with an H-output circuit 45 for a logic operation to the control signal G and a first output (ba) of the internal circuit 39 that performs a specific processing to the output signal of the first circuit branch 43, and an L-output circuit 46 for a logic operation to the control signal *G and a second output (bb) of the internal circuit 39 that performs a specific processing to the output signal of the second circuit branch 44.

As disclosed, the initial-stage transistors of the input buffer 38 are simultaneously locked in a specific state for the high-impedance (HZ) state at the terminal B1 based on the input signal *OE to the controller 36. This state yields the output signals from the internal circuit 39, such as, the output to the H-output circuit 45 at the same potential as an off signal to the H-output circuit from the controller 36, and the output to the L-output circuit 46 at the same potential as an off signal to the L-output circuit from the controller 36. Such output signals can be generated in the fourteenth and the fifteenth embodiments, as disclosed in detail below.

Figures 25, 26:
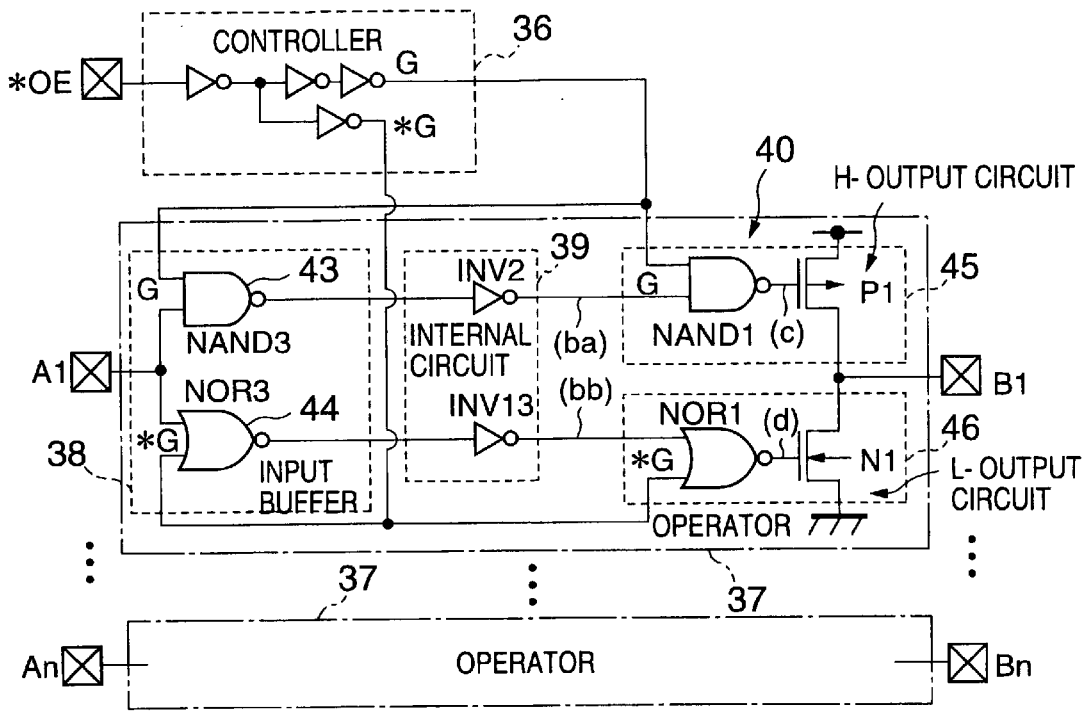
FIG. 25 shows a logic circuit diagram of a bus buffer having logic circuitry according to the fourteenth embodiment in the present invention.
FIG. 26 shows TABLE 6 (truth table) indicating logic levels of respective circuit outputs shown in FIG. 25.

FIG. 25 shows a bus buffer according to the fourteenth embodiment. The input bus buffer 38 in the fourteenth embodiment is equipped with, as shown in FIG. 25, a first circuit branch 43 made up of a NAND-logic circuit NAND3 and a second circuit branch 44 made up of a NOR-logic circuit NOR3. One of the two inputs to NAND3 is supplied via the terminal A1. The other input is the control signal G from the controller 36. One of the two inputs to NOR3 is also supplied via the terminal A1. The other input is the control signal *G from the controller 36.

An internal circuit 39 is equipped with an inverter INV2 for inverting the output of the first circuit branch 43 in the output buffer 38, to output a signal "ba" and an inverter INV3 for inverting the output of the second circuit branch 44, to output a signal "bb". An H-output circuit 45 of an output buffer 40 is equipped with a second NAND-logic circuit NAND1 for a NAND operation to the signal "ba" and the control signal G, to output a signal "c", and a P-channel transistor P1. An L-output circuit 46 is equipped with a second NOR-logic circuit NOR1 for a NOR operation to the signal "bb" and the control signal *G, to output a signal "d", and an N-channel transistor N1.

In the bus buffer including the logic circuitry according to the fourteenth embodiment, the input holder is equipped with a first NAND-logic circuit NAND3 for activating the input buffer 38, the internal circuit 39 and the output buffer 40 to output logic-operation results based on signal input via the input terminal A1 and the control signal G from the controller 36, at one of two levels, while disactivating the input buffer 38, the internal circuit 39 and the output buffer 40 when no signals input at the input terminal A1, thus holding the input at a certain level; and a first NOR-logic circuit NOR3 for activating the input buffer 38, the internal circuit 39 and the output buffer 40 to output logic-operation results based on signal input via the input terminal A1 and the control signal *G from the controller 36, at the other level, and disactivating the input buffer 38, the internal circuit 39 and the output buffer 40 when no signals input at the terminal A1, thus holding the input at a certain level. The output buffer 40 is equipped with an H-output circuit 45 for an logic operation to the control signal G at the one level and the output of NAND3 supplied via the internal circuit 39, and an L-output circuit 46 for an logic operation to the control signal *G at the other level and the output of NOR3 supplied via the internal circuit 39. The circuits constitute a noise suppressor for preventing the change in signal supplied to the controller 36 from appearing at the output terminal.

As understood from TABLE 6 in FIG. 26, the bus buffer in the fourteenth embodiment disclosed above performs basically the same logic operation as the previous embodiments for one-way data processing.

Figure 27:
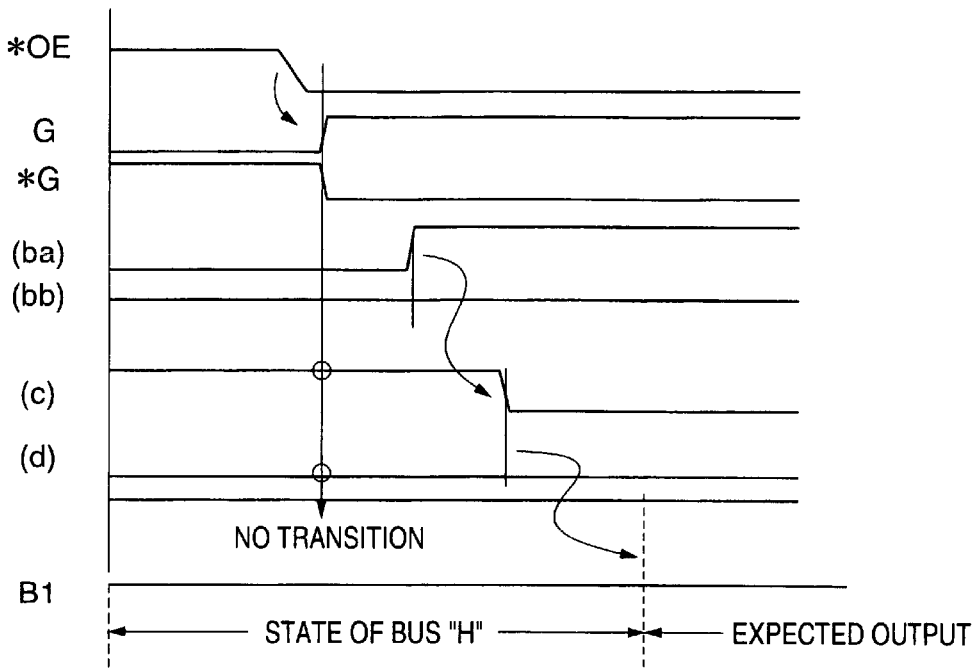
FIG. 27 shows transition of respective signals in FIG. 25.

Discussed with reference to FIG. 27 is an operation of this embodiment in switching of the signal *OE from high to low level, which causes problems to the first to the twelfth embodiments. The output HZ state while the signal *OE is at a high level yields a low-level control signal G whereas a high-level control signal *G from the controller 36. These control-signal logic states yield a low level at the point "ba" whereas a high level at the point "bb" irrespective of the input at the terminal A1, thus the internal circuit 39 being in a waiting mode at the same potential as the control signals G and *G supplied to NAND1 and NOR1.

On transition of the input to the terminal *OE from high to low level, the control signals G and *G supplied to NAND1 and NOR1 try to switch the H- and L-output circuits 45 and 46 before the points "ba" and "bb", like the previous embodiments. The signals "ba" and "bb" supplied to the H- and L-output circuits 45 and 46, respectively, are waiting for turning off the circuits 45 and 46. Therefore, the points "c" and "d" are holding the output in the HZ state irrespective of change in the signals G and *G.

Simultaneously with this, the potential to be appeared at the terminal B1 is delayed due to change in the signals G and *G and transferred to the points "ba" and "bb", and finally output at the terminal B1 as a desired potential via the points "c" and "d". In other words, this embodiment generates no outputs to become noises under any conditions because the HZ state is kept logically from signal-level switching at the terminal *OE to output potential establishment at the terminal B1.

Figure 28:
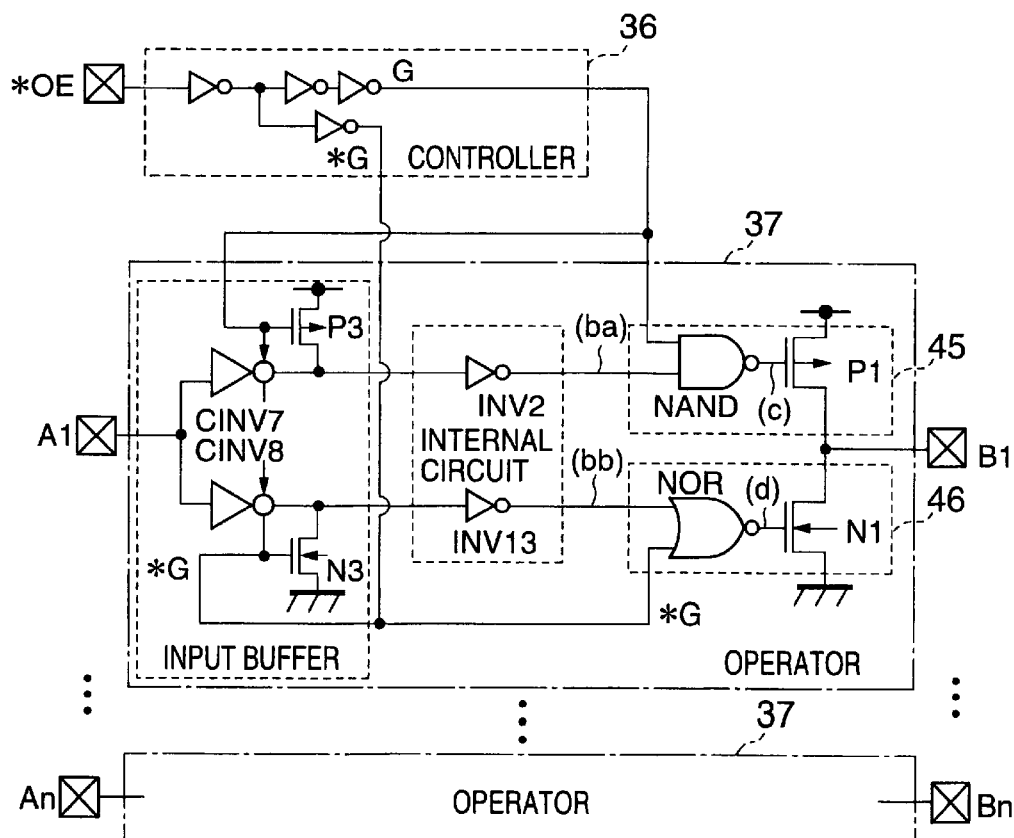
FIG. 28 shows a logic circuit diagram of a bus buffer having logic circuitry according to the fifteenth embodiment in the present invention.

Disclosed next with reference to FIG. 28 is a bus buffer according to the fifteenth embodiment, a modification to the bus buffer in the fourteenth embodiment. The bus buffer shown in FIG. 28 handles one circuit-input threshold level that corresponds to two circuit-input threshold levels, one for NAND3 of the first circuit branch 43 and the other for NOR3 of the second circuit branch 44, constituting the input buffer 38 in the fourteenth embodiment shown in FIG. 25.

The differences between the fifteenth and the fourteenth embodiments are only that, in the former, the first circuit branch 43 is constituted by the clocked inverter CINV7 controlled by the control signal G and the P-channel transistor P3, and the second circuit branch 44 is constituted by the clocked inverter CINV8 controlled by the control signal *G and the N-channel transistor N3. The circuit operations disclosed with reference FIGS. 26 and 27 are also true for the fifteenth embodiment.

In the bus buffer including the logic circuitry according to the fifteenth embodiment, the input holder is equipped with a first clocked inverter CINV7 for activating the input buffer 38, the internal circuit 39 and the output buffer 40 to output logic-operation results based on signal input via the terminal A1 and the control signal G from the controller 36, at one of two levels, while disactivating the input buffer 38, the internal circuit 39 and the output buffer 40 when no signals input at the terminal A1, thus holding the input at a certain level; and a second clocked inverter CINV8 for activating the input buffer 38, the internal circuit 39 and the output buffer 40 to output logic-operation results based on signal input via the terminal A1 and the control signal G from the controller 36, at the other level, while disactivating the input buffer 38, the internal circuit 39 and the output buffer 40 when no signals input at the terminal A1, thus holding the input at a certain level. The output buffer 40 is equipped with an H-output circuit 45 for an logic operation to the control signal G at the one level and the output of the first clocked inverter CINV7 supplied via the internal circuit 39, and an L-output circuit 46 for an logic operation to the control signal *G at the other level and the output of the second clocked inverter CINV8 supplied via the internal circuit 39. The circuits constitute a noise suppressor for preventing the change in signal supplied to the controller 36 from appearing at the output terminal.

The bus buffers in the thirteenth to the fifteenth embodiments have two circuit branches for the input buffer 38 and the internal circuit 39 because of the same timing for the control signal supplied to the input buffer 38 and that to the output buffer 40. The timing may, however, be different between the control signals supplied to the input buffer 38 and the output buffer 40, for preventing noises from appearing at the terminal B1 while the *OE signal level to the controller 36 is being switched.

Figure 29:
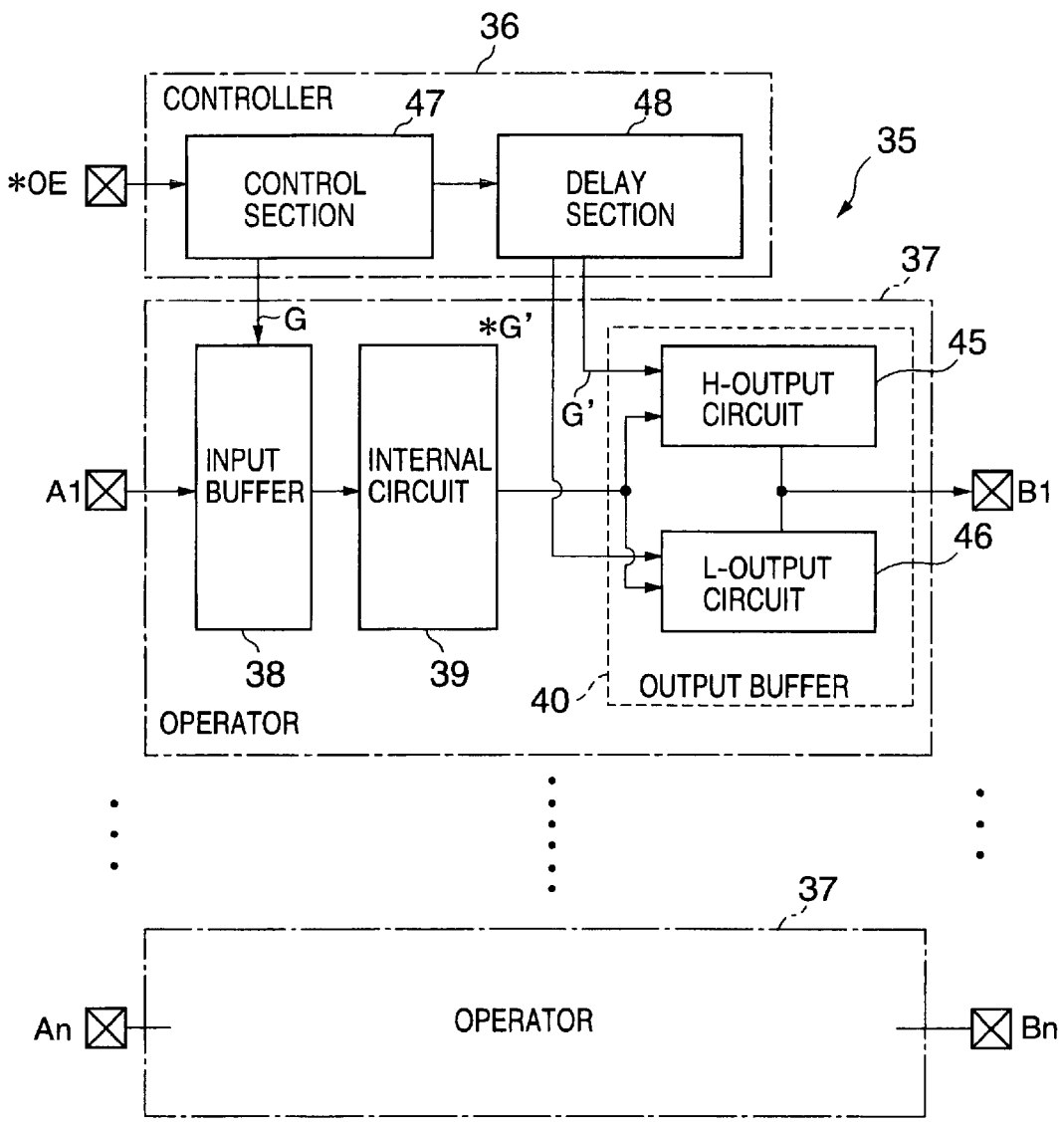
FIG. 29 shows a block diagram of a bus buffer having logic circuitry according to the sixteenth embodiment in the present invention.

A bus buffer shown in FIG. 29 according to the sixteenth embodiment has the input buffer 38 and the internal circuit 39 identical to the previous embodiments, but has additional circuitry for delaying the control-signal supplying timing to the output buffer 40.

The essential configuration of the sixteenth embodiment shown in FIG. 29 is as follows: The controller 36 is equipped with a control section 47 for generating control signals G and *G at the same timing as the controller implemented in the bus buffers in the thirteenth to the fifteenth embodiments and a delay section 48 for delaying the control signals G and *G generated from the control section 47 by a specific timing, to generate control signals G' and *G'.

Several operators 37 have the input buffer 38 and the internal circuit 39 for performing specific logic operations in response to the control signal G from the control section 47, both identical to the counterparts in the previous embodiments. The output buffer 40 in this embodiment is equipped with an H-output circuit 45 for performing a specific logic operation to the output of the internal circuit 39 and the delayed-control signal G' from the delay section 48 of the controller 36, and an L-output circuit 46 for performing a specific logic operation to the output of the internal circuit 39 and the delayed-control signal *G' from the delay section 48. The H- and L-output circuit 44 and 45 are identical to the counterparts in the thirteenth to the fifteenth embodiments except that the control signals are delayed by a specific timing in this embodiment.

The bus buffer according to the sixteenth embodiment achieves noise reduction with the help of timing difference between the transfer timing to the input buffer 38 and that to the output buffer, otherwise noises could be generated when the control signal G is simultaneously transferred to the input buffer 38 and the output buffer 39 from the control section 47 of the controller 36.

Figure 30:
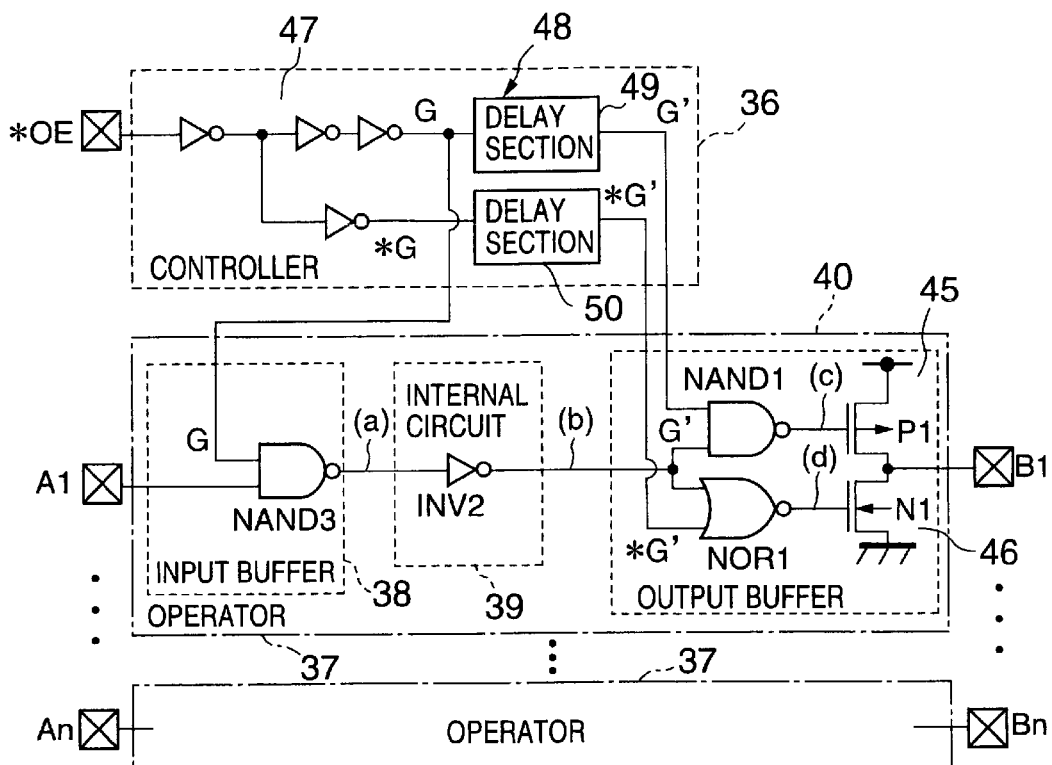
FIG. 30 shows a logic circuit diagram of a bus buffer having logic circuitry according to the seventeenth embodiment in the present invention.

Disclosed next with reference to FIG. 30 is a bus buffer according to the seventeenth embodiment, which has a detailed configuration to the bus buffer in the sixteenth embodiment.

The controller 36 of the bus buffer in seventeenth embodiment, shown in FIG. 30, is equipped with a control section 47 for generating control signals G and *G having different signal levels, and a delay section 48 made up of delay elements 49 and 50 for delaying the control signals G and *G, respectively, from the control section 47.

One of the two inputs to the first NAND-logic circuit NAND3 as a logic element of the input buffer 38 is the control signal G having one of two potential levels from the control section 47, for a logic operation. One of the two inputs to the second NAND-logic circuit NAND1 as a first logic element of the output buffer 40 is the signal G' delayed from the control signal G having the one potential level, supplied from the delay element 49 of the delay section 48, for a logic operation. One of the two inputs to the first NOR-logic circuit NOR1 as a second logic element of the output buffer 40 is the signal *G' delayed from the control signal *G having the other potential level, the inverted version of the one potential level, supplied from the delay element 50 of the delay section 48, for a logic operation.

These circuits constitute a noise suppressor for preventing noises from appearing at the output terminal B1 due to change in *OE-signal switching level supplied to the controller 36.

Figure 31:
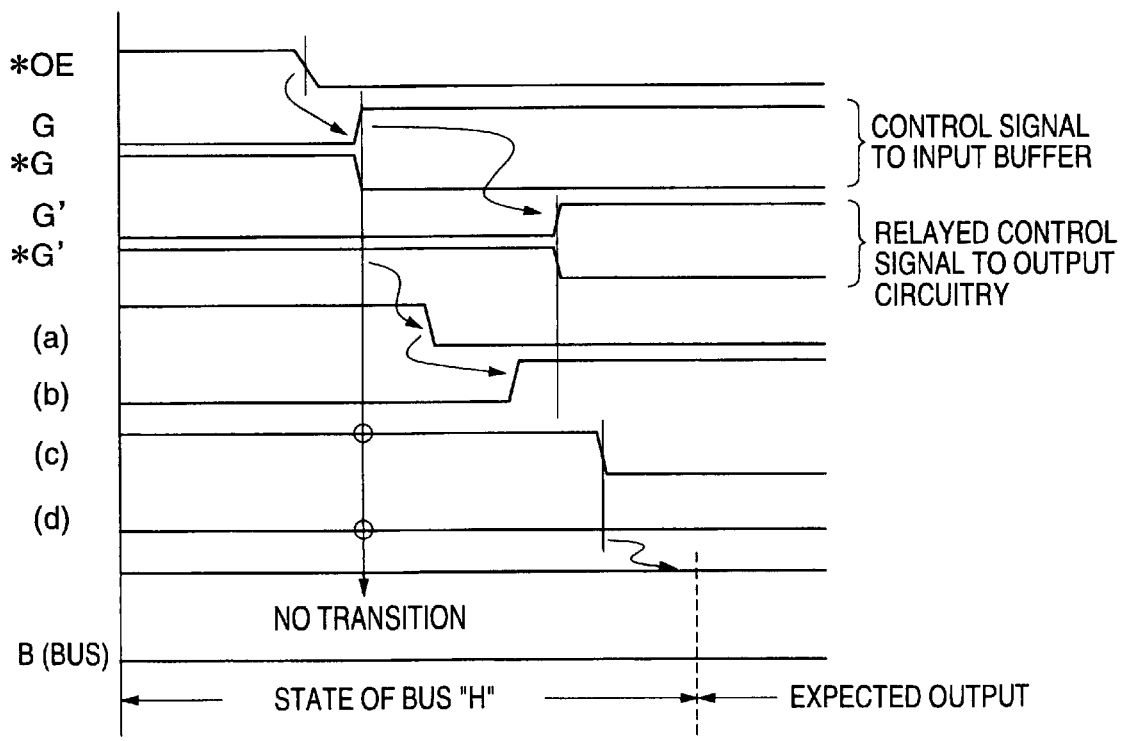
FIG. 31 shows transition of respective signals in FIG. 30.

The bus buffer according to the seventeenth embodiment operates under the timing shown in FIG. 31. In detail, the control signals G and *G are delayed to become the delayed control signals G' and *G', respectively, and supplied to the output circuits 45 and 46 of the output buffer 40, respectively. The control-signal timing adjustments achieves that the signals (c) and (d) will not change, or held at certain levels that have been provided under a high-level signal *OE even while the *OE-signal level is switched from the high to low level when supplied to the controller 36, thus no transient but unwanted noises being generated at the B-bus side.

As disclosed above, the delay section 48 in the controller 36 produces the control signal G' to the output buffer 40 delayed from the control signal G to the input buffer 38 by a specific timing and also produces the control signal *G' to the output buffer 40 delayed from the control signal *G by the same specific timing, to suppress noises appearing at the output terminal B1. The delay section may be made up of several stages of inverters, resistors, capacitors, and so on.

Figure 32:
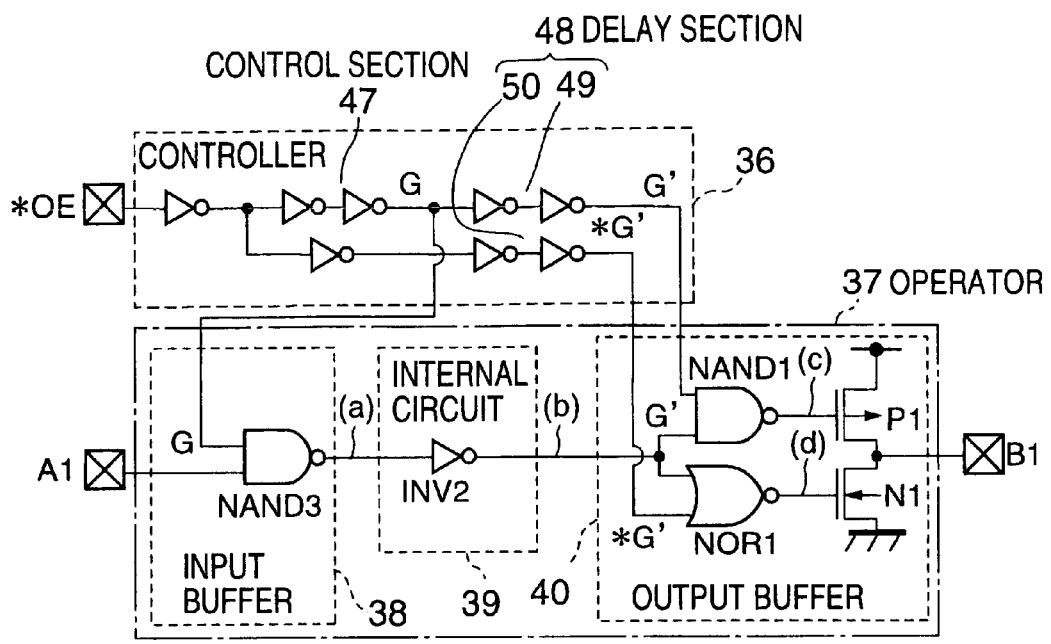
FIG. 32 shows a logic circuit diagram of a bus buffer having logic circuitry according to the eighteenth embodiment in the present invention.

FIG. 32 shows a bus buffer according to the eighteenth embodiment having inverters as the delay elements of the delay section 48. Delay elements 49 and 50 in FIG. 32 are made up of even-number-stage inverters connected in series. This arrangement provides control signals G' and *G' delayed from control signals G and *G by a specific timing, supplied to the NAND-logic circuit NAND1 and the NOR-logic circuit NOR1, respectively, of the output buffer 40.

Figure 33:
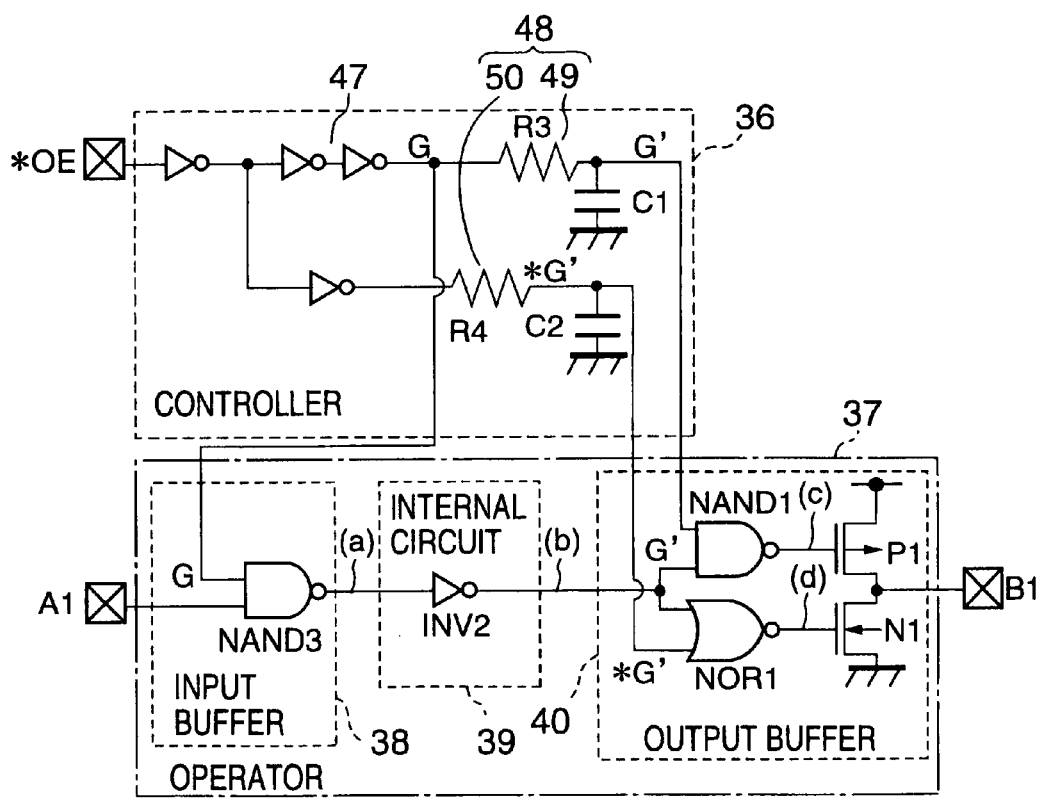
FIG. 33 shows a logic circuit diagram of a bus buffer having logic circuitry according to the nineteenth embodiment in the present invention.

FIG. 33 shows a bus buffer according to the nineteenth embodiment having resistors and capacitors as the delay elements of the delay section 48. Delay elements 49 and 50 in FIG. 33 are made up of a resistor R3 and a capacitor C1, and a resistor R4 and a capacitor C2, respectively. This arrangement provides control signals G' and *G' delayed from control signals G and *G by a specific timing, supplied to the NAND-logic circuit NAND1 and the NOR-logic circuit NOR1, respectively, of the output buffer 40.

The bus buffers in the thirteenth to the nineteenth embodiments suppress noises appearing at the output side when the signal *OE to the controller 36 is varying from the high to low level, for the seventh to the twelfth embodiments for one-way signal processing only. Not only to be limited to this, the present invention offers output-noise suppressor to the first to the sixth embodiments having the two-way signal processors 51 and 52. Disclosed with reference to FIGS. 34 to 40 are the twentieth to the twenty-sixth embodiments for bus buffer having output-noise suppressor.

Figure 34:
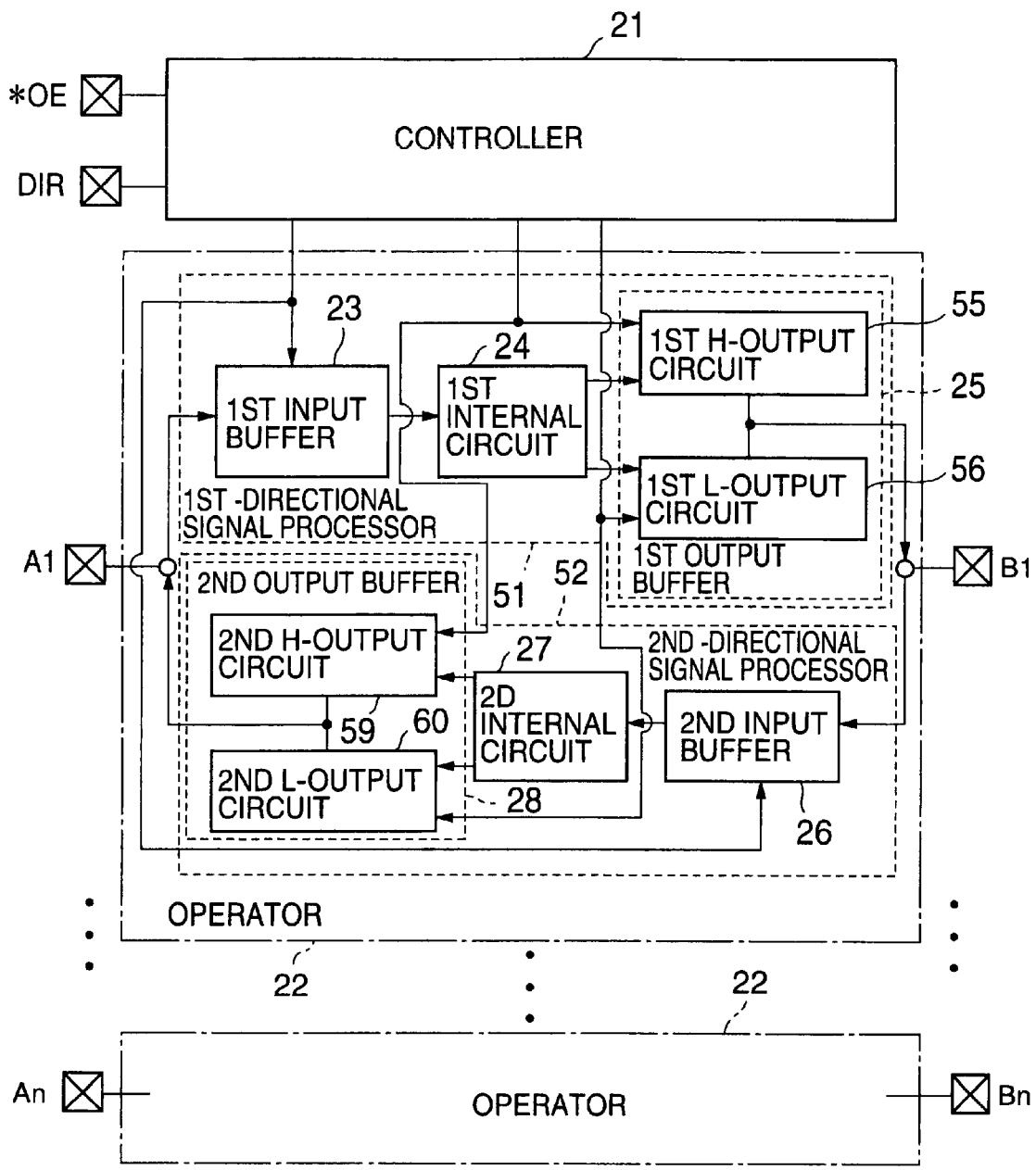
FIG. 34 shows a logic circuit diagram of a bus buffer having logic circuitry according to the twentieth embodiment in the present invention.

FIG. 34 shows a bus buffer for two-way signal processing in the twentieth embodiment corresponding to that for one-way signal processing in the thirteenth embodiment shown in FIG. 24.

The differences in bus buffer between this embodiment and the first embodiment shown in FIG. 3 are that, in the first-directional signal processor 51 in this embodiment, the first-direction input buffer 23 has first and second circuit branches (not shown in FIG. 34) identical to those of the input buffer in the thirteenth embodiment shown in FIG. 24 and the first-direction output buffer 25 has a first H-output circuit 55 and a first L-output circuit 56; and in the second-directional signal processor 52 in this embodiment, the second-direction input buffer 26 has third and fourth circuit branches (not shown in FIG. 34) identical to those of the input buffer in the thirteenth embodiment shown in FIG. 24 and the second-direction output buffer 28 has a first H-output circuit 59 and a first L-output circuit 60.

This arrangement prevents noises from appearing at the output terminal B1 when the *OE signal level to a controller 21 is switched from high to low level while the bus buffer in the twentieth embodiment is in operation in the first direction and also prevents noises from appearing at the output terminal A1 when the *OE signal level is switched while the bus buffer is in operation in the second direction. Transitions of signals in each direction are similar to those shown in FIG. 27.

Figure 35:
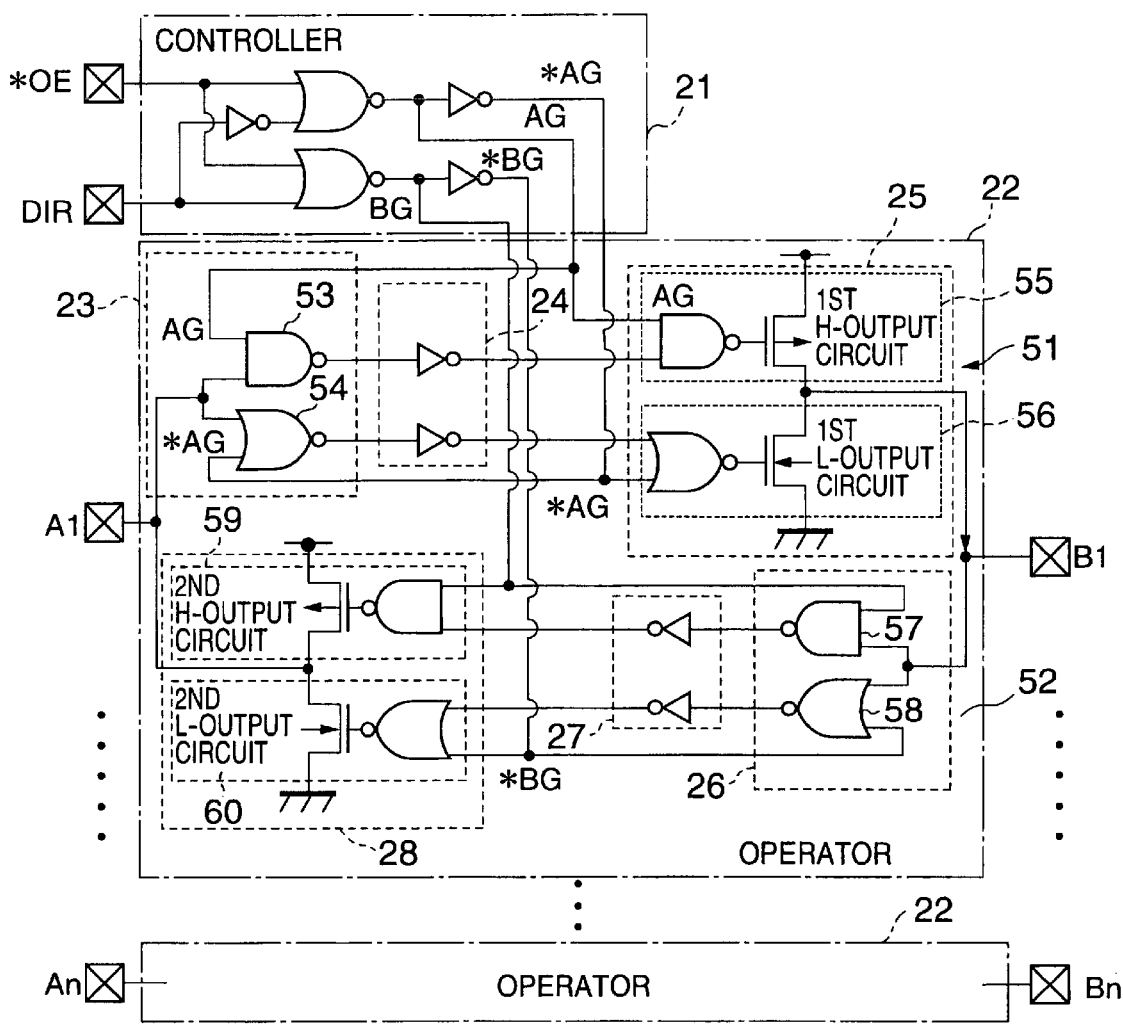
FIG. 35 shows a block diagram of a bus buffer having logic circuitry according to the twenty-first embodiment in the present invention.

FIG. 35 shows a logic circuit diagram of a bus buffer according to the twenty-first embodiment in which each of two-way signal processors has the bus buffer identical to that in the fourteenth embodiment shown in FIG. 25. Shown in FIG. 35 are only the specific circuits for the twenty-first embodiment for avoiding complexity in the figure.

In the first-directional signal processor 51, the input buffer 23 has a first circuit branch 53 made up of a NAND-logic circuit and a second circuit branch 54 made up of a NOR-logic circuit, the internal circuit 24 has inverters corresponding to the branches, and the output buffer 25 has a first H-output circuit 55 made up of a NAND-logic circuit and a P-channel transistor and a first L-output circuit 56 made up of a NOR-logic circuit and an N-channel transistor.

Like the first-directional signal processor 51, in the second-directional signal processor 52, the input buffer 26 has a third circuit branch 57 made up of a NAND-logic circuit and a fourth circuit branch 58 made up of a NOR-logic circuit, the internal circuit 27 has inverters corresponding to the branches, and the output buffer 28 has a second H-output circuit 59 made up of a NAND-logic circuit and a P-channel transistor and a second L-output circuit 60 made up of a NOR-logic circuit and an N-channel transistor.

In detail, in FIG. 35, the first input holder is equipped with the first NAND-logic circuit 53, one of the two inputs thereof being an input signal via the first terminal A1, the other input being a control signal from the controller 21 for indicating the first direction, for activating the first-directional signal processor 51 under the signal input to the terminal A1 and the direction-indicating signal DIR indicating the first direction, thus outputting a processing-result signal at the second terminal B1 whereas disactivating the first-directional signal processor 51 except the first input buffer 23 when the second input buffer 26 is in operation; and the first NOR-logic circuit 54, one of the two inputs thereof being an input signal via the first terminal A1, the other input being a control signal from the controller 21 for indicating the first direction, for activating the first-directional signal processor 51 under the signal input to the terminal A1 and the direction-indicating signal DIR indicating the first direction, thus outputting a processing-result signal at the second terminal B1 whereas disactivating the first-directional signal processor 51 except the first input buffer 23 when the second input buffer 26 is in operation.

The output buffer 25 in the first-directional signal processor 51 is equipped with the first H-output circuit 55 for a logic operation to a control signal of a specific level and the output of the first NAND-logic circuit 53 via the internal circuit 24 and the first L-output circuit 56 for a logic operation to a control signal of another specific level and the output of the first NOR-logic circuit 54 via the internal circuit 24, both constituting a first noise-prevention circuitry for preventing switching changes in signal supplied to the controller 21 from appearing at the output terminal B1.

Moreover, in FIG. 35, the second input holder is equipped with the second NAND-logic circuit 57, one of the two inputs thereof being an input signal via the second terminal B1, the other input being a control signal from the controller 21 for indicating the second direction, for activating the second-directional signal processor 52 under the signal input to the terminal B1 and the direction-indicating signal DIR indicating the second direction, thus outputting a processing-result signal at the first terminal A1 whereas disactivating the second-directional signal processor 52 except the second input buffer 26 when the first input buffer 23 is in operation; and the second NOR-logic circuit 58, one of the two inputs thereof being an input signal via the second terminal B1, the other input being a control signal from the controller 21 for indicating the second direction, for activating the second-directional signal processor 52 under the signal input to the terminal B1 and the direction-indicating signal DIR indicating the second direction, thus outputting a processing-result signal at the first terminal A1 whereas disactivating the second-directional signal processor 52 except the second input buffer 26 when the first input buffer 23 is in operation.

The output buffer 28 in the second-directional signal processor 52 is equipped with the second H-output circuit 59 for a logic operation to a control signal of a specific level and the output of the second NAND-logic circuit 57 via the internal circuit 27 and the second L-output circuit 60 for a logic operation to a control signal of another specific level and the output of the second NOR-logic circuit 58 via the internal circuit 27, both constituting a second noise-prevention circuitry for preventing switching changes in signal supplied to the controller 21 from appearing at the output terminal A1.

Figure 36:
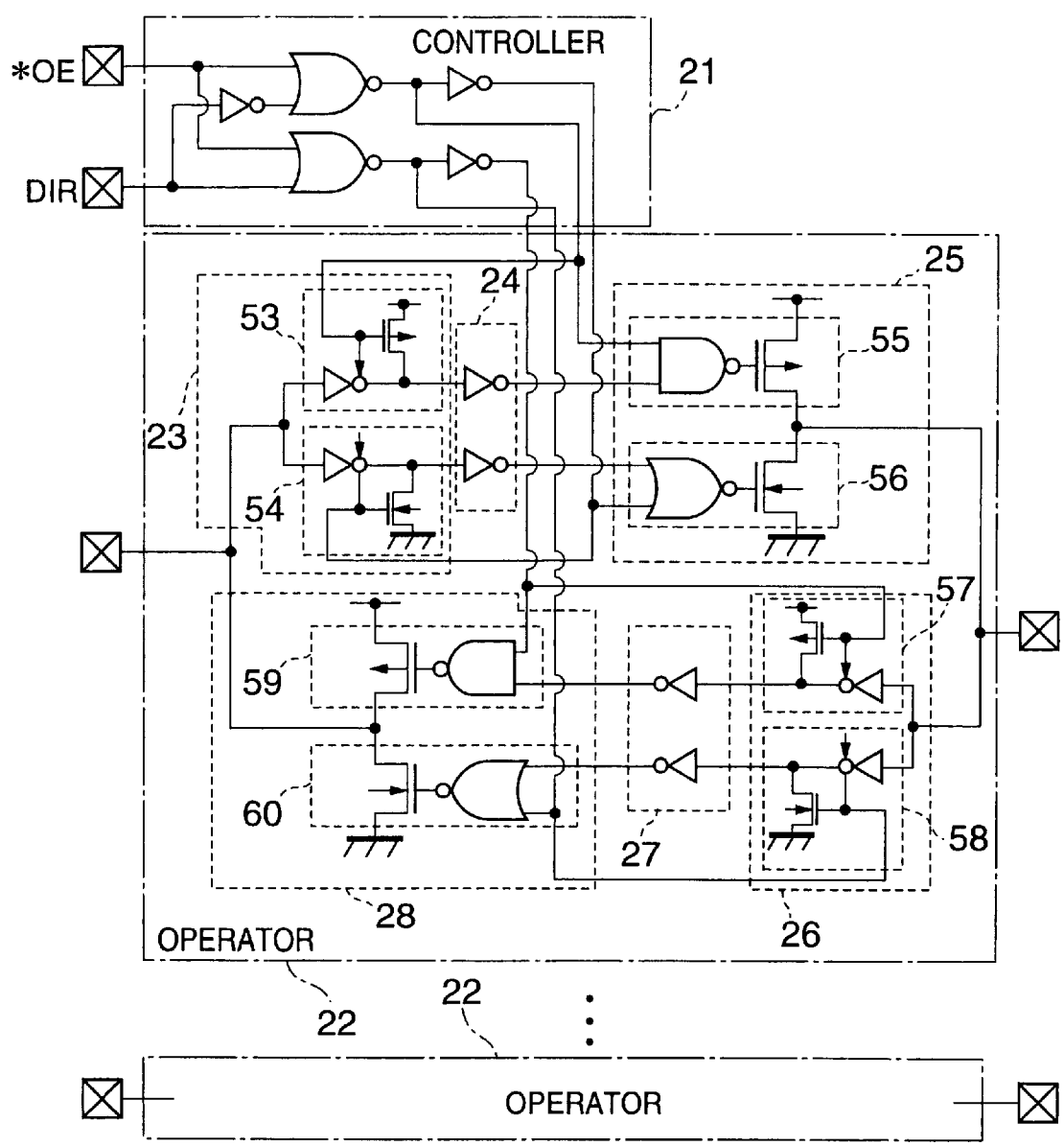
FIG. 36 shows a logic circuit diagram of a bus buffer having logic circuitry according to the twenty-second embodiment in the present invention.

FIG. 36 shows a logic circuit diagram of a bus buffer according to the twenty-second embodiment in which each of two-way signal processors has the bus buffer identical to that in the fifteenth embodiment shown in FIG. 28. Shown in FIG. 36 are only the specific circuits for the twenty-second embodiment for avoiding complexity in the figure.

In the first-directional signal processor 51, the input buffer 23 has a first circuit branch 53 made up of a first clocked inverter and a P-channel transistor and a second circuit branch 54 made up of a second clocked inverter and an N-channel transistor, the internal circuit 24 has inverters corresponding to the branches, and the output buffer 25 has a first H-output circuit 55 made up of a NAND-logic circuit and a P-channel transistor and a first L-output circuit 56 made up of a NOR-logic circuit and an N-channel transistor.

Like the first-directional signal processor 51, in the second-directional signal processor 52, the input buffer 26 has a third circuit branch 57 made up of a third clocked inverter and a P-channel transistor and a fourth circuit branch 58 made up of a fourth clocked inverter and an N-channel transistor, the internal circuit 27 has inverters corresponding to the branches, and the output buffer 28 has a first H-output circuit 59 made up of a NAND-logic circuit and a P-channel transistor and a first L-output circuit 60 made up of a NOR-logic circuit and an N-channel transistor.

In the twenty-second embodiment in FIG. 36, the first input holder is equipped with the first clocked inverter 53, one of the two inputs thereof being an input signal via the first terminal A1, the other input being a control signal from the controller 21 for indicating the first direction, for activating the first-directional signal processor 51 under the signal input to the terminal A1 and the direction-indicating signal DIR indicating the first direction, thus outputting a processing-result signal at the second terminal B1 whereas disactivating the first-directional signal processor 51 except the first input buffer 23 when the second input buffer 26 is in operation; and the second clocked inverter 54, one of the two inputs thereof being an input signal via the first terminal A1, the other input being a control signal from the controller 21 for indicating the first direction, for activating the first-directional signal processor 51 under the signal input to the terminal A1 and the direction-indicating signal DIR indicating the first direction, thus outputting a processing-result signal at the second terminal B1 whereas disactivating the first-directional signal processor 51 except the first input buffer 23 when the second input buffer 26 is in operation.

The output buffer 25 in the first-directional signal processor 51 is equipped with the first H-output circuit 55 for a logic operation to a control signal of a specific level and the output of the first clocked inverter 53 via the first internal circuit 24 and the first L-output circuit 56 for a logic operation to a control signal of another specific level and the output of the second clocked inverter 54 via the first internal circuit 24, both constituting a first noise-prevention circuitry for preventing switching changes in signal supplied to the controller 21 from appearing at the output terminal B1.

Moreover, in FIG. 35, the second input holder is equipped with the third clocked inverter 57, one of the two inputs thereof being an input signal via the second terminal B1, the other input being a control signal from the controller 21 for indicating the second direction, for activating the second-directional signal processor 52 under the signal input to the terminal B1 and the direction-indicating signal DIR indicating the second direction, thus outputting a processing-result signal at the first terminal A1 whereas disactivating the second-directional signal processor 52 except the second input buffer 26 when the first input buffer 23 is in operation; and the fourth clocked inverter 58, one of the two inputs thereof being an input signal via the second terminal B1, the other input being a control signal from the controller 21 for indicating the second direction, for activating the second-directional signal processor 52 under the signal input to the terminal B1 and the direction-indicating signal DIR indicating the second direction, thus outputting a processing-result signal at the first terminal A1 whereas disactivating the second-directional signal processor 52 except the second input buffer 26 when the first input buffer 23 is in operation.

The output buffer 28 in the second-directional signal processor 52 is equipped with the second H-output circuit 59 for a logic operation to a control signal of a specific level and the output of the third clocked inverter 57 via the second internal circuit 27 and the second L-output circuit 60 for a logic operation to a control signal of another specific level and the output of the fourth clocked inverter 58 via the second internal circuit 27, both constituting a second noise-prevention circuitry for preventing switching changes in signal supplied to the controller 21 from appearing at the output terminal A1.

Figure 37:
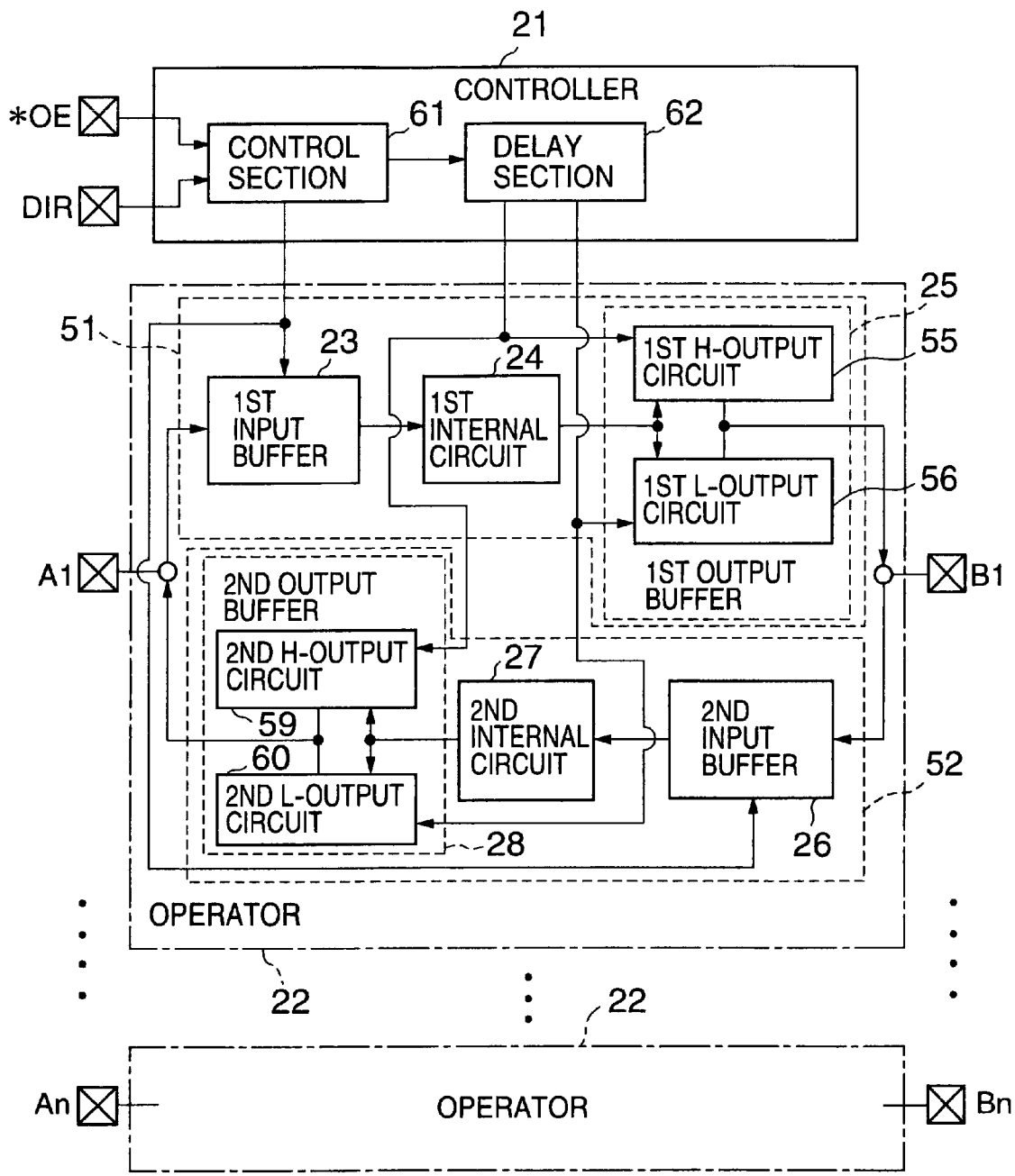
FIG. 37 shows a logic circuit diagram of a bus buffer having logic circuitry according to the twenty-third embodiment in the present invention.

FIG. 37 shows a block diagram of a bus buffer according to the twenty-third embodiment in which each of two-way signal processors has the bus buffer identical to that in the sixteenth embodiment shown in FIG. 29. Like the sixteenth embodiment, the bus buffer in the twenty-third embodiment delays control signals while supplied to the input buffers, for logic operations in the H- and L-output circuits in the output buffers. The input buffer and internal circuit for each direction do not have branches, like the sixteenth embodiment, however, the controller 21 has a control section 61 and a delay section 62 different from the counterparts in the sixteenth embodiment. The first output buffer 25 has a first H-output circuit 55 and a first L-output circuit 56. The second output buffer 28 has a second H-output circuit 59 and a second L-output circuit 60.

In this configuration, the first-directional signal processor 51 performs the same signal processing in the first direction 29 as the first embodiment shown in FIG. 3 and suppressing noises appearing at the output terminal B1 side when the signal *OE is switched from the high to low level while supplied to the controller 21. The second-directional signal processor 52 performs the same signal processing in the second direction 30 as the first embodiment shown in FIG. 3 and suppressing noises appearing at the output terminal B1 side when the signal *OE is switched from the high to low level while supplied to the controller 21.

Figure 38:
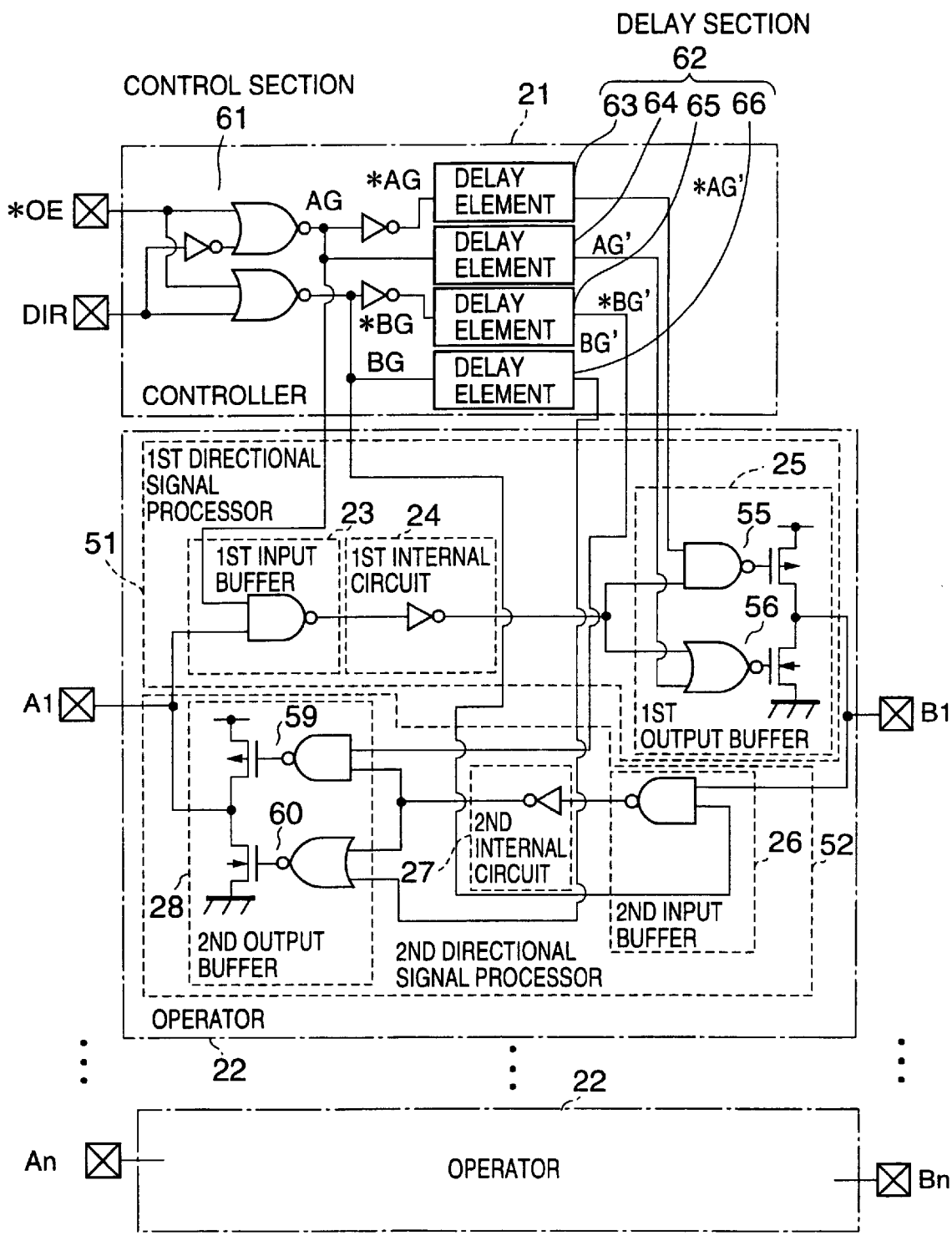
FIG. 38 shows a block diagram of a bus buffer having logic circuitry according to the twenty-fourth embodiment in the present invention.

FIG. 38 shows a logic circuit diagram of a bus buffer according to the twenty-fourth embodiment having first and second signal processors 51 and 52 for two-way signal processing. The differences between this embodiment and the twentieth to the twenty-second embodiments are that, in this embodiment, the controller 21 has the control section 61 and the delay section 62, like the twenty-third embodiment, and also the delay section 62 has first to fourth delay elements 63, 64, 65 to 66.

In detail, the bus buffer according to the twenty-fourth embodiment shown in FIG. 38 is equipped with the control section 61 for generating first-direction control signals AG and *AG and second-direction control signals BG and *BG having different signal levels, and the delay section 62 for delaying the output of the control section 61. The delay section 61 is equipped with the first delay element 63 for delaying the control signal *AG and outputting a delayed control signals *AG', the second delay element 64 for delaying the control signal AG and outputting a delayed control signals AG', the third delay element 65 for delaying the control signal *BG and outputting a delayed control signals *BG', the fourth delay element 66 for delaying the control signal BG and outputting a delayed control signals BG'.

In FIG. 38, one of the two inputs to the NAND-logic circuit of the first input buffer 23 is the first-direction control signal AG having one of two potential levels from the first NOR-logic circuit of the controller 61, for a logic operation. One of the two inputs to the first logic element (NAND) of the first output buffer 25 is the control signal *AG' delayed from the first-direction control signal *AG having the one potential level supplied from the delay element 64 of the delay section 62, for a logic operation. One of the two inputs to the second logic element (NOR) of the first output buffer 28 is the control signal AG' delayed from the first-direction control signal AG having the other potential level, the inverted version of the one potential level, supplied from the delay element 63 of the delay section 62, for a logic operation. Supplied to the other inputs of the first and second logic elements is the output of the first internal circuit 24. These circuits constitute first noise-prevention circuitry for preventing switching changes in signal *OE supplied to the controller 21 from appearing at the output terminal B1.

Moreover, in FIG. 38, one of the two inputs to the NAND-logic circuit of the second input buffer 26 is the second-direction control signal BG having one of two potential levels from the second NOR-logic circuit of the controller 61, for a logic operation. One of the two inputs to the first logic element (NAND) of the second output buffer 28 is the control signal *BG' delayed from the second-direction control signal *BG having the one potential level supplied from the delay element 66 of the delay section 62, for a logic operation. One of the two inputs to the second logic element (NOR) of the second output buffer 28 is the control signal BG' delayed from the second-direction control signal BG having the other potential level, the inverted version of the one potential level, supplied from the delay element 65 of the delay section 62, for a logic operation. Supplied to the other inputs of the first and second logic elements is the output of the second internal circuit. These circuits constitute second noise-prevention circuitry for preventing switching changes in signal *OE supplied to the controller 21 from appearing at the output terminal A1.

As disclosed above, the delay section 62 in the controller 21 produces the control signals *AG', AG', *BG and BG' to the output buffers 25 and 28, respectively, delayed from the control signals AG and BG to the first and the second input buffers 23 and 26, respectively, by a specific timing and also produces the control signal *AG' and *BG' to the first and the second output buffers 25 and 28, respectively, delayed from the control signals *AG and *BG by the same specific timing, to suppress noises appearing at the output terminal B1 or A1. The delay section 62 may be made up of several stages of inverters, resistors, capacitors, and so on.

Figure 39:
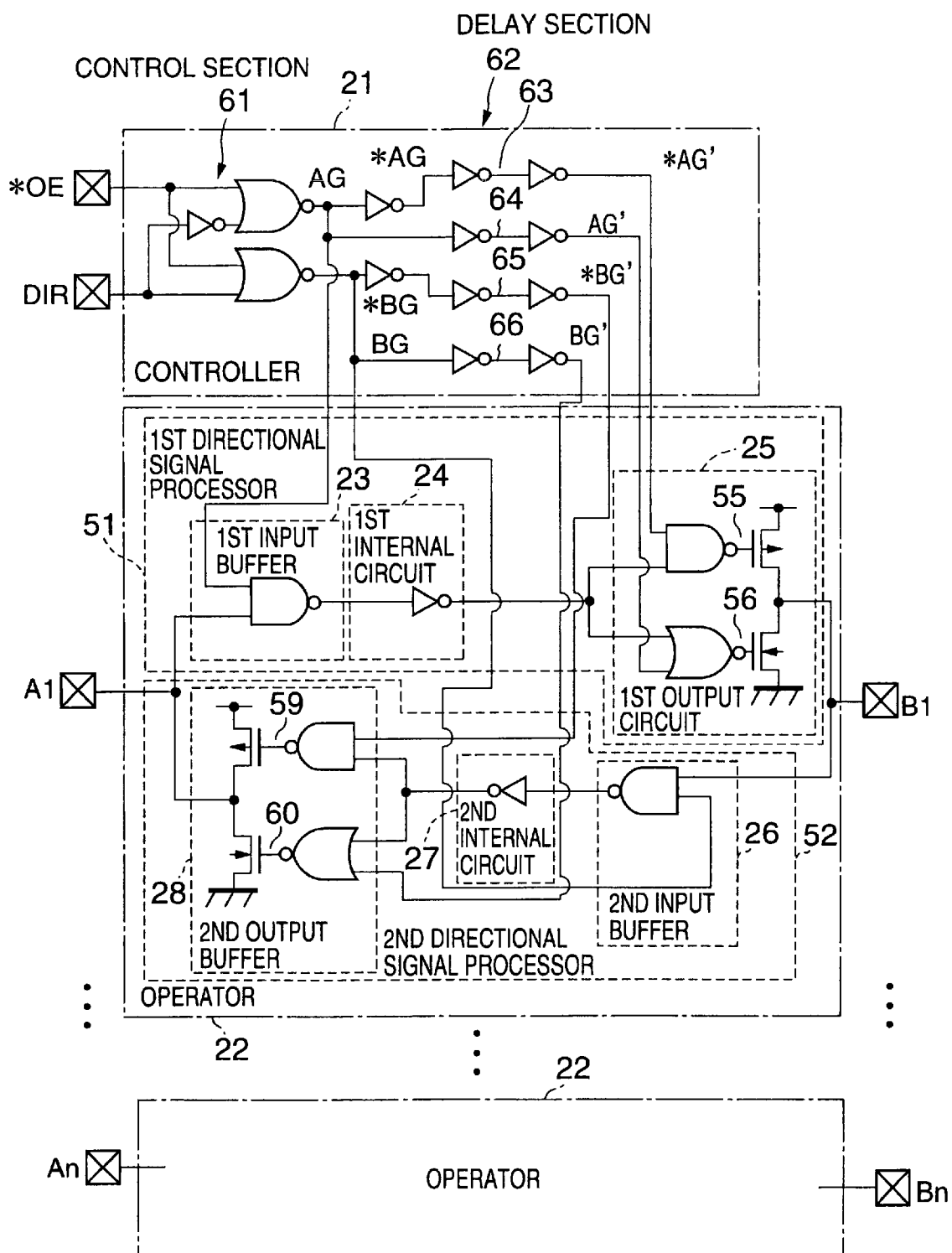
FIG. 39 shows a circuit diagram of a bus buffer having logic circuitry according to the twenty-fifth embodiment in the present invention.

FIG. 39 shows a bus buffer according to the twenty-fifth embodiment having inverters as the delay elements of the delay section 62. Delay elements 63, 64, 65 and 66 in FIG. 39 are made up of even-number-stage inverters connected in series. This arrangement generates control signals AG', *AG', BG' and *BG' delayed from control signals AG, *AG, BG and *BG by a specific timing, supplied to NAND-logic circuits 55 and 59, and NOR-logic circuits 56 and 60, respectively, of the first and the second output buffers 25 and 28.

Figure 40:
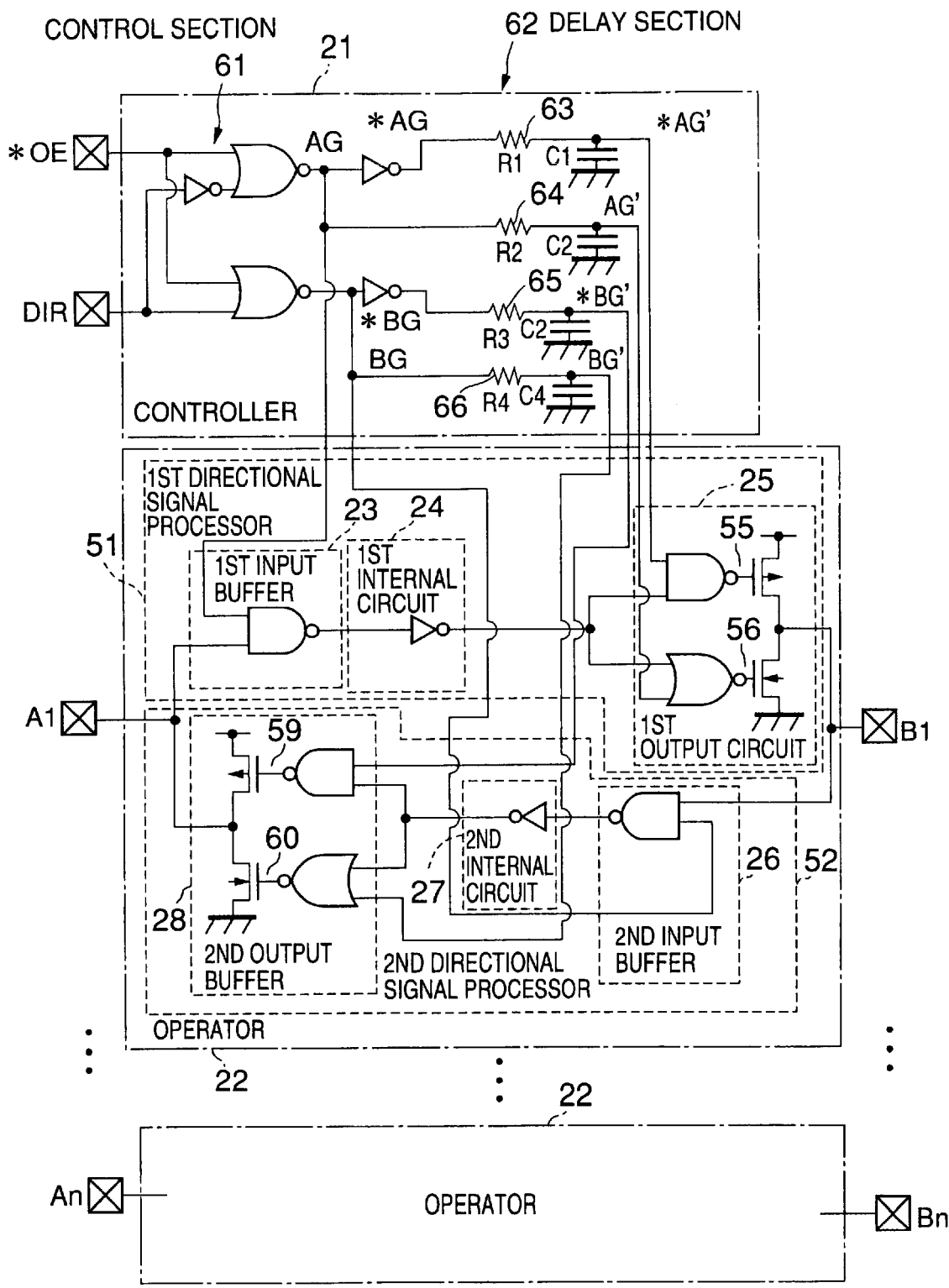
FIG. 40 shows a circuit diagram of a bus buffer having logic circuitry according to the twenty-sixth embodiment in the present invention.
Figure 41:
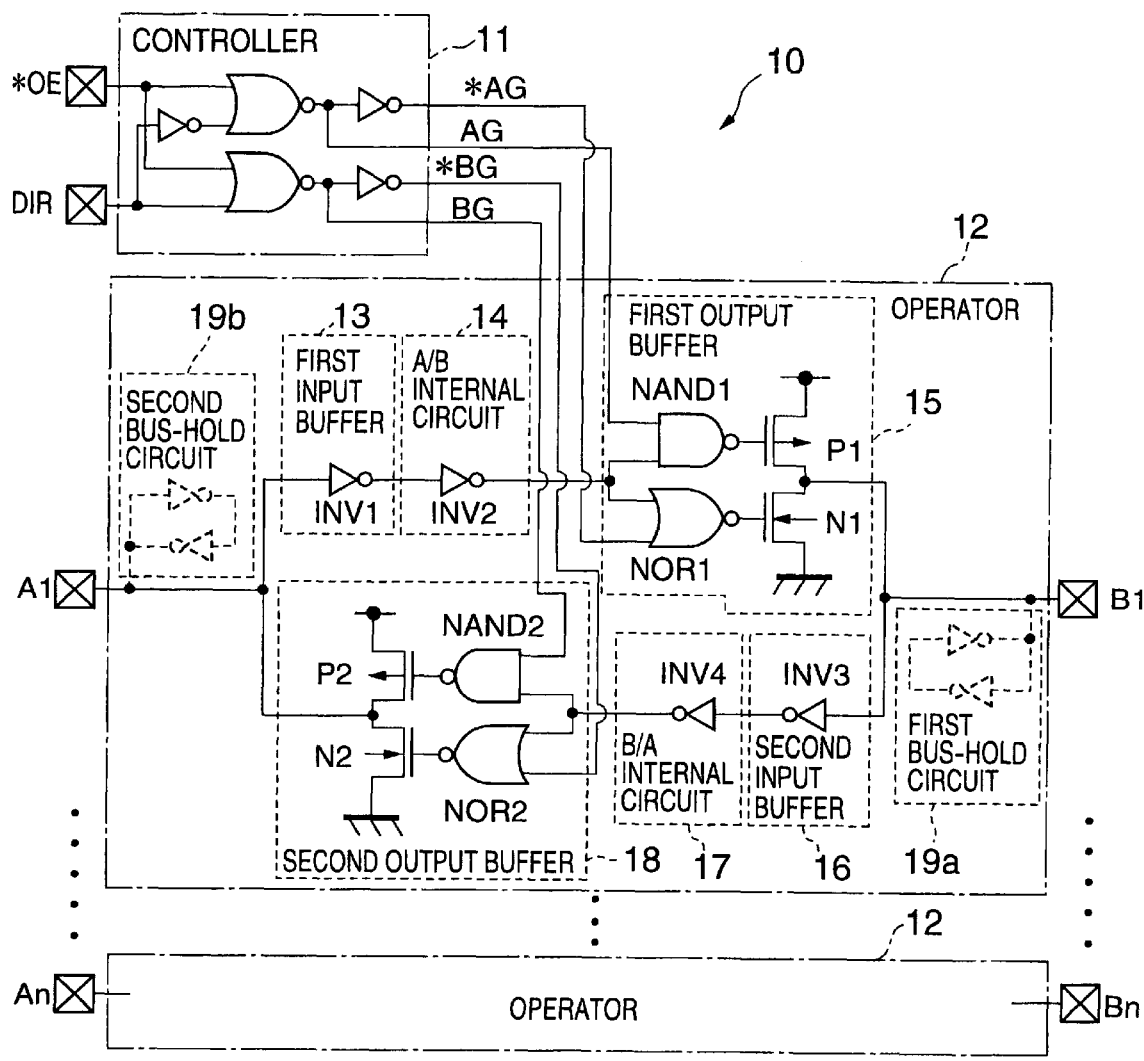
FIG. 41 shows a block diagram of a well-known bus buffer.

FIG. 40 shows a bus buffer according to the twenty-sixth embodiment having resistors and capacitors as the delay elements of the delay section 62.

Delay elements 63, 64, 65 and 66 in FIG. 40 are made up of a resistor R1 and a capacitor C1, a resistor R2 and a capacitor C2, resistor R3 and a capacitor C3 and a resistor R4 and a capacitor C4, respectively. In detail, the delay element 63 is constituted by the resistor R1 and the capacitor C1 connected in parallel. The delay element 64 is constituted by the resistor R2 and the capacitor C2 connected in parallel. The delay element 65 is constituted by the resistor R3 and the capacitor C3 connected in parallel. Moreover, the delay element 66 is constituted by the resistor R4 and the capacitor C4 connected in parallel.

The delay elements generate control signals AG', *AG', BG' and *BG' delayed from control signals AG, *AG, BG and *BG by a specific timing, which are supplied to the NAND-logic circuits 55 and 59, and the NOR-logic circuits 56 and 60 of the first and the second output buffers 56 and 60, respectively.

The bus buffers in the thirteenth to the twenty-sixth embodiments suppress noises that appear at the output side when the signal *OE to the controller is varying from the high to low level.

As disclosed in detail, according to the bus buffer in the present invention, input to the input buffer is held at a certain level, for reducing unnecessary power consumption, thus achieving further less power consumption.

What is claimed is:

1. A bus buffer having logic circuitry comprising:

a controller, provided between a plurality of two-way data buses through which at least one data signal is transferred, to generate a plurality of different control signals based on an input/output command signal instructing input/output of the data signal and a direction-indicating signal indicating a direction in which the data signal is to be transferred;

a first terminal via which a first-directional signal to be transferred from a first bus side to a second bus side is input whereas a second-directional signal to be transferred from the second bus side to the first bus side is output;

a second terminal via which the first-directional signal is output whereas the second-directional signal is input;

a first-directional signal processor, provided between the first and second terminals, having a first input buffer, a first internal circuit and a first output buffer; and a second-directional signal processor, provided between the second and first terminals, having a second input buffer, a second internal circuit and a second output buffer, wherein the first input buffer has a first input holder to disactivate the first internal circuit and the first output buffer by using at least one of the control signals in accordance with states of the input/output command signal and the direction-indicating signal, and the second input buffer has a second input holder to disactivate the second internal circuit and the second output buffer by using the at least one control signal in accordance with the states.

2. The bus buffer having logic circuitry according to claim 1, wherein the first input holder has a first NAND-logic circuit, one of two inputs thereof being an input signal via the first terminal, the other input being a control signal indicating a first direction, to activate the first-directional signal processor when there is a signal input via the first terminal and the direction-indicating signal indicates the first direction, thus outputting a processing-result signal via the second terminal whereas disactivate the first-directional signal processor while the second input buffer is in operation; and the second input holder has a second NAND-logic circuit, one of two inputs thereof being an input signal via the second terminal, the other input being a control signal indicating a second direction, to activate the second-directional signal processor when there is a signal input via the second terminal and the direction-indicating signal indicates the second direction, thus outputting a processing-result signal via the first terminal whereas disactivate the second-directional signal processor while the first input buffer is in operation.

3. The bus buffer having logic circuitry according to claim 1, wherein the first input holder has a first clocked inverter to invert an input signal at the first terminal in response to one of the control signals as a clock, a second clocked inverter to invert the output of the first clocked inverter in response to another of the control signals as a clock, and a first inverter to invert the output of the second clocked inverter, an inverted output of the first inverter being supplied to the second clocked inverter, the first input holder activating the first-directional signal processor when there is a signal input via the first terminal and the direction-indicating signal indicates the first direction, thus outputting a processing-result signal via the second terminal whereas disactivate the first-directional signal processor while the second input buffer is in operation; and the second input holder has a third clocked inverter to invert an input signal at the first terminal in response to one of the control signals as a clock, a fourth clocked inverter to invert the output of the third clocked inverter in response to another of the control signals as a clock, and a second inverter to invert the output of the fourth clocked inverter, an inverted output of the second inverter being supplied to the fourth clocked inverter, the second input holder activating the second-directional signal processor when there is a signal input via the second terminal and the direction-indicating signal indicates the second direction, thus outputting a processing-result signal via the first terminal whereas disactivate the second-directional signal processor while the first input buffer is in operation.

4. The bus buffer having logic circuitry according to claim 1 further comprising a bus holder to perform a logic operation to one of the control signals generated by the controller based on the input/output command signal and the direction-indicating signal, and a signal transferred via at least either the first or the second-directional signal processor, to release the first and the second terminals from a high-impedance state when both terminals have been brought in the high-impedance state.

5. The bus buffer having logic circuitry according to claim 4, wherein the bus holder has a bus-hold circuit, provided between the output side of the first-directional signal processor and the second terminal, to perform a logic operation to the output of the first output buffer and one of the control signals supplied from the controller, to release the first and the second terminals from the high-impedance state.

6. The bus buffer having logic circuitry according to claim 5, wherein the bus holder has a bus-hold circuit, provided between the output side of the second-directional signal processor and the first terminal, to perform a logic operation to the output of the second output buffer and one of the control signals supplied from the controller, to release the first and the second terminals from the high-impedance state.

7. The bus buffer having logic circuitry according to claim 4, wherein the bus holder includes a first bus-hold circuit having a third NAND-logic circuit, one of two inputs thereof being a signal appearing between the first output buffer and the second terminal, the other input being one of the control signals from the controller and a fifth clocked inverter to invert the output of the third NAND-logic circuit, thus outputting the inverted output, in response to the one control signal as a clock, and a second bus-hold circuit having a fourth NAND-logic circuit, one of two inputs thereof being a signal appearing between the second output buffer and the first terminal, the other input being one of the control signals from the controller and a sixth clocked inverter to invert the output of the fourth NAND-logic circuit, thus outputting the inverted output, in response to the one control signal as a clock.

8. The bus buffer having logic circuitry according to claim 4, wherein the bus holder includes a first bus-hold circuit having a third inverter to invert a signal appearing between the first output buffer and the second terminal and a seventh clocked inverter to invert the output of the third inverter, thus outputting the inverted output, in response to one of the control signals as a clock, and second bus-hold circuit having a fourth inverter to invert a signal appearing between the second output buffer and the first terminal and a eighth clocked inverter to invert the output of the fourth inverter, thus outputting the inverted output, in response to one of the control signals as a clock.

9. The bus buffer having logic circuitry according to claim 4, wherein the bus holder has a bus-hold circuit, provided between the output side of the second-directional signal processor and the first terminal, to perform a logic operation to the output of the second output buffer and one of the control signals supplied from the controller, to release the first and the second terminals from the high-impedance state.

10. The bus buffer having logic circuitry according to claim 1 further comprising a buffer at least either between the first terminal and the first-directional signal processor or between the second terminal and the second-directional signal processor, to buffer an effect of an input at the first or the second terminal that functions as an input terminal.

11. The bus buffer having logic circuitry according to claim 1, wherein the buffer includes a first buffering circuit, provided between the first terminal and the first output buffer, to buffer an effect of the first-directional signal input via the first terminal to be directly supplied to the first input buffer and a second buffering circuit, provided between the second terminal and the second output buffer, to buffer an effect of the second-directional signal input via the second terminal to be directly supplied to the second input buffer.

12. The bus buffer having logic circuitry according to claim 1, wherein the first input holder includes:

a first NAND-logic circuit, one of the two inputs thereof being an input signal via the first terminal, the other input being a control signal from the controller for indicating the first direction, for activating the first-directional signal processor under an signal input to the first terminal and the direction-indicating signal indicating the first direction, thus outputting a processing-result signal at the second terminal whereas disactivating the first-directional signal processor except the first input buffer when the second input buffer is in operation; and a first NOR-logic circuit, one of the two inputs thereof being an input signal via the first terminal, the other input being a control signal from the controller for indicating the first direction, for activating the first-directional signal processor under an signal input to the first terminal and the direction-indicating signal indicating the first direction, thus outputting a processing-result signal at the second terminal whereas disactivating the first-directional signal processor except the first input buffer when the second input buffer is in operation, the output buffer of the first-directional signal processor having a first H-output circuit for a logic operation to one of the control signals of a specific level and the output of the first NAND-logic circuit via the first internal circuit and a first L-output circuit for a logic operation to one of the control signals of another specific level and the output of the first NOR-logic circuit via the first internal circuit 24, and the second input holder includes:
    a second NAND-logic circuit, one of the two inputs thereof being an input signal via the second terminal, the other input being a control signal from the controller for indicating the second direction, for activating the second-directional signal processor under an signal input to the second terminal and the direction-indicating signal indicating the second direction, thus outputting a processing-result signal at the first terminal whereas disactivating the second-directional signal processor except the second input buffer when the first input buffer is in operation; and
    a second NOR-logic circuit, one of the two inputs thereof being an input signal via the second terminal, the other input being a control signal from the controller for indicating the second direction, for activating the second-directional signal processor under the signal input to the second terminal and the direction-indicating signal indicating the second direction, thus outputting a processing-result signal at the second terminal whereas disactivating the second-directional signal processor except the second input buffer when the first input buffer is in operation, the output buffer of the second-directional signal processor having a second H-output circuit for a logic operation to one of the control signals of a specific level and the output of the second NAND-logic circuit via the second internal circuit and a second L-output circuit for a logic operation to one of the control signals of another specific level and the output of the second NOR-logic circuit via the second internal circuit.

13. The bus buffer having logic circuitry according to claim 1, wherein
    the first input holder includes:
    a first clocked inverter, one of the two inputs thereof being an input signal via the first terminal, the other input being a control signal from the controller for indicating the first direction, for activating the first-directional signal processor under a signal input to the first terminal and the direction-indicating signal indicating the first direction, thus outputting a processing-result signal at the second terminal whereas disactivating the first-directional signal processor except the first input buffer when the second input buffer is in operation; and
    a second clocked inverter, one of the two inputs thereof being an input signal via the first terminal, the other input being a control signal from the controller for indicating the first direction, for activating the first-directional signal processor under a signal input to the first terminal and the direction-indicating signal indicating the first direction, thus outputting a processing-result signal at the second terminal whereas disactivating the first-directional signal processor except the first input buffer when the second input buffer is in operation, the output buffer of the first-directional signal processor having a first H-output circuit for a logic operation to one of the control signals of a specific level and the output of the first clocked inverter via the internal circuit and a first L-output circuit for a logic operation to one of the control signals of another specific level and the output of the second clocked inverter via the internal circuit; and the second input holder includes:
    a third clocked inverter, one of the two inputs thereof being an input signal via the second terminal, the other input being a control signal from the controller for indicating the second direction, for activating the second-directional signal processor under a signal input to the second terminal and the direction-indicating signal indicating the second direction, thus outputting a processing-result signal at the first terminal whereas disactivating the second-directional signal processor except the second input buffer when the first input buffer is in operation; and
    a fourth clocked inverter, one of the two inputs thereof being an input signal via the second terminal, the other input being a control signal from the controller for indicating the second direction, for activating the second-directional signal processor under a signal input to the second terminal and the direction-indicating signal indicating the second direction, thus outputting a processing-result signal at the second terminal whereas disactivating the second-directional signal processor except the second input buffer when the first input buffer 23 is in operation, the output buffer of the second-directional signal processor having a the second H-output circuit for a logic operation to one of the control signals of a specific level and the output of the third clocked inverter via the internal circuit and a second L-output circuit for a logic operation to one of the control signals of another specific level and the output of the fourth clocked inverter via the internal circuit.

14. The bus buffer having logic circuitry according to claim 1, wherein the controller includes a control section to generate a plurality of first-direction and second-direction control signals and a delay section to delay the first and the second control signals, one of inputs to a logic element of the first input holder being one of the first-direction control signals having a specific potential level from the control section, for a logic operation, one of inputs to a first logic element of the output buffer being a delayed signal of one of the first-direction control signals having another potential level, that is an inverted version of the specific level, supplied from the delay section, for a logic operation, one of inputs to a second logic element of the output buffer being a delayed signal of the first-direction control signal having the specific potential, supplied from the delay section, for a logic operation, one of inputs to a logic element of the second input holder being one of the second-direction control signals having a specific potential level from the control section, for a logic operation, one of inputs to a third logic element of the output buffer being a delayed signal of one of the second-direction control signals having another potential level, that is an inverted version of the specific level, supplied from the delay section, for a logic operation, one of inputs to a fourth logic element of the output buffer being a delayed signal of the second-direction control signal having the specific potential, supplied from the delay section, for a logic operation.

15. The bus buffer having logic circuitry according to claim 1, wherein a data signal is transferred through each two-way data bus, a data-transfer speed for data buses on the first bus side and the data-transfer speed for data buses on the second bus side being different from each other.

16. A bus buffer having logic circuitry comprising:
    a controller, provided between a plurality of one-way data buses through which at least one data signal is transferred, to generate a plurality of different control signals based on an input/output command signal instructing input/output of the data signal;

an input terminal via which a one-way signal to be transferred from a first bus side is input;

an input buffer connected to the input terminal;

an internal circuit connected to the input buffer;

an output buffer connected to the internal circuit;

an output terminal via which an output signal of the output buffer is output to a second bus side;

wherein the input buffer has a logic circuitry to perform a logic operation by using one of the control signals having a specific level and the data signal input via the input terminal, to activate the internal circuit and the output buffer, thus outputting a result signal via the output terminal, whereas to disactivate the internal circuit and the output buffer when the data signal is not input via the input terminal.

17. The bus buffer having logic circuitry according to claim 16, wherein the input holder has a first NAND-logic circuit for activating the input buffer, the internal circuit and the output buffer to output logic-operation results based on a signal input via the input terminal and one of the control signals from the controller, whereas disactivating the input buffer, the internal circuit and the output buffer when no signal input is at the input terminal, thus holding the input terminal at a certain level.

18. The bus buffer having logic circuitry according to claim 16, wherein the input holder includes:

a first clocked inverter for inverting an signal input at the input terminal in response to one of the control signals as a clock; and a second clocked inverter, cross-coupled with the first clocked inverter, for inverting the output of the first clocked inverter by using one of the control signals, from the controller, as a clock having a potential level different from a potential level of the control signal for the first clocked inverter, the output of the second clocked inverter being supplied to the first clocked inverter at the input side thereof, for activating the input buffer, the internal circuit and the output buffer to output logic-operation results based on a signal input via the terminal and one of the control signals from the controller, whereas disactivating the input buffer, the internal circuit and the output buffer when no signals at the input terminal, thus holding the input terminal at a certain level.

19. The bus buffer having logic circuitry according to claim 16 further comprising a bus holder, provided at least a posterior stage to the input terminal or an anterior stage to the output terminal, for holding an input signal at a specific level when the input signal at the input terminal and an output signal at the output terminal are in a high-impedance state, the bus holder being out of operation when the input signal is not in the high-impedance state.

20. The bus buffer having logic circuitry according to claim 19, wherein the bus holder has a bus-hold circuit provided between the input terminal and the input buffer.

21. The bus buffer having logic circuitry according to claim 20, wherein the bus holder has another bus-hold circuit provided between the output terminal and the output buffer.

22. The bus buffer having logic circuitry according to claim 19, wherein the bus holder has a bus-hold circuit provided between the output terminal and the output buffer.

23. The bus buffer having logic circuitry according to claim 19, wherein the bus holder includes:

a NAND-logic circuit, one of inputs thereof being a signal transferred from the input terminal to the output terminal and another inputs thereof being one of the control signals from the controller; and a clocked inverter for inverting the output of the NAND-logic circuit in response to the one control signal as a clock.

24. The bus buffer having logic circuitry according to claim 19, wherein the bus holder includes:

an inverter for inverting a signal transferred from the input terminal to the output terminal; and a clocked inverter for inverting the output of the inverter in response to one of the control signals as a clock, the output of the clocked inverter being supplied to the inverter at the input side thereof.

25. The bus buffer having logic circuitry according to claim 16 further comprising a buffer provided between the input terminal and the output buffer, to buffer an effect of the one-way signal input via the input terminal to be directly supplied to the input buffer.

26. The bus buffer having logic circuitry according to claim 16, wherein the input holder includes:

a NAND-logic circuit for activating the input buffer, the internal circuit and the output buffer, thus outputting a processing-result signal, based on a signal input via the input terminal and one of the control signals from the controller, having a specific level whereas disactivating the internal circuit and the output buffer when no signal input via the input terminal, thus holding the input terminal at a specific level; and a NOR-logic circuit for activating the input buffer, the internal circuit and the output buffer, thus outputting a processing-result signal, based on a signal input via the input terminal and one of the control signals from the controller, having another specific level whereas disactivating the internal circuit and the output buffer when no signal input via the input terminal, thus holding the input terminal at a specific level, the output buffer having an H-output circuit for a logic operation to one of the control signals of the specific level and the output of the NAND-logic circuit via the internal circuit and a L-output circuit for a logic operation to one of the control signal of the other specific level and the output of the NOR-logic circuit via the internal circuit.

27. The bus buffer having logic circuitry according to claim 16, wherein the input holder includes:

a first clocked inverter for activating the input buffer, the internal circuit and the output buffer, thus outputting a processing-result signal, based on a signal input via the input terminal and one of the control signals from the controller, having a specific level whereas disactivating the internal circuit and the output buffer when no signal input via the input terminal, thus holding the input terminal at a specific level; and a second clocked inverter for activating the input buffer, the internal circuit and the output buffer, thus outputting a processing-result signal, based on a signal input via the input terminal and one of the control signals from the controller, having another specific level whereas disactivating the internal circuit and the output buffer when no signal input via the input terminal, thus holding the input terminal at a specific level, the output buffer having an H-output circuit for a logic operation to one of the control signals of the specific level and the output of the first clocked inverter via the internal circuit and a L-output circuit for a logic operation to one of the control signal of the other specific level and the output of the second clocked inverter via the internal circuit.

28. The bus buffer having logic circuitry according to claim 16, wherein the controller includes a control section for generating the control signals of different signal levels and a delay section to delay the control signals of the control section, one of inputs to a logic element of the input buffer being one of the control signals having a specific potential level from the control section, for a logic operation, one of inputs to a first logic element of the output buffer being a delayed signal of the control signals having the specific potential level, supplied from the delay section, for a logic operation, one of inputs to a second logic element of the output buffer being a delayed signal of one of the control signals, having another specific potential, an inverted version of the specific potential level, supplied from the delay section, for a logic operation.

29. The bus buffer having logic circuitry according to claim 16, wherein a data signal is transferred through each one-way data bus, a data-transfer speed for data buses on the first bus side and the data-transfer speed for data buses on the second bus side being different from each other.

* * * * *